(12) United States Patent
Shepherd et al.

(10) Patent No.: US 9,298,361 B2
(45) Date of Patent: Mar. 29, 2016

(54) ANALYZING APPLICATIONS FOR DIFFERENT ACCESS MODES

(71) Applicant: Apple Inc., Cupertino, CA (US)

(72) Inventors: Matthew E. Shepherd, Mountain View, CA (US); Craig M. Federighi, Los Altos Hills, CA (US); Thomas M. Alsina, Cupertino, CA (US); Gregory N. Christie, San Jose, CA (US); Stephen O. Lemay, San Francisco, CA (US); Martin Pedrick, San Francisco, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 148 days.

(21) Appl. No.: 14/078,466

(22) Filed: Nov. 12, 2013

(65) Prior Publication Data

US 2014/0283142 A1     Sep. 18, 2014

Related U.S. Application Data

(60) Provisional application No. 61/800,917, filed on Mar. 15, 2013.

(51) Int. Cl.
    *G06F 21/62*      (2013.01)
    *G06F 3/0488*      (2013.01)
    (Continued)

(52) U.S. Cl.
    CPC ............ *G06F 3/0488* (2013.01); *G06F 3/0482* (2013.01); *G06F 3/04817* (2013.01);
    (Continued)

(58) Field of Classification Search
    CPC ....... G06F 21/00; G06F 21/12; G06F 21/121; G06F 21/126; G06F 21/32; G06F 21/60; G06F 21/604; G06F 21/62; G06F 21/6218; G06F 21/6281; G06F 21/629; G06F 21/74; G06F 3/0482; G06F 3/0488; G06F 3/04817; G06F 3/0484
See application file for complete search history.

(56) References Cited

U.S. PATENT DOCUMENTS

| | | | | |
|---|---|---|---|---|
| 5,677,952 A | * | 10/1997 | Blakley, III | ............ G06F 21/31 380/28 |
| 7,272,388 B2 | | 9/2007 | Andrew et al. | |

(Continued)

FOREIGN PATENT DOCUMENTS

| | | |
|---|---|---|
| WO | PCT/US2013/077860 | 12/2013 |
| WO | PCT/US2013/077862 | 12/2013 |
| WO | PCT/US2013/077863 | 12/2013 |

OTHER PUBLICATIONS

Karlson et al. "Can I borrow your phone? Understanding concerns when sharing mobile phones" [Online], 2009 [Retrieved on Nov. 9, 2015], CHI'09 Proceedings of the SIGCHI Conference on Human Factors in Computing Systems, pp. 1647-1650, Retrieved from: < http://dl.acm.org/citation.cfm?id=1518953 >.*

(Continued)

*Primary Examiner* — Eric W Shepperd
(74) *Attorney, Agent, or Firm* — Morgan, Lewis & Bockius LLP

(57) ABSTRACT

Some embodiments of the invention provide a mobile device with multiple access modes. The device in some embodiments has at least two access modes, a primary access mode and a secondary access mode, that provide different restrictions for accessing the applications and/or data that are stored on the device. In some embodiments, the mobile device automatically selects applications to share or keep private based metadata associated with the applications.

21 Claims, 61 Drawing Sheets

(51) Int. Cl.
*G06F 3/0482* (2013.01)
*G06F 3/0481* (2013.01)
*G06F 21/32* (2013.01)

(52) U.S. Cl.
CPC .............. *G06F21/32* (2013.01); *G06F 21/629* (2013.01); *G06F 21/6218* (2013.01); *G06F 21/6245* (2013.01); *G06F 2221/2149* (2013.01)

(56) References Cited

U.S. PATENT DOCUMENTS

| | | | | |
|---|---|---|---|---|
| 8,803,834 | B2* | 8/2014 | Swanburg | G06F 3/0481 345/156 |
| 8,909,915 | B2* | 12/2014 | Ferren | G02B 13/0065 455/435.1 |
| 9,030,679 | B2* | 5/2015 | Yoshida | H04N 1/00411 358/1.13 |
| 9,134,903 | B2* | 9/2015 | Hicks | G06F 3/04883 |
| 2006/0094398 | A1* | 5/2006 | Chaar | H04M 15/12 455/405 |
| 2006/0277233 | A1 | 12/2006 | Miller et al. | |
| 2007/0143824 | A1 | 6/2007 | Shahbazi | |
| 2007/0217598 | A1 | 9/2007 | Ferguson et al. | |
| 2007/0281664 | A1* | 12/2007 | Kaneko | G06F 21/88 455/410 |
| 2007/0300140 | A1 | 12/2007 | Makela et al. | |
| 2008/0020803 | A1 | 1/2008 | Rios et al. | |
| 2008/0032682 | A1 | 2/2008 | Jung et al. | |
| 2008/0254767 | A1 | 10/2008 | Jin | |
| 2009/0083847 | A1 | 3/2009 | Fadell et al. | |
| 2009/0282473 | A1 | 11/2009 | Karlson et al. | |
| 2009/0311991 | A1* | 12/2009 | Shin | H04M 1/72563 455/411 |
| 2010/0216429 | A1* | 8/2010 | Mahajan | G06F 21/6245 455/411 |
| 2010/0233996 | A1 | 9/2010 | Herz et al. | |
| 2010/0235881 | A1 | 9/2010 | Liu et al. | |
| 2010/0317371 | A1 | 12/2010 | Westerinen et al. | |
| 2011/0021175 | A1* | 1/2011 | Florek | G06Q 20/20 455/410 |
| 2011/0252375 | A1 | 10/2011 | Chaudhri | |
| 2011/0320307 | A1 | 12/2011 | Mehta et al. | |
| 2012/0023573 | A1 | 1/2012 | Shi | |
| 2012/0046077 | A1 | 2/2012 | Kim et al. | |
| 2012/0084734 | A1 | 4/2012 | Wilairat | |
| 2012/0154413 | A1 | 6/2012 | Kim et al. | |
| 2012/0166997 | A1* | 6/2012 | Cho | G06F 21/6218 715/778 |
| 2012/0278745 | A1* | 11/2012 | Kim | G06F 3/04817 715/769 |
| 2013/0007842 | A1 | 1/2013 | Park et al. | |
| 2013/0061172 | A1* | 3/2013 | Huang | G06F 3/04817 715/808 |
| 2013/0074159 | A1* | 3/2013 | Lin | G06F 21/56 726/4 |
| 2013/0078949 | A1 | 3/2013 | Pecen et al. | |
| 2013/0095784 | A1* | 4/2013 | Jerath | H04W 4/003 455/406 |
| 2013/0145453 | A1 | 6/2013 | Lemke | |
| 2013/0174193 | A1 | 7/2013 | Yu et al. | |
| 2013/0191775 | A1 | 7/2013 | Lawson et al. | |
| 2013/0191911 | A1 | 7/2013 | Dellinger et al. | |
| 2013/0227495 | A1* | 8/2013 | Rydenhag et al. | |
| 2013/0321340 | A1* | 12/2013 | Seo | G06F 1/1641 345/174 |
| 2014/0013254 | A1 | 1/2014 | Hosein | |
| 2014/0032758 | A1* | 1/2014 | Barton | H04L 41/00 709/225 |
| 2014/0068755 | A1* | 3/2014 | King | G06F 21/53 726/19 |
| 2014/0123325 | A1 | 5/2014 | Jung et al. | |
| 2014/0173747 | A1 | 6/2014 | Govindaraju | |
| 2014/0253467 | A1* | 9/2014 | Hicks | G06F 3/033 345/173 |
| 2014/0283128 | A1 | 9/2014 | Shepherd et al. | |
| 2014/0283135 | A1 | 9/2014 | Shepherd et al. | |
| 2014/0283141 | A1 | 9/2014 | Shepherd et al. | |
| 2014/0283142 | A1 | 9/2014 | Shepherd et al. | |
| 2015/0277701 | A1* | 10/2015 | Miura | G06F 3/04883 715/765 |

OTHER PUBLICATIONS

Office Action, dated Dec. 26, 2014, received in U.S. Appl. No. 14/078,460, 20 pages.
Office Action, dated Feb. 12, 2015, received in U.S. Appl. No. 14/078,463, 14 pages.
Office Action, dated Dec. 31, 2014, received in U.S. Appl. No. 14/078,469, 19 pages.
Final Office Action, dated Jul. 8, 2015, received in U.S. Appl. No. 14/078,463, 11 pages.
Notice of Allowance, dated Jul. 15, 2015, received in U.S. Appl. No. 14/078,469, 17 pages.
Notice of Allowance, dated Sep. 23, 2015, received in U.S. Appl. No. 14/078,460, 12 pages.
International Preliminary Report on Patentability, dated Sep. 15, 2015, received in International Patent Application No. PCT/US2013/077860, which corresponds with U.S. Appl. No. 14/078,460, 7 pages.
International Preliminary Report on Patentability, dated Sep. 15, 2015, received in International Patent Application No. PCT/US2013/077863, which corresponds with U.S. Appl. No. 14/078,469, 7 pages.
International Search Report and Written Opinion for PCT/US2013/077860, Apr. 24, 2014 (mailing date), Apple Inc.
International Search Report and Written Opinion for PCT/US2013/077862, Apr. 25, 2014 (mailing date), Apple Inc.
International Search Report and Written Opinion for PCT/US2013/077863, May 9, 2014 (mailing date), Apple Inc.
Author Unknown "BlackBerry Z10 Smartphone User Guide", Jan. 22, 2014, Part 1 of 3, pp. 1-100, Blackberry, available at http://docs.blackberry.com/en/smartphone_users/deliverables/61419/BlackBerry_Z10_Smartphone-User_Guide-1337191904827-10.2.1-en.pdf.
Author Unknown "BlackBerry Z10 Smartphone User Guide", Jan. 22, 2014, Part 2 of 3, pp. 101-200, Blackberry, available at http://docs.blackberry.com/en/smartphone_users/deliverables/61419/BlackBerry_Z10_Smartphone-User_Guide-1337191904827-10.2.1-en.pdf.
Author Unknown "BlackBerry Z10 Smartphone User Guide", Jan. 22, 2014, Part 3 of 3, pp. 201-295, Blackberry, available at http://docs.blackberry.com/en/smartphone_users/deliverables/61419/BlackBerry_Z10_Smartphone-User_Guide-1337191904827-10.2.1-en.pdf.

* cited by examiner

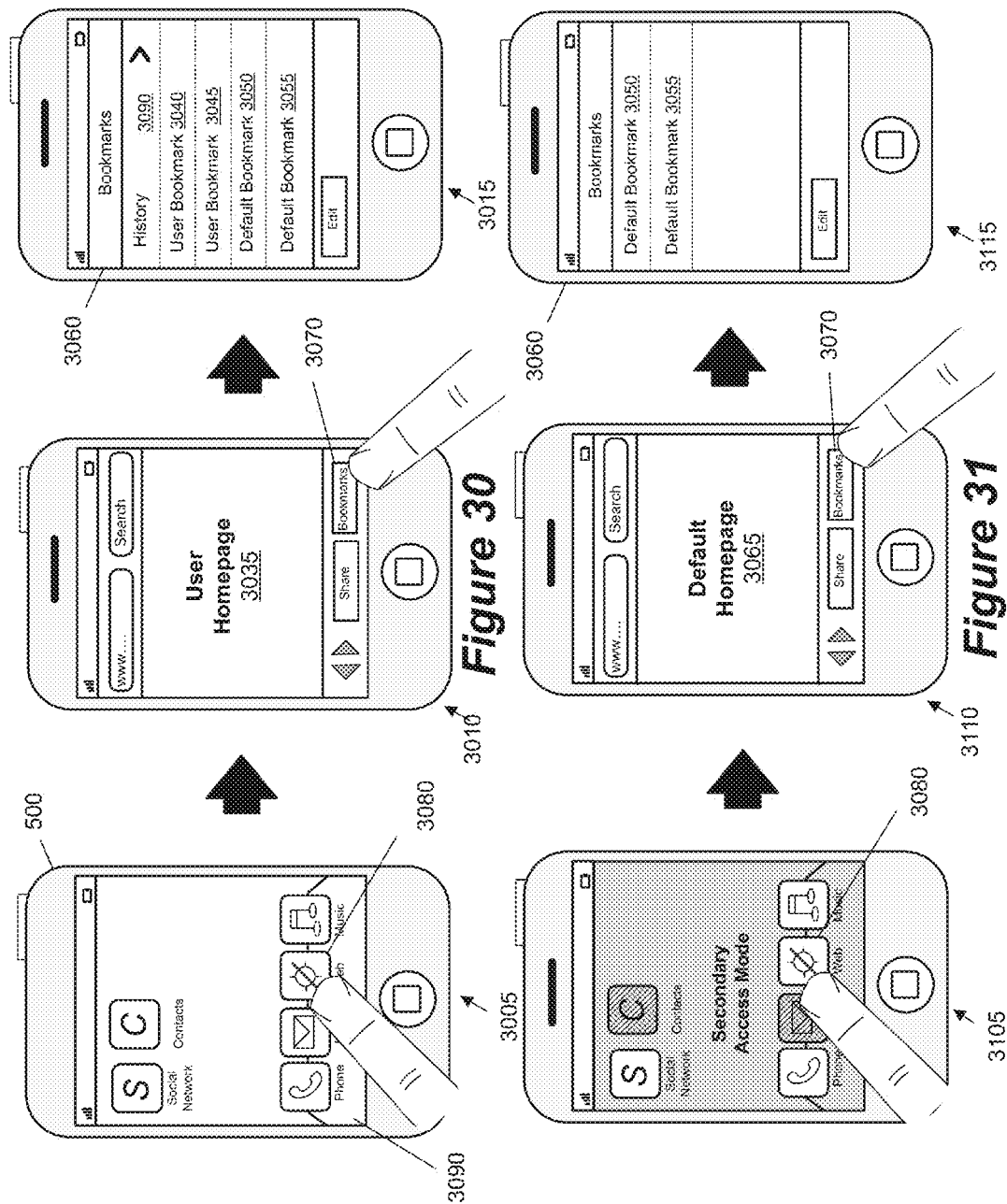

ANALYZING APPLICATIONS FOR DIFFERENT ACCESS MODES

CLAIM OF BENEFIT TO PRIOR APPLICATION

This application claims the benefit of U.S. Provisional Application 61/800,917, entitled "Mobile Computing Device with Multiple Access Modes", filed Mar. 15, 2013. U.S. Provisional Application 61/800,917 is incorporated herein by reference.

BACKGROUND

In recent years, mobile devices (e.g., smart phones, tablet computers) have become very popular. One reason for their popularity is that they can be used nearly anywhere to perform a variety of different tasks. For instance, many of these mobile devices allow their users to exchange emails, make telephone calls, purchase items online, take photos, share comments and photos through different social network platforms, etc. These mobile devices are also very easy to share. In fact, many people share their devices with family or friends to make phone calls, to share games or applications, etc.

While such mobile devices have proved to be very useful, they often store private data (e.g., contacts, emails, private photos), or provide easy access to other sources (e.g., a social network website, an online bank) that store private data. This presents a problem when a first person wants to share a game or application on his device with a second person, but does not wish the second person to have access to his private data. This is especially problematic because the first person cannot always monitor the second person's use of his device, or even if he can, finds it awkward to do so.

The need to keep private data on a mobile device confidential is not the only motivation that prevents users from sharing their mobile devices with others. Many other reasons exist that make such sharing difficult. For instance, kids often wish to play with the mobile devices of their parents. However, while using their parents' devices, kids may inadvertently delete data (e.g., delete photos, emails, etc.) or initiate/send communications (e.g., initiate calls, send e-mails, etc.).

In addition to the need to control another's access to one's mobile device, one often needs to quickly access certain functionalities of one's device. In devices with touch screen controls, such access is often delayed because of controls that are placed on the devices to prevent inadvertent operation of the devices. For example, many devices place lock screen controls (including passcode and/or gesture controls) that are needed to gain access to all or most of the applications of the device. Such controls slow down the user's access. Also, in some cases the user has difficulty performing the operations necessitated by these controls. For instance, a user may have such difficulty when the user is busy performing other tasks (e.g., when the user is jogging, biking, etc.).

BRIEF SUMMARY

Some embodiments of the invention provide a mobile device with multiple access modes. The device in some embodiments has at least two access modes, a primary access mode and a secondary access mode, that provide different restrictions for accessing the applications and/or data that are stored on the device. In some embodiments, the primary access mode of the device provides unfettered access to all of the device's applications and/or data that are available to a user, while its secondary access mode provides access to a limited set of applications and/or data that are stored on the device. In other words, when the device is operated in its secondary access mode, the user has access to a subset of applications and/or data but cannot access applications and/or data that are restricted during the secondary access mode.

In some embodiments, three or more applications can be accessed in the secondary access mode of the device. The number of applications accessible in the secondary access mode (1) is pre-defined and static in some embodiments, (2) is pre-defined but user-customizable in other embodiments, and (3) is purely user-specified in still other embodiments. In addition to restricting access to certain applications in the secondary access mode, the device also restricts access to data stored by such restricted applications to applications (including the operating system of the device in some embodiments) that are not restricted in the secondary access mode.

In some embodiments, the secondary access mode is always enabled, while in other embodiments it is a mode that can be enabled or disabled by a user of the primary access mode. There exist many reasons for enabling the secondary access mode. One reason is to allow the device's user to share his device with another, without letting the other person access the user's private data or access services of the device that the user does not wish to share with that person. Another reason is to allow the device's user to share the device with children while restricting the children's access to certain applications or data (e.g., photos, documents, emails, etc.) on the device. Still another reason is to allow the device's user to gain quick access to certain applications on the device without providing the input necessary to gain access to the device's primary access mode. Often such input slows access to the device because it requires a precise operation (e.g., requires input of a precise passcode or gesture) that might not be easy to perform in all circumstances.

Different embodiments provide different mechanisms for a user to enable secondary access mode, and/or to specify applications and/or data that are available during the secondary access mode. In some embodiments, the device's operating system provides a plurality of settings that can be toggled ON or OFF for enabling the secondary access mode and the applications available in this mode. Such settings are modeled as ON/OFF affordances (e.g., switches) in some embodiments, while they are modeled differently in other embodiments. The device's operating system in these or other embodiments provides controls for enabling in the secondary access mode groups of applications (e.g., game applications, communication applications, social media applications, etc.). The device's operating system in these or other embodiments further provides controls for enabling access to different pieces of content data (e.g., to different pictures, contacts, etc.) during the secondary access mode.

Different embodiments provide different mechanisms for directing the device to operate in the secondary access mode instead of the primary access mode. For instance, in some embodiments, the device is a touch-screen device that requires the user to perform a first touch gesture on a first page (e.g., a lock-screen page) of the device to gain access to the device's primary access mode or to a second page on which the user performs another operation (e.g., enters a passcode or performs another touch gesture) to gain access to the primary access mode. In some of these embodiments, the device provides a second touch gesture that can be performed on the first page or on the second page to cause the device to operate in the secondary access mode.

In addition, the device in some embodiments has fingerprint recognition technology that allows the user of the device to gain access to the primary access mode through fingerprint recognition. In some of these embodiments, the device initiates operation in its secondary access mode when a user attempts to access the device through fingerprint recognition but the fingerprint recognition fails. Alternatively or conjunctively, the device of some embodiments allows multiple fingerprints to be recorded for one user or multiple users, and allows one or more fingerprints to be recorded for initiating the primary access mode operation of the device while allowing one or more fingerprints to be recorded for initiating the secondary access mode operation of the device. In these embodiments, fingerprint recognition may launch the device in either the primary access mode or secondary access mode for different users. Some embodiments provide still other mechanisms for launching the device in the secondary access mode. Examples of these other mechanisms include voice commands, motion-based inputs, multi-tap inputs (e.g., multiple taps on a soft or physical button of the device), etc.

Different embodiments use different mechanisms to indicate that the device is operating in its secondary access mode. For instance, when operating in its secondary access mode, the device in some embodiments displays only the icons of the applications that are available in this mode. In some of these embodiments, the device removes the icons of the applications that are not available in the secondary mode, and re-arranges the available icons on the displayed pages to remove any positions that are empty because of removed icons. The device in some of these embodiments displays a dock that contains icons for a few applications. The device of some embodiments only displays the dock in the primary access mode. In the secondary mode, the device in these embodiments removes the dock and places, inline with other icons on a page, any dock icon of any application that is available in the secondary access mode. In some of these embodiments, the device reserves the first few icon slots on the first page of the secondary access mode for the available-application icons that are removed from the dock.

Instead of removing the icons of the applications that are not available in the secondary access mode, the device of some embodiments provides a deprecated (e.g., grayed out, reduced in size, etc.) display of the icons of the unavailable applications and makes these icons non-selectable items in its user interface. In the embodiments that restrict display or access to data in the secondary access mode, the device uses similar techniques that either do not display the unavailable data or display this data in a deprecated, unselectable form.

To provide additional indication that the device is operating in the secondary access mode, some embodiments change the background image used for the pages displayed during the secondary access page or provide textual indication on these pages regarding the operation of the device in the secondary access mode. For instance, in some embodiments, the device uses a default background image during the secondary mode that is different from the background image(s) used during the primary mode. Instead of using a default background image during the secondary access mode, the device of some embodiments might use in this mode a slightly or highly blurred and tinted version of the background image used in the primary access mode. Any background image used in the secondary mode might contain text or watermark text such as, secondary access mode, quick-access mode, shared mode, guest mode, or similar such words, to provide further textual indication of the secondary access operation of the device.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purposes of explanation, several embodiments of the invention are set forth in the following figures.

FIG. 30 provides an illustrative example of restricting access to private data in the secondary access mode that is accessible in the primary access mode of a mobile device.

FIG. 31 provides an illustrative example of restricting access to private data in the secondary access mode that is accessible in the primary access mode of a mobile device.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a mobile device with multiple access modes. The device in some embodiments has at least two access modes, a primary access mode and a secondary access mode, that provide different restrictions for accessing the applications and/or data stored on the device. In some embodiments, the primary access mode of the device provides unfettered access to all of the device's data and/or applications that are available to a user, while its secondary access mode provides access to a limited set of applications and/or data. In other words, when the device is operated in its secondary access mode, the user has access to a subset of applications and/or data but cannot access data and/or applications that are restricted during the secondary access mode. In addition to restricting access to certain applications in the secondary access mode, the device also restricts access to data stored by such restricted applications to applications (including the operating system of the device in some embodiments) that are not restricted in the secondary access mode.

Figure 1:
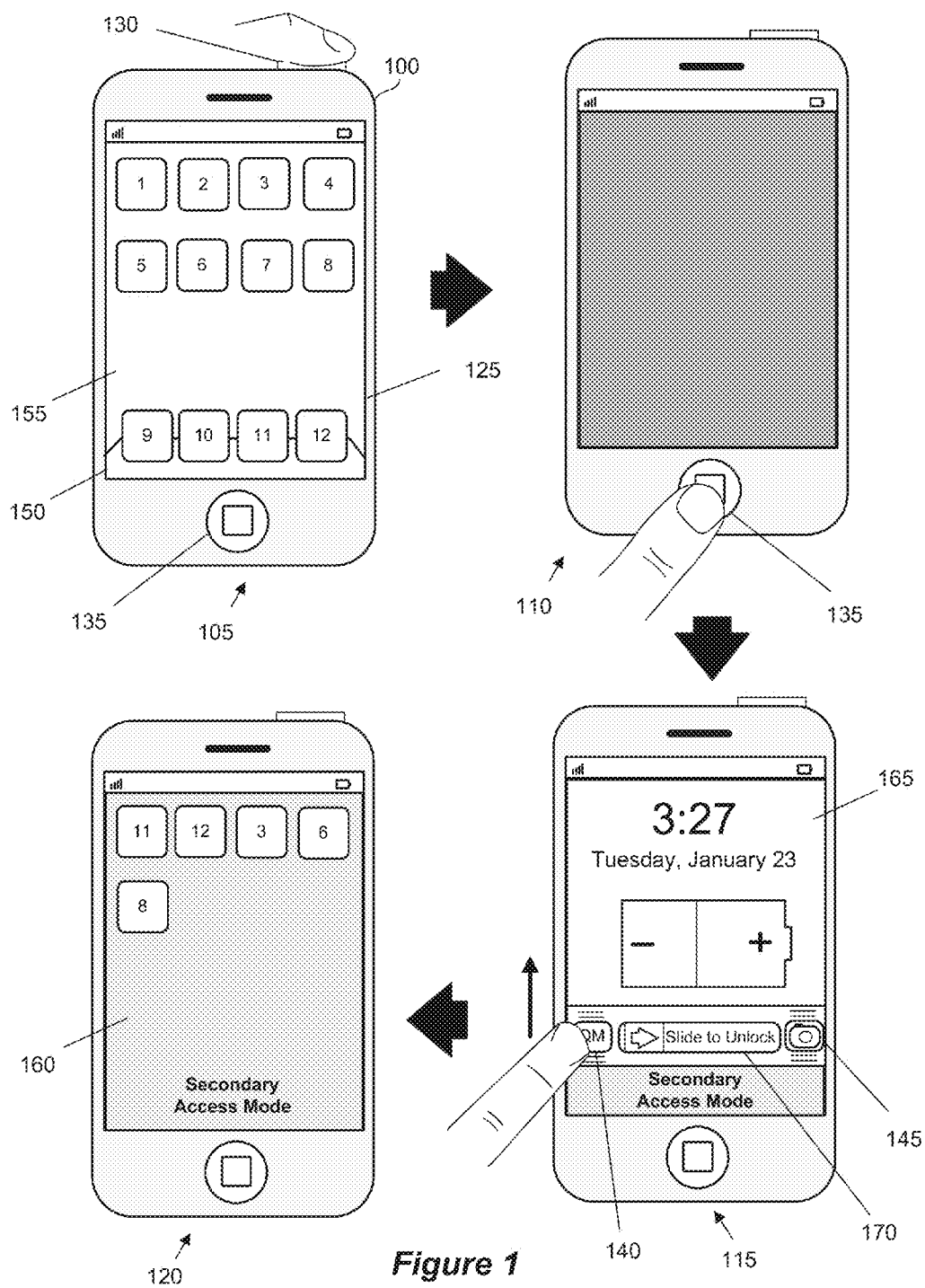
FIG. 1 illustrates an example of a mobile device with primary and secondary access modes.

FIG. 1 illustrates an example of a device 100 with primary and secondary access modes. This example is illustrated in terms of four stages 105-120 of operation of the device 100. In this example, as well as many other examples below, the device is a smart phone. However, one of ordinary skill in the art will realize that the discussion in this example as well as other examples discussed hereinafter is equally applicable to other kinds of mobile devices (e.g., a tablet, laptop, etc.) or any other electronic devices.

As illustrated in these stages, the device 100 has a touch-sensitive screen 125 and two physical affordances (i.e., the buttons 130 and 135). The touch-sensitive screen 125 displays (1) one or more pages on which application icons can be arranged, and (2) overlaying some or all of these pages, a dock 150 on which the icons of several key applications (e.g., phone, e-mail, browser and music applications) can be arranged. Through this screen 125, a user can touch-select an application icon to open or switch to a previously opened application, or can make other gestures to navigate between the pages of the device. The screen also presents the output display generated by an open application. The screen can be turned ON or OFF through the toggling of the physical button 130. In some embodiments, the screen can also be turned ON by pressing the physical button 135. This button 135 also allows the user to navigate between displays (e.g., between pages and/or applications) presented on the screen when the screen is turned ON, and to perform other functions (e.g., open up a voice command interface for directing the device to perform certain operations).

The first stage 105 presents the device 100 while it is operating in its primary access mode. In this mode, the user has access to all applications that execute on the device and that are available to a user of the device. The first stage 105 illustrates twelve available applications, eight of which are arranged in-line on a page displayed on the screen 125, and four of which are positioned in the dock 150. This stage also illustrates a user's finger engaging the ON/OFF button 130.

This engagement turns off the screen, as illustrated in the second stage 110. This stage also illustrates the user pressing the button 135, which turns on the screen 125, as illustrated by the third stage 115. The third stage illustrates a lock-screen page 165 of the device 100. This page provides a limited set of information and offers a limited set of functionalities of the device. Specifically, it illustrates the time and date, and the remaining charge on the device's battery. This page also presents three affordances (e.g., UI controls) for directing the device to perform three actions. The first affordance is shown as an unlock slider 170 for unlocking the device to gain access to the primary mode of the device. This unlock slider is part of the device's lock-screen protections that are meant to prevent its touch screen from inadvertently being activated. This slider works with the ON/OFF screen controls enabled by the buttons 130 and 135 and the limits on available lock-screen functionalities to establish the lock-screen protections of the device.

The second affordance is shown as camera unlock icon 145 that can be swiped with a touch-screen gesture to launch a camera application of the device. The third affordance is shown as secondary access mode control 140 that can be swiped with a touch-screen gesture to direct the device to operate in the secondary access mode. The third stage 115 illustrates such a gesture.

The fourth stage 120 illustrates the device after it has been launched in its secondary access mode as a result of the swiping gesture of the third stage. Specifically, this stage illustrates that when operating in its secondary access mode, the device 100 displays only the icons of the applications that are available in this mode and removes the icons of the applications that are not available in the secondary mode. The device re-arranges the available icons on the displayed pages to remove any positions that are empty because of removed icons. The device also removes the dock 150 and places on the displayed page the icon of any available application that was previously positioned in the dock. In some of these embodiments, the device reserves the first few icons slots on the first page of the secondary access mode for the available-application icons that are removed from the dock.

Accordingly, in the example illustrated in FIG. 1, the icons of the applications eleven and twelve that were shown in the dock 150 in the first stage 105 are moved to the first and second icon locations of the first page of the secondary access mode illustrated in the fourth stage 120. These two icons are followed by icons of the third, sixth, and eight applications, while the icons of the fourth, fifth, and seventh applications have been removed from the page, as these applications are not available in the secondary access mode. The icons for the eleventh, twelfth, third, sixth, and eight applications are placed in a contiguous icon arrangement that replaces icons of available applications for icons of unavailable applications while moving the icons of the available applications that were previously in the dock to the first few positions.

To provide additional indication that the device is operating in the secondary access mode, the device 100 changes the background image used for the pages displayed during the secondary access page and provides textual indication on these pages regarding the operation of the device in the secondary access mode. Specifically, in this example, the background image 160 of the secondary mode (illustrated in the fourth stage 120) is shown as a grey image, while the background image 155 of the primary mode (illustrated in the first stage 105) is shown as a white image to illustrate the use of different page background images to indicate different modes of operation. Also, in this example, the text "Secondary Access Mode" appears in place of the dock in the fourth stage 120 in order to provide additional textual indication of the device's operational mode.

While FIG. 1 illustrates one manner of providing an indication of the operational mode of the device, other embodiments use other manners to provide this indication. For instance, instead of using default background image during the secondary access mode, the device of some embodiments might use in this mode a slightly/highly blurred and/or tinted version of the background image used in the primary access mode. Also, in place of the textual indication in the location left empty by the removal of the dock, some embodiments might not provide any textual indication or might provide a different textual indication, e.g., may provide text that appears as a watermark across the background image, or provide different text, quick-access mode, shared mode, guest mode, kids mode, etc. Instead of removing the icons of the applications that are not available in the secondary access mode, the device of some embodiments also provides a deprecated (e.g., grayed out, reduced in size, etc.) display of the icons of the unavailable applications and makes these icons non-selectable items in its user interface. Several such alternative approaches to providing indication of the secondary access mode operation will be further described below.

Also, while FIG. 1 illustrates one manner for directing the device to operate in the secondary access mode, other embodiments use other manners to direct the device to operate in the secondary access mode. For instance, in some embodiments, the device requires the user to perform a first touch gesture on a first lock-screen page to gain access to a second page on which the user can enter a passcode or gesture to gain access to the primary access mode, or performs another touch gesture to gain access to the secondary access mode. In addition, the device in some embodiments has fingerprint recognition technology that allows the user of the device to gain access to the primary access mode through fingerprint recognition. In some of these embodiments, the device initiates operation in its secondary access mode when a user attempts to access the device through fingerprint recognition but the fingerprint recognition fails. Alternatively or conjunctively, the device of some embodiments allows multiple fingerprints to be recorded for one user or multiple users, and allows one or more fingerprints to be recorded for initiating the primary access mode operation of the device while allowing one or more fingerprints to be recorded for initiating the secondary access mode operation of the device. In these embodiments, fingerprint recognition may launch the device in either the primary access mode or secondary access mode for different users. Some embodiments provide still other mechanisms for launching the device in the secondary access mode. Examples of these other mechanisms include voice commands, motion-based inputs, multi-tap inputs (e.g., multiple taps on a soft or physical button of the device), etc. Several such alternative approaches to initiating the secondary access mode operation will be further described below.

The secondary access mode illustrated in FIG. 1 has several benefits. One benefit is that it allows the device's user to share his device with another, without letting the other person access the user's private data or access services of the device that the user does not wish to share with that person. Another benefit is to allow the device's user to share the device with children while restricting the children's access to certain applications or data (e.g., photos, documents, emails, etc.) on the device. Still another benefit is to allow the device's user to gain quick access to certain applications on the device without providing the input necessary to gain access to the device's primary access mode. Often such input slows access to the device because it requires a precise operation (e.g., requires input of a precise passcode or gesture) that might not be easy to perform in all circumstances. For example, a user may wish to quickly open a notepad application with a grocery list when grocery shopping or open a map application when traveling without the hassle of entering the owner's passcode. The secondary access mode operation of the device facilitates such quick access of the device.

In some embodiments, three or more applications can be accessed in the secondary access mode of the device. The number of applications accessible in the secondary access mode (1) is pre-defined and static in some embodiments, (2) is pre-defined but user-customizable in other embodiments, and (3) is purely user-specified in still other embodiments.

Figure 2:
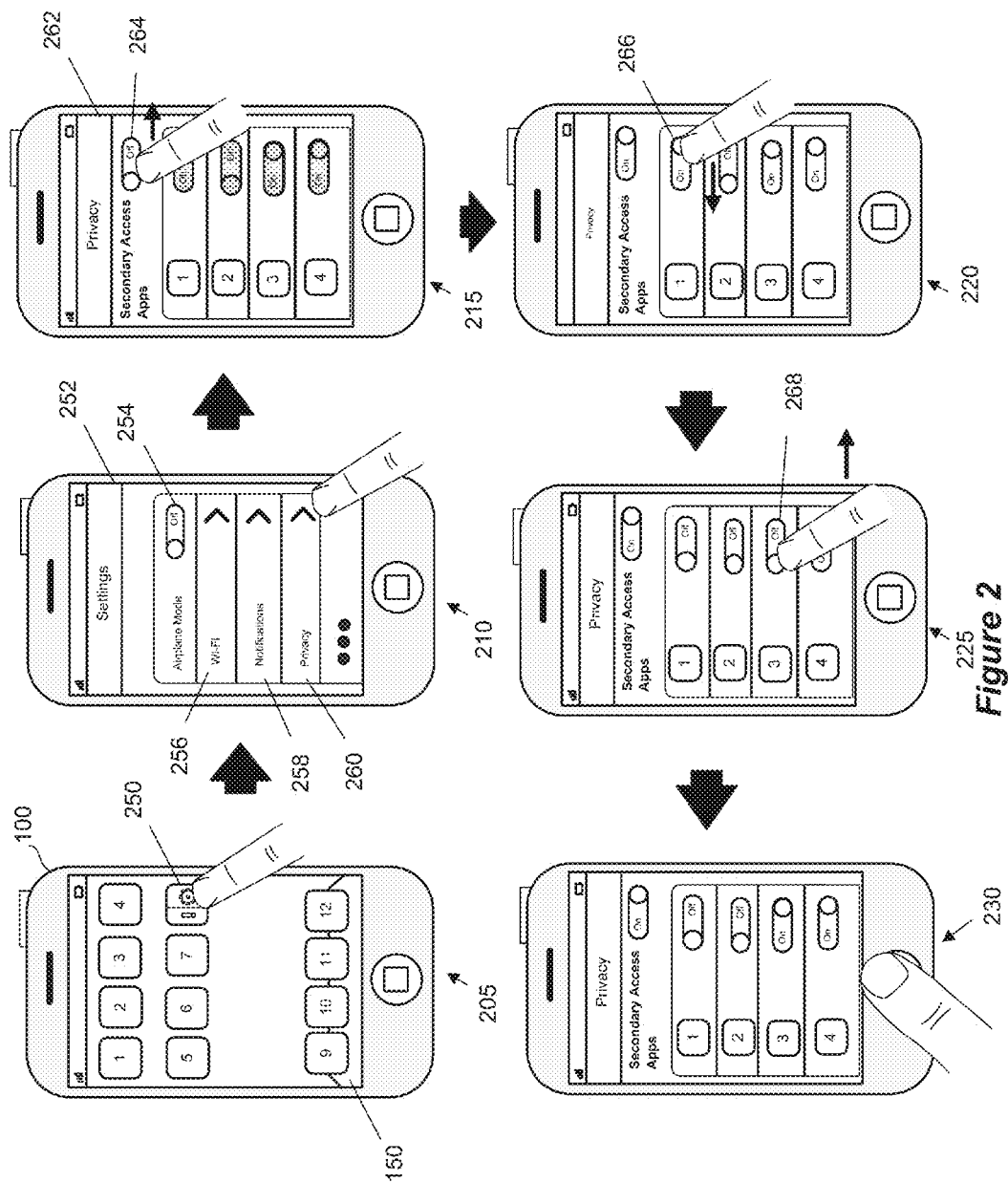
FIG. 2 illustrates one manner of enabling the secondary access mode and applications that are accessible in this mode.

In some embodiments, the secondary access mode is always enabled, while in other embodiments it is a mode that can be enabled or disabled by a user of the primary access mode. Different embodiments provide different mechanisms for a user to enable secondary access mode, and/or to specify applications and/or data that are available during the secondary access mode. FIG. 2 illustrates one manner of enabling the secondary access mode and applications that are accessible in this mode. This figure illustrates the performance of these tasks in terms of six operational stages 205-230 of the mobile device 100 that was described above by reference to FIG. 1.

The first stage 205 illustrates the device 100 operating in its primary access mode and displaying a page that contains eight application icons and an overlaid dock 150 with four application icons. This stage also shows the user's touch selection of an icon 250 to launch the settings menu of the device's operating system.

The second stage 210 illustrates an example settings menu 252 of the device 100. The settings menu 252 includes several different affordances (e.g., menu items). For example, the menu 252 includes a first affordance 254 (e.g., a control) for turning on or off airplane mode, a second affordance 256 (e.g., a wireless network selectable item) for navigating to a sub-menu for setting wireless network connection (e.g., Wi-Fi network connection), a third affordance 258 (e.g., a notification selectable item) for navigating to a sub-menu for specifying various notification policies, and a fourth affordance 260 (e.g., a privacy selectable item) for navigating to a sub-menu for specifying various privacy policies. The second stage 210 shows the user's touch selection of the fourth affordance 260 to navigate to the privacy sub-menu.

The third stage 215 shows that this selection causes the device to display the privacy sub-menu, menu 262, which in this example includes various affordances (e.g., controls) related to the secondary access mode. One of these affordances is represented as an ON/OFF switch 264 that can turn the secondary access mode feature on or off. When the device transitions to the third stage 215 from the second stage 210, the switch 264 is off. While this switch is off, the device cannot be operated in the secondary access mode. When this switch is turned on, the secondary access mode feature is available. A user, however, still has to direct the device to operate in the secondary access mode, e.g., by performing the sequence of operations illustrated in FIG. 1.

In some embodiments, the default position of this switch 264 is off because the user has to affirmatively enable the secondary access mode feature, while in other embodiments the default position of this switch is on. Near this switch, the privacy menu in some embodiments includes text that describes that the user can choose below different applications that are accessible in the secondary access mode. Alternatively, the description may indicate that the user can choose different applications that are inaccessible in the guest mode. In some embodiments, this text is only presented when the user turns the switch 264 on in order to turn on the secondary access mode feature.

In addition to the switch 264, the third stage illustrates a list of applications that can be enabled/disabled for the secondary access mode and an enabling switch for enabling each listed application to operate in the secondary access mode. In some embodiments, a user can scroll the privacy menu up and down to see all the applications that are in this list. In some embodiments, applications that are enabled in this list for inclusion in the secondary access mode form a whitelist of applications that can be accessed during this mode, while the applications that are disabled in this list form a blacklist of applications that cannot be accessed during this mode and cannot have their data accessible to any applications on the whitelist.

In the example illustrated in FIG. 2, the enabling affordances (e.g., switches) are not selectable in the third stage because the switch 264 is turned off and the secondary access mode feature has not been enabled. In other embodiments, these affordances might not even be displayed when the switch 264 is turned off. In still other embodiments, these affordances are displayed and are selectable even when the switch 264 is turned off.

The third stage 215 shows the user turning on the secondary access mode feature. In this example, the turning on of the secondary access mode feature makes the enabling affordances (e.g., switches) for the applications selectable. The fourth and fifth stages 220 and 225 then illustrate the user toggling off the switch 266 for a first application and toggling on the switch 268 for a third application. The sixth stage 230 then shows the resulting list of applications that are enabled and disabled for the secondary access mode. In this example, the sixth stage shows the first and second applications as being disabled (i.e., restricted) from the secondary access mode, while the third and fourth applications are enabled for this mode.

While the example illustrated in FIG. 2 is described with a particular set of details, one of ordinary skill in the art will realize that other embodiments provide other mechanisms or affordances for turning on the secondary access mode feature and/or for including applications in this mode. For instance, in the example above, switches are the affordances for turning on the secondary access mode feature and for including applications in this mode. Other embodiment, however, use other touch-screen affordances (i.e., controls) for some or all of these operations (e.g., utilize buttons, checkboxes, etc.), or use other controls altogether (i.e., voice controls, etc.) for some or all of these operations. Yet other embodiments provide controls for enabling in the secondary access mode groups of applications (e.g., game applications, communication applications, social media applications, etc.). The device's operating system in these or other embodiments further provides controls for enabling access to different pieces of content data (e.g., to different pictures, contacts, etc.) during the secondary access mode.

In addition to these manual controls for a user, some embodiments employ heuristics to intelligently determine whether each application that is installed on the computing device should be accessible in the secondary access mode or should be kept private. This may entail identifying rating information and/or identifying the description of the content associated with the application. In conjunction with the automatic determination, the device of some embodiments allows a user to define a whitelist that contains a list of applications that are accessible in the secondary access mode. Several such alternative embodiments are further described below.

Figure 3:
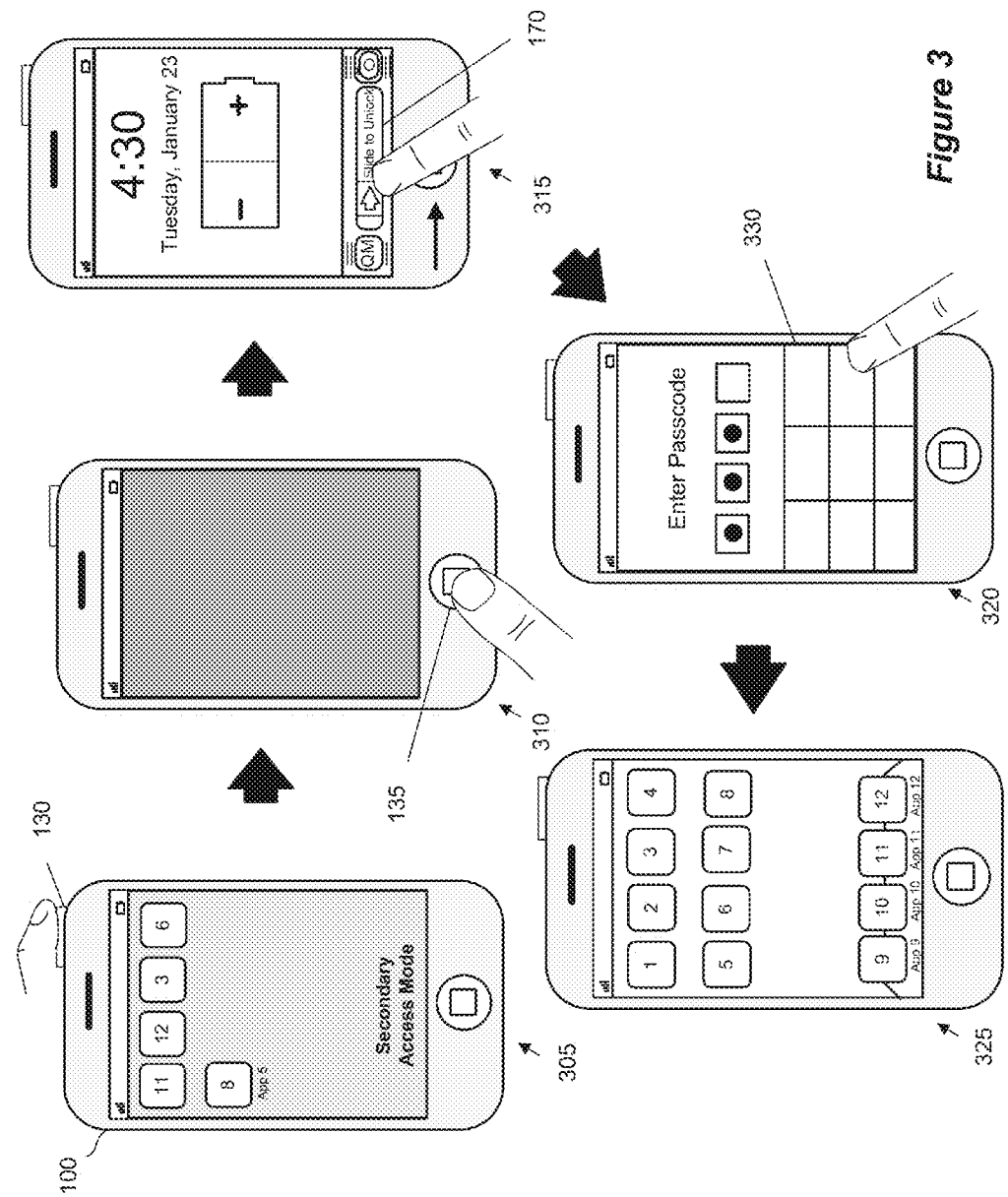
FIG. 3 provides one approach for exiting the secondary access mode of the device.

Different embodiments provide different mechanisms for exiting the secondary access mode of the device. FIG. 3 illustrates one approach for exiting the secondary access mode of the device. In this approach, the user can exit the secondary access mode by turning off the screen and then providing the user's passcode the next time the user accesses the device. This figure illustrates this approach in terms of five stages of operation 305, 310, 315, 320, and 325 of the device 100 of FIG. 1. The first stage 305 corresponds to the above-described fourth stage 120 of FIG. 1. In the first stage 305, the device operates in its secondary access mode, as indicated by the textual indication of "Secondary Access Mode" in place of the dock 150. The first stage 305 also shows the user pressing the ON/OFF button 130 to turn off the screen.

The second stage 310 illustrates the device after its screen has been turned off. It also shows the user pressing the home button 135 to turn the screen back on. The third stage 315 shows that in response to the pressing of the button 135, the device turns on its screen and presents its lock-screen display, which is similar to the lock-screen display described above by reference to the third stage 115 of FIG. 1. The third stage also shows the user sliding the slider 170 to unlock the device.

The fourth stage 320 then shows the passcode screen 330 is presented to the user upon the sliding of the slider affordance 170 towards unlock position. In some embodiments, the user has to provide this passcode in order to direct the device to launch its operation in its primary access mode. This stage also shows the user entering his passcode, which launches the operation of the device in its primary access mode, as illustrated by the fifth stage 325. As shown in the fifth stage 325, the primary access mode has the dock 150 and the icons arranged as in the first stage 105 of FIG. 1.

One of ordinary skill in the art will realize that instead of employing this passcode, other embodiments allow the user to unlock the device with other custom touch or gesture operations. Instead of defining the screen unlock and passcode operations as two separate operations that are performed through two separate screens, other embodiments combine the unlock and primary-access entry operations into one operation that is performed in one screen. For instance, the unlock operation can be a touch gesture operation that follows a particular pattern on the touch code screen, and this operation allows the user to gain access to the primary access mode.

Figure 4:
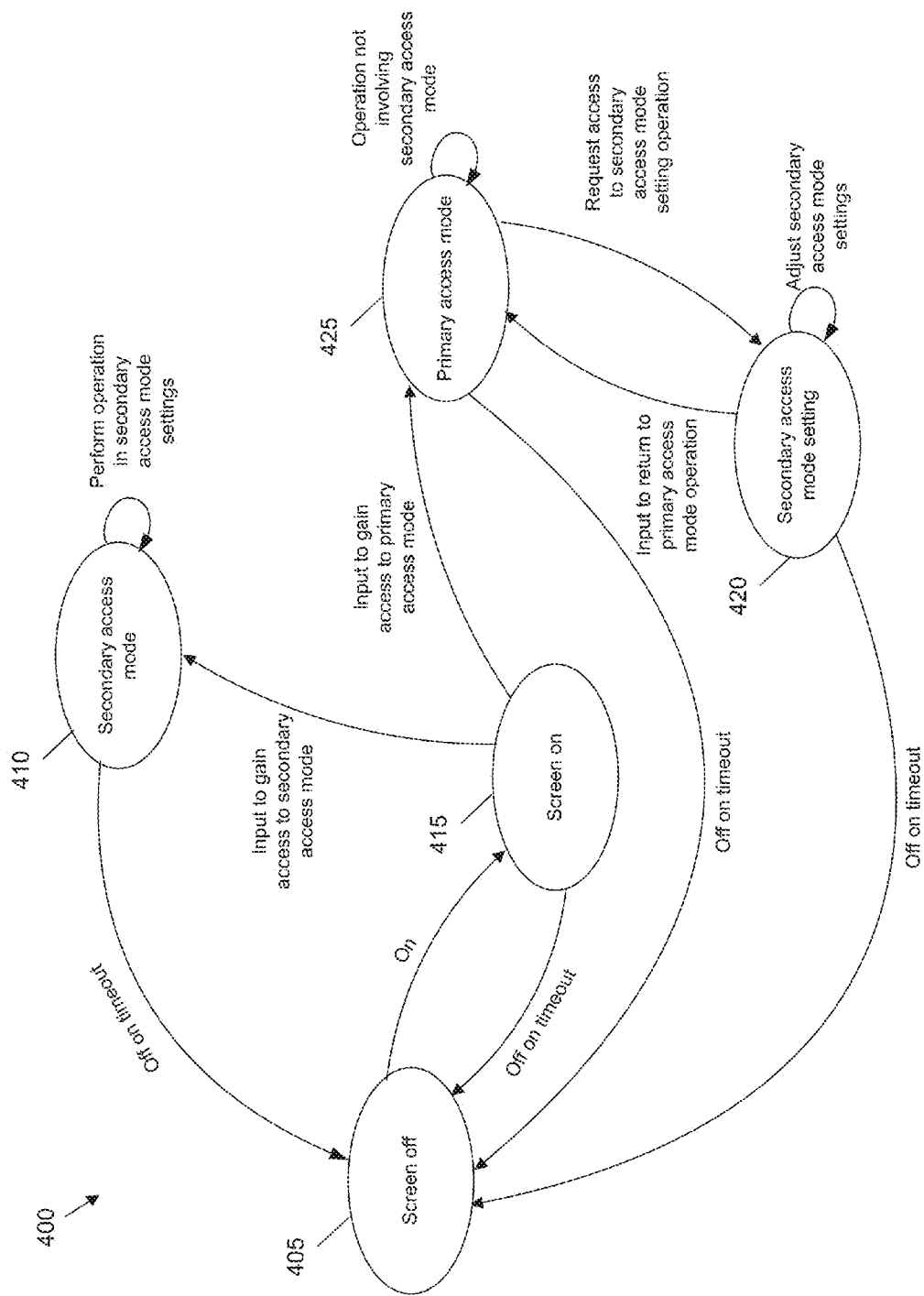
FIG. 4 presents a state diagram that illustrates the interactions between several processes of the device of some embodiments that enable the secondary access mode, customize it to the desires of a particular user, and perform operations during this mode.

FIG. 4 presents a state diagram 400 that illustrates the interactions between several processes of the device 100 of some embodiments that enable the secondary access mode, customize it to the desires of a particular user, and perform operations during this mode. This figure shows five states that collectively perform these operations. Each of the states represents a set of one or more processes for performing a subset of the operations.

The five states are a screen off state 405, a screen on state 415, a primary access mode (PAM) state 425, a secondary access mode (SAM) state 410, and a SAM configuration state 420. The screen off state 405 represents the set of processes running on the device while the screen of the device is OFF. These processes in some embodiments include processes for (1) handling input while the device is in its lower-powered mode (e.g., a sleep mode associated with the screen off state), (2) handling notifications from other applications running on the device, and (3) handling real-time communications through the device while the screen is locked.

In some embodiments, the device transitions from the screen off state 405 to the screen on state 415 when the user engages either of the buttons 130 and 135 of FIG. 1, when the device receives a communication (e.g., a call), or when the device provides a notification (e.g., of a meeting, or a received communication, such as an e-mail, text message, etc.). The screen off state 405 represents the set of processes running on the device while the screen of the device is ON but the screen is locked and requires a passcode or gesture to unlock. These processes in some embodiments include a subset of the processes running during the screen OFF state.

From the screen ON state 415 the process transitions back to the screen OFF state 405 (1) when the user engages one of or either of the buttons 130 and 135, or (2) after a period in which the screen has been ON without any user input. From the screen ON state 415, the process also transitions to the PAM state 425 when the device receives input from a user to gain access to the primary access mode. In some embodiments, this input is a combination of the sliding operation followed by the passcode operation illustrated in stages 315 and 320 of FIG. 3. In other embodiments, this input is just a touch gesture operation (e.g., a simple swipe, a combination of swipes, or a touch contact that follows a particular pattern, etc.) that unlocks the device's PAM operation. In some embodiments, the passcode or touch gesture operation are operations only known to the primary user of the device or a few users in addition to the primary user who have been approved (e.g., by the primary user) to have access to the primary mode of the device.

It should be noted that in some embodiments, the device might or might not have enabled a lock-screen protection that requires a passcode or pass gesture operation. In these embodiments, the device transitions to the PAM state 425 directly from the screen OFF state 405 when the user engages either of the buttons 130 and 135, when the device receives a communication (e.g., a call), and/or when the device provides a notification (e.g., of a meeting, or a received communication, such as an e-mail, text message, etc.). However, this transition is not illustrated in FIG. 4 as it is as relevant to the secondary access mode configuration or operation of the device in some embodiments, because in these embodiments the secondary access mode is only enabled when the device has some mechanism (e.g., passcode or pass gesture) to ensure that it is locked when it is not in use.

The PAM state 425 represents all the processes that the unlocked device performs when it is not in the secondary access mode and it is not configuring the secondary access mode. Accordingly, all PAM operations that do not turn off the screen and do not configure the SAM settings keep the device in the primary access state 425. When the screen turns off through an affirmative action of the user or through the expiration of a timer that measures the device's period of inactivity, the device transitions from state 425 to the screen OFF state 405.

On the other hand, when the device receives input to review or adjust its SAM settings while it is operating in the PAM state 425, the device transitions to SAM configuration state 420. This input can be in the form of selections illustrated in the stages 205 and 210 of FIG. 2, or it can be through other input received through touch, voice, etc. input interface, as further described below. The SAM configuration state 420 in some embodiments is part of the PAM operation of the device. However, in FIG. 4, it is shown separate from the PAM state 425 to highlight the specific SAM configuration state of the primary access mode.

Once the device is in the SAM configuration state 420, the user can review and adjust SAM configuration values. In some embodiments, the device remains in this state after each adjustment to these values. The device leaves this state and returns to the PAM state 425 when it receives input (e.g., touch input, voice input, etc.) indicating that the review and/or configuration of the SAM state has been completed. Alternatively, the device returns to the screen off state 405 when the screen turns off through an affirmative action of the user or through the expiration of a timer that measures the device's period of inactivity.

As mentioned above, the device can transition to the screen OFF state 405 and the primary access mode state 425 from the screen ON state 415. From this state 415, the device can also transition to the secondary access mode state 410 when it receives input to gain access to the secondary access mode. As mentioned above by reference to FIG. 1, the transition to the secondary access mode can be facilitated by an affordance on the same ON screen that displays the affordance or one of the affordances for gaining access to the primary access mode of the device.

Once in the SAM state 410, the device remains in this state for all operations performed in this state by the user, except for the screen OFF operation. When the user turns off the screen, or after the expiration of a timer that measures the period of inactivity during the secondary access mode, the device returns to the screen OFF state 405.

One of ordinary skill in the art will realize that the state diagram 400 simplifies the operation of the device for purposes of the highlighting the SAM configuration and operation of the device. Other states of the device are not shown in this diagram. For instance, this diagram does not show the OFF state of the device that can be directed in any one of five states illustrated in FIG. 4 through user input (e.g., touch input, key input, voice input, etc.). From the OFF state 405, the device transitions to the screen ON state 415 in some embodiments, when it is turned on. One of ordinary skill in the art will also realize that the device in other embodiments has different states or different state transitions as it operates differently.

As mentioned above, different embodiments provide different mechanisms for directing the device to operate in the secondary access mode instead of the primary access mode. For instance, in some embodiments, the device is a touch-screen device that requires the user to perform a first touch gesture on a first page (e.g., a lock-screen page) of the device to gain access to the device's primary access mode or to a second page (e.g., a passcode page) on which the user performs another operation (e.g., enters a passcode or performs another touch gesture) to gain access to the primary access mode. In some of these embodiments, the device provides a second touch gesture that can be performed on the first page or on the second page to cause the device to operate in the secondary access mode. Several examples of these different mechanisms will now be described by reference to FIGS. 5-24.

Figure 5:
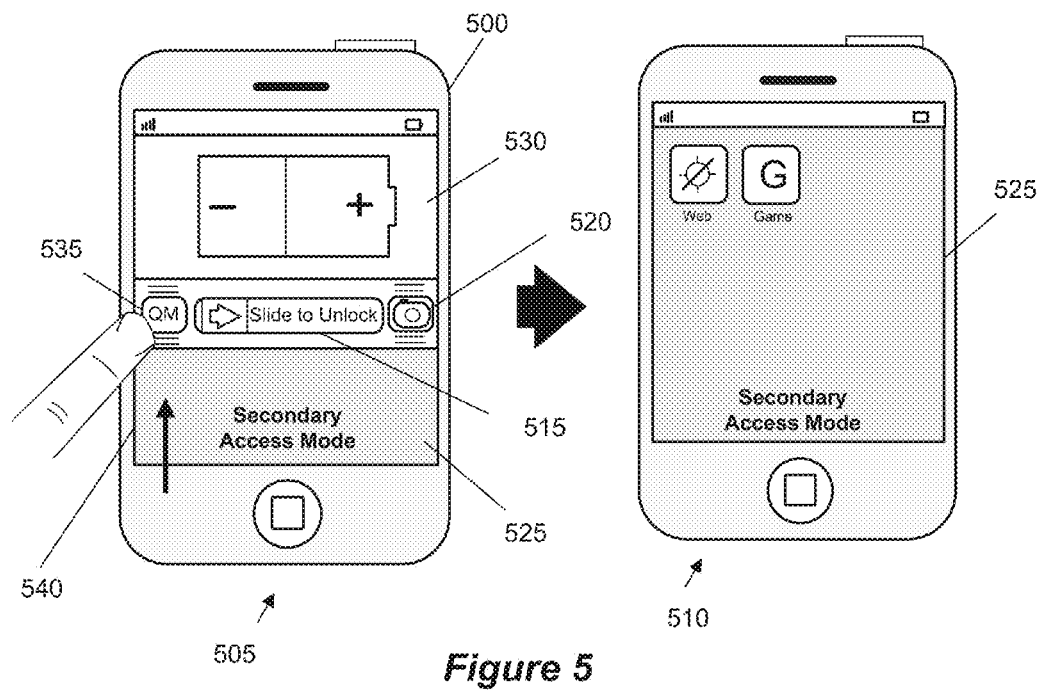
FIG. 5 illustrates an example of a touch gesture on a lock-screen page of a mobile device to unlock the device in a secondary access mode.

FIG. 5 illustrates an example of a touch gesture that can be performed on a lock-screen page 530 to unlock a mobile device 500 and place it in the secondary access mode 525. Two operational stages 505 and 510 of the mobile device 500 are shown in this figure. The lock screen page 530 is the same as the one described above by reference to FIG. 1. Specifically, this page presents three affordances (e.g., user interface controls) for directing the device to perform three actions. The first affordance is shown as an unlock slider 515 for unlocking the device to gain access to the primary access mode of the device. The second affordance is shown as a camera unlock icon 520 that can be swiped with a touch gesture to launch a camera application of the device. The third affordance is presented as a secondary access mode control 535 that can be swiped with a touch-screen gesture to direct the device to operate in the secondary access mode.

In the first stage 505, the user performs a touch gesture to unlock the device to the secondary access mode. Specifically, the user places the user's finger on the slider affordance 535 for entering the secondary access mode, and swipes or slides the user's finger vertically on the device's touch-sensitive screen 540. The touch gesture in turn causes the lock screen page 530 to slide up with the affordance 535.

As the lock screen page 530 slides up, a preview of the secondary access mode interface is shown. Specifically, as the lock screen slides up, the secondary access mode interface starts to become visible along the bottom of the display's touch-sensitive screen, and continues to be more and more visible until it is fully visible when the sliding operation ends. One primary reason for receiving such a touch gesture (e.g., swipe gesture) on the lock screen page 530 is that it is more difficult to replicate than a tap gesture. That is, the touch gesture prevents the device from unlocking to the secondary access mode when the touch-sensitive screen has been inadvertently tapped. One of ordinary skill in the art would realize that the gesture shown in stage 505 is just one example gesture and different touch gestures can be performed to gain access to the device in the secondary access mode.

The second stage 510 illustrates the device 500 after it has been launched in its secondary access mode 525 as a result of the touch gesture of the first stage 505. Specifically, this stage illustrates that when operating in its secondary access mode, the device 500 of some embodiments displays only the icons of the applications that are available in this mode and removes the icons of the applications that are not available in the secondary access mode. As mentioned above, the device of some embodiments re-arranges the available icons on the displayed pages to remove any positions that are empty because of removed icons. The device may also remove the dock and place on the displayed page the icon of any available application that was previously positioned in the dock.

Figure 6:
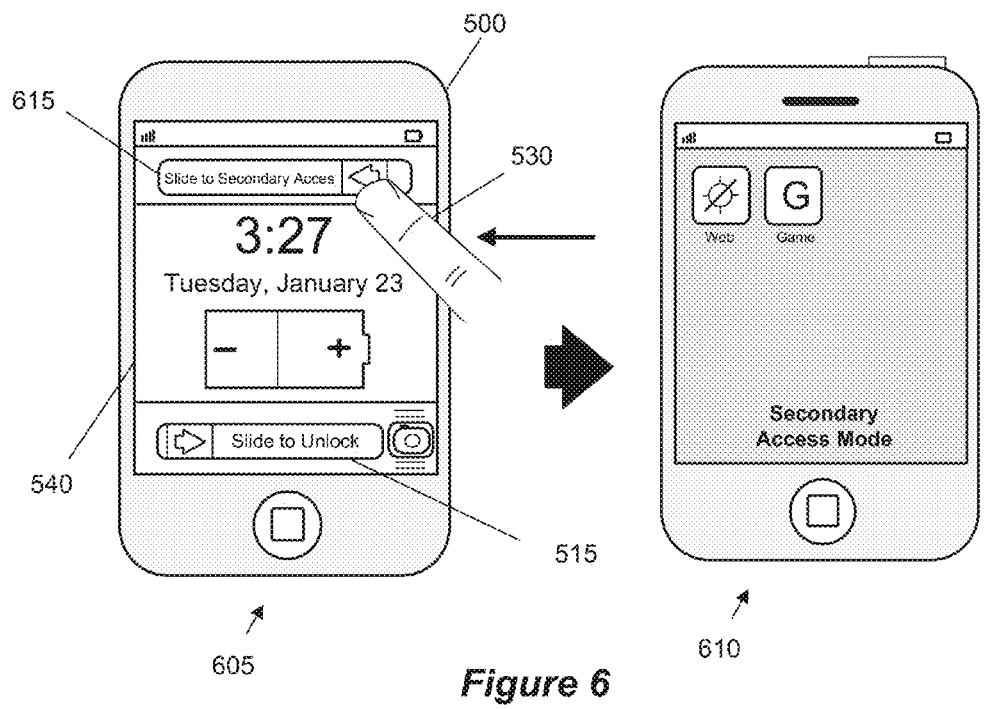
FIG. 6 illustrates an example of a touch gesture on a lock-screen page of a mobile device to unlock the device in a secondary access mode.

FIG. 6 illustrates another example of using the lock screen page 530 to gain access to the device in the secondary access mode. Two operational stages 605 and 610 of the mobile device 500 are shown in this figure. Different from the previous example, the lock screen page 530 includes a slider affordance 615 for unlocking the device to gain access to the secondary access mode. This is in addition to the slider affordance 515 for unlocking the device to the primary access mode.

In the first stage 605, the device is displaying the lock screen page 530 on its touch-sensitive screen 540. To place the device in the secondary access mode, the user selects the slider affordance 615 and performs a touch-based gesture on the slider affordance 615 (e.g., by tapping and holding a slider handle with the user's finger and dragging the finger across the screen such that the handle is moved along a slider bar from one end to the other end). As illustrated in the second stage 610, the input of the touch-based gesture causes the device 500 to be unlocked to the secondary access mode 525.

In the previous two examples, the user gains quick access to a mobile device through an affordance on a first page (e.g., a lock-screen page) of the device. The user does not have to enter a touch code (e.g., a passcode, a pattern code) to unlock the device. That is, the quick access mode of some embodiments allows the user to bypass security (e.g., user authentication or touch code entry). Instead, the user can simply select an affordance to unlock the device and use the device as it operates in the secondary access mode (e.g., with a limited number of applications).

Alternatively, or conjunctively with the first page access, the mobile device of some embodiments allows the user gain access to the device in the secondary access mode using a second page. In some embodiments, the second page is a passcode page that allows the user to enter a passcode or perform another touch gesture to gain access to the device in the secondary access mode. Several examples of second page access will now be described by reference to FIGS. 7 and 8.

Figure 7:
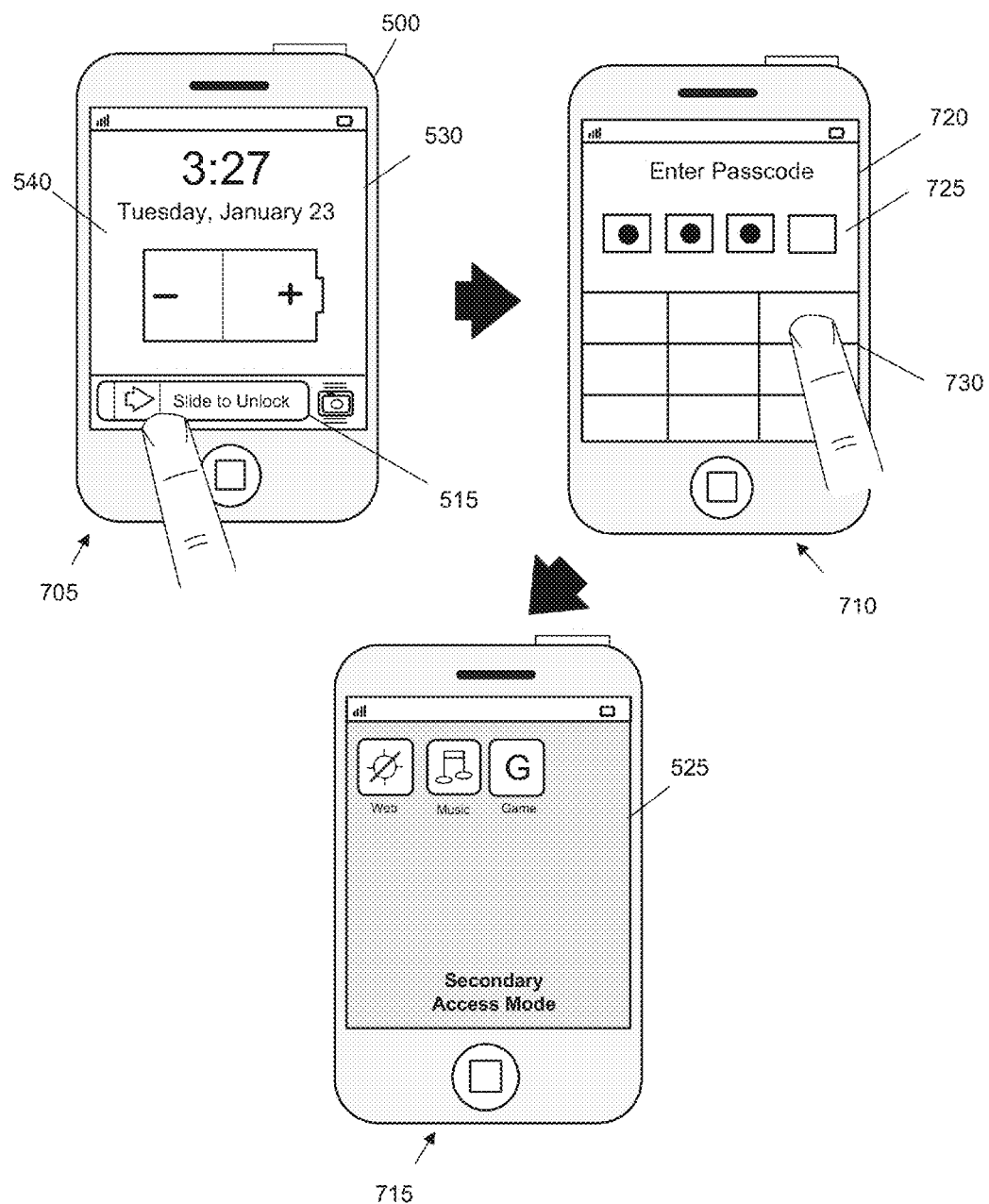
FIG. 7 provides an illustrative example of placing a mobile device in a secondary access mode through a passcode.

FIG. 7 provides an illustrative example of placing the mobile device 500 in the secondary access mode through a passcode. Three operational stages 705-715 of the device are shown in this figure. In this example, the device is associated with multiple passcodes: one for gaining access to the device in the primary access mode and another for gaining access to the device in the secondary access mode. In some embodiments, the device provides a passcode menu to set these passcodes. The passcode menu of some embodiments allows the user to set the secondary access passcode only when the primary access passcode has been set and the passcode feature has been turned on.

The first stage 705 of FIG. 7 presents the device 500 while the lock screen page 530 is being displayed on the device's display screen 540. In the first stage, the user performs a touch gesture on the slider affordance 515 that is shown on the lock-screen page to navigate to the passcode page 720. The gesture input causes the device to display the passcode page 720, as illustrated in the second stage 710.

The second stage 710 illustrates the passcode page 720 of the device 500. The passcode page is labeled with a heading that instructs the user to enter a passcode. The page includes a code panel 730 for inputting passcode. The page also shows different fields 725 that are populated with each input. These fields provide a visual indication of the number of entry that the device has received but do not reveal the codes (i.e., the passcode values). For example, each field is populated when the device receives one key input through the code panel 730. In the second stage 710, the user inputs the passcode using the panel. As shown in the third stage 715, the input of the correct passcode (i.e., the secondary access mode passcode) results in the device being unlocked to the secondary access mode 525.

Figure 8:
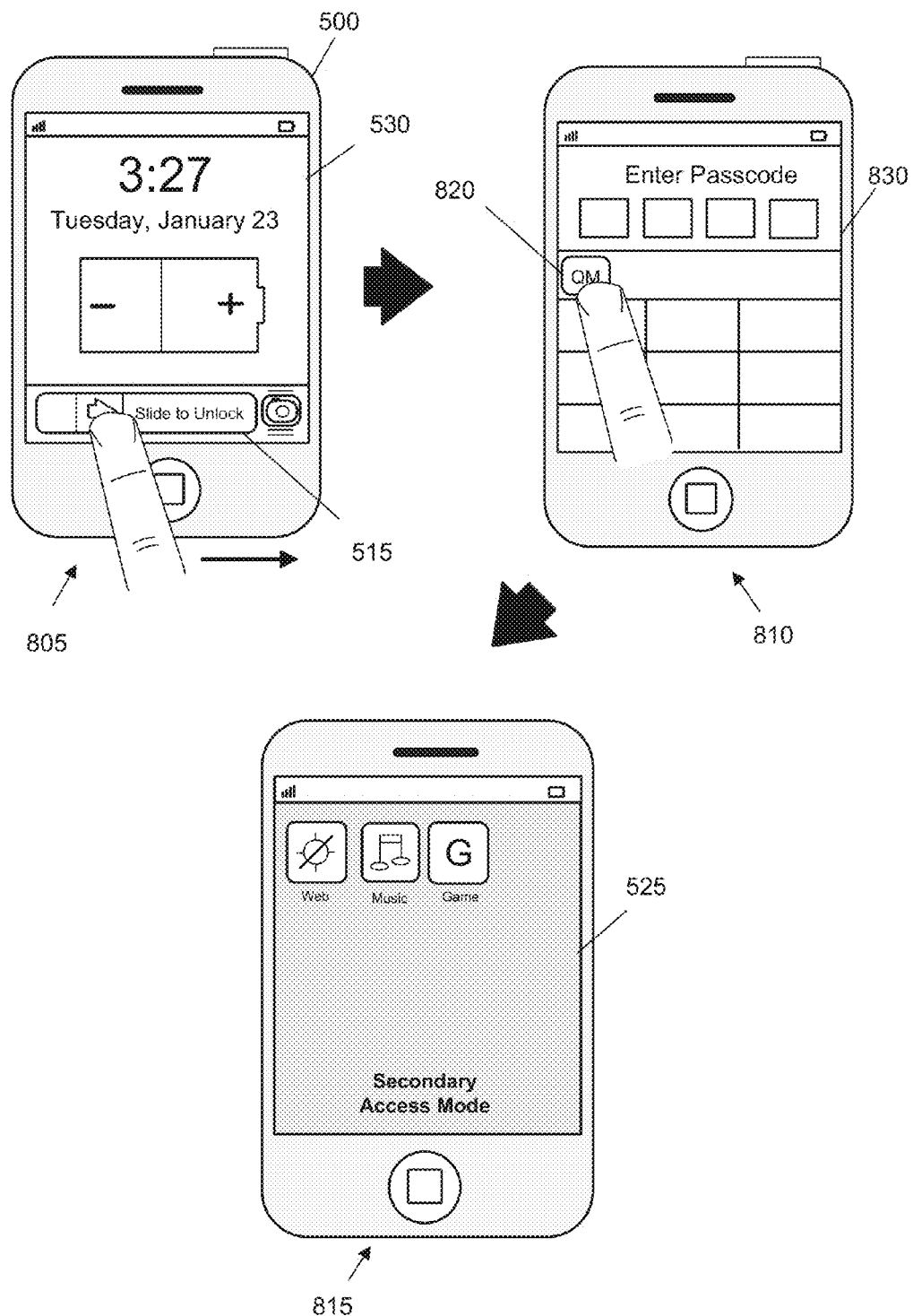
FIG. 8 provides an illustrative example of placing a mobile device in a secondary access mode through a passcode.

FIG. 8 illustrates another example of placing the mobile device in the secondary access mode using the passcode page. Specifically, this figure illustrates in three operational stages 805-815 how the device's user can interact with an affordance on the passcode page to gain access to the device in the secondary access mode.

The first stage 805 illustrates the device displaying its lock screen page. Here, the user performs a touch gesture on the slider affordance 515 that is shown on the lock-screen page to navigate to the passcode page 830. The gesture input causes the device to display the passcode page, as illustrated in the second stage 810. The passcode page 830 includes an affordance 820 to gain access to the device in the secondary access mode. In this example, the affordance is shown as a selectable item (e.g., a button).

The second stage 810 also illustrates the selection of the affordance 820. As a result of the selection, the device 500 is unlocked, in the third stage 815, to the secondary access mode. Similar to previous examples, the device's screen displays only the icons of the applications that are available in this secondary mode and removes the icons of the applications that are not available in the secondary mode.

In some embodiments, the device provides a secondary access mode lock screen. This lock screen is only shown after the device has been placed in the secondary access mode and then locked. This screen is particularly useful because it forces the user to passcode out of the secondary access mode session. It also prevents access to the device in the primary access mode in cases where the device is associated with a passcode grace period. For example, a device can be associated with a grace period (e.g., 1 minute, 30 minutes, 1 hour, etc.) in which the passcode is not required. When that device has been unlocked to a secondary access mode session and then locked, and the grace period has not passed since the last time the device was unlocked to the primary access mode, any person can access the device in the primary and the secondary access mode. Accordingly, this secondary lock screen forces a person to input a passcode in order to access the device in the primary access mode.

Figure 9:
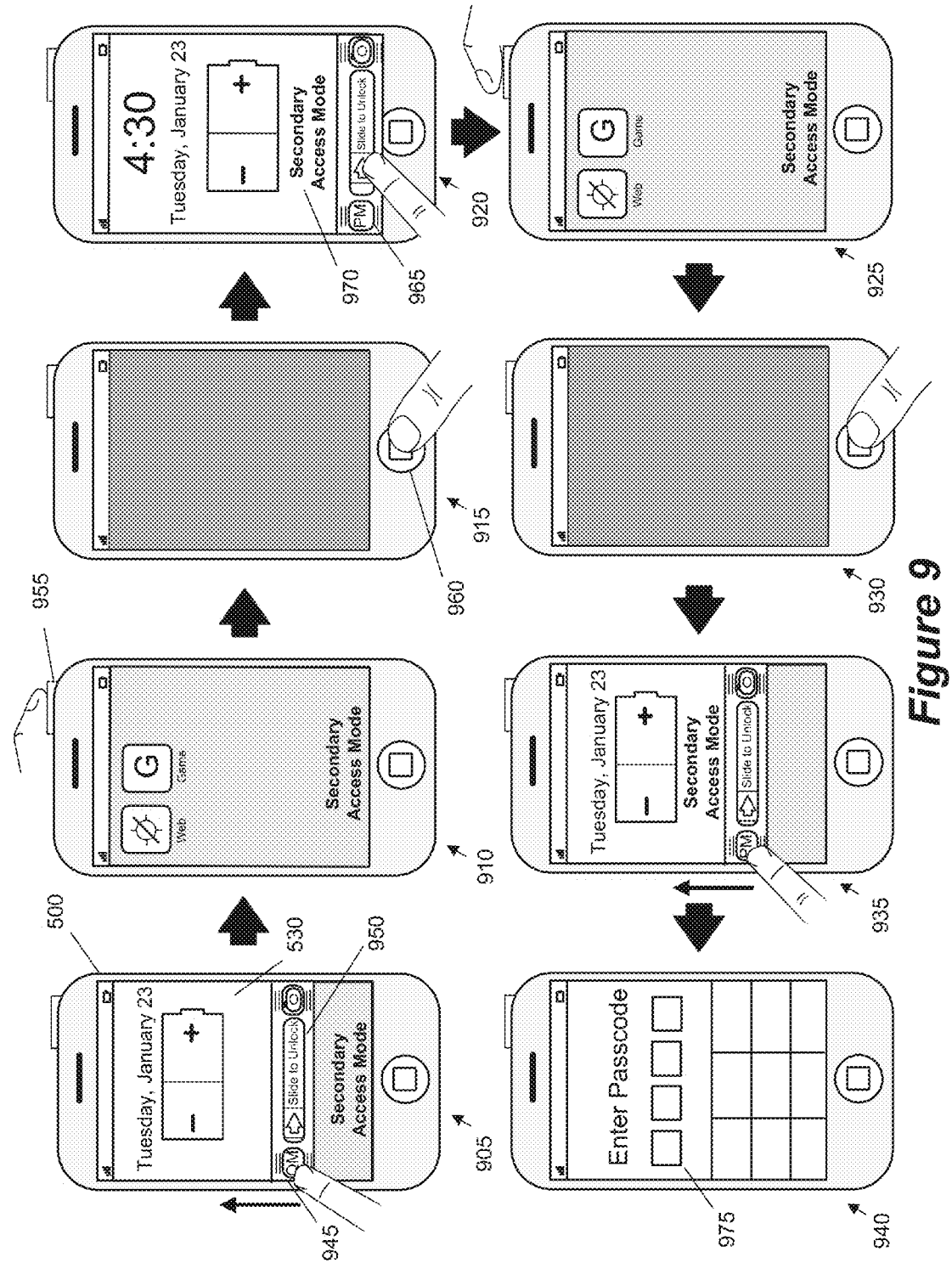
FIG. 9 illustrates an example of unlocking the mobile device using a secondary access mode lock page.

FIG. 9 illustrates an example of unlocking the mobile device using a secondary access mode lock page 530. This example is illustrated in terms of eight stages 905-940 of operations of the device 500. The first stage 905 illustrates a primary access mode lock-screen page 530 of the device 500. The page includes an affordance 945 (e.g., a secondary access mode control) to unlock the device to the secondary access mode and a slider affordance 950 (e.g., a unlock slider) to show a passcode page.

In the first stage 905, the user selects the affordance 945 to unlock the device and place it in the secondary access mode. The second stage illustrates the device operating in the secondary access mode. Here, the user selects the affordance 955 (e.g., the power button) to lock the device. The third stage 915 illustrates the device after it has been locked. The selection of the affordance 955 causes the device's screen to be turned off, as illustrated in the third stage. This stage also illustrates the user pressing the home button 960, which turns the device's screen back on, as illustrated by the fourth stage 920.

The fourth stage 920 illustrates a secondary access mode lock-screen page 530 of the device 500. This lock screen is similar to the one shown in the first stage 905. However, the affordances (e.g., the secondary access mode control and the unlock slider) are now inverted or switched in the secondary access mode. That is, the slider affordance is now used to unlock the device to the secondary access mode and the affordance 965 (the primary access mode control) is used to show the passcode page to gain access back to the primary mode.

In addition to the affordances that are switched, the secondary access mode lock screen page provides a visual indication that the lock screen is for the secondary access mode. In this example, the visual indication is a secondary access mode label 970. However, the device of some embodiment might provide one or more other visual indications. In the fourth stage, the user also slides the slider affordance 950 to turn the device on in the secondary access mode.

The fifth stage 925 shows the device operating in the secondary access mode. It also shows that the user is pressing the affordance 955 to turn the screen back off. In the sixth stage 930, the user again pushes the home button to gain access to the lock screen of the device. However, this time, in the seventh stage 935 the user tries to gain access to the primary access mode by touch selecting the affordance 965 instead of the slider. The eighth stage 940 illustrates the result of the selection and sliding up of the affordance 965. As illustrated in this stage, the passcode screen 975 is displayed on the device's screen for the user to enter the primary access passcode and gain access to primary access mode.

In the example described above, the secondary access mode lock screen forces a person to input a passcode in order to gain access to the device in the primary access mode. Therefore, the device is secure regardless of the passcode grace period. Instead of the secondary mode lock screen, the device of some embodiments automatically resets the grace period when the device is unlocked to the secondary access mode or locked from the secondary access mode. Similar to the secondary access mode lock screen, this forces a person attempting to access the device in the primary access mode to supply a passcode. In some embodiments, the device of some embodiments provides an affordance to exit the secondary access mode. For example, the home screen page may include a selectable item that when selected causes the device to exit the secondary access mode.

In several of the examples described above, the mobile device is unlocked to the secondary access mode through an affordance on a first page (e.g., the lock screen page) or a second page (e.g., the passcode page) of the device. In some embodiments, the device has fingerprint recognition technology that allows its user to gain access to the primary access mode through fingerprint recognition. In some of these embodiments, the device initiates operation in its secondary access mode when a user attempts to access the device through fingerprint recognition but the fingerprint recognition fails.

Alternatively or conjunctively, the device of some embodiments allows multiple fingerprints to be recorded for one user or multiple users, and allows one or more fingerprints to be recorded for initiating the primary access mode operation of the device while allowing one or more fingerprints to be recorded for initiating the secondary access mode operation of the device. In these embodiments, fingerprint recognition may launch the device in either the primary access mode or secondary access mode for different users. Several examples of accessing the device in the primary or secondary access mode through fingerprint recognition will now be described by reference to FIGS. 10-18. In these examples, the fingerprint sensor or scanner is provided as part of a physical button 1020. However, the sensor may be provided as a part of a different component or its one separate component.

Figure 10:
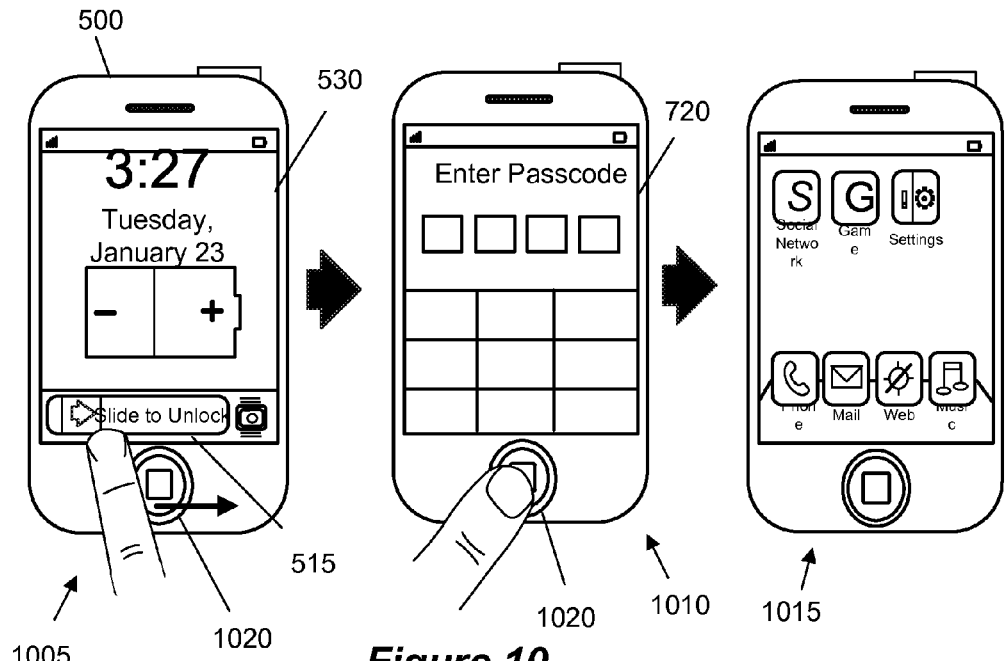
FIG. 10 illustrates gaining access to the primary access mode of a mobile device through fingerprint recognition.

FIG. 10 provides an illustrative example of gaining access to the primary access mode of the device 500 through fingerprint recognition. In this example, to gain access to the device in the primary access mode, the user's fingerprint has been previously recorded (e.g., with a sensor on the button 1020). Also, in this example, the user first switches the devices from displaying the lock screen page 530 to the passcode page 720. When the lock screen page is shown on the screen, the user then places the user's finger on the physical button to have it scanned.

Three operational stages 1005-1015 of the mobile device are shown in FIG. 10. The first stage 1005 illustrates the device displaying its lock screen page. Here, the user performs a touch gesture on the slider affordance 515 that is shown on the lock-screen page to navigate to the passcode page 720. The gesture input causes the device to display the passcode page 720, as illustrated in the second stage 1010.

The second stage 1010 illustrates the user placing the user's finger on the button 1020. This causes the sensor on the button to capture a pattern of the fingerprint of that finger. The captured pattern is then compared with a previously stored pattern to determine if the two patterns match. Different embodiments use different matching methods. For instance, the input fingerprint pattern may be compared with the stored fingerprint pattern to identify a same or similar characteristic. Examples of such characteristics include the arch, whorl, or loop of the fingerprints.

The third stage 1015 illustrates the device after authenticating the user through fingerprint recognition. Specifically, the matching of the fingerprint patterns has allowed the user to gain access to the device 500 in the primary access mode. As mentioned above, in some embodiments, the primary access mode of the device provides unfettered access to all of the device's applications and/or data that are available to the user.

Figure 11:
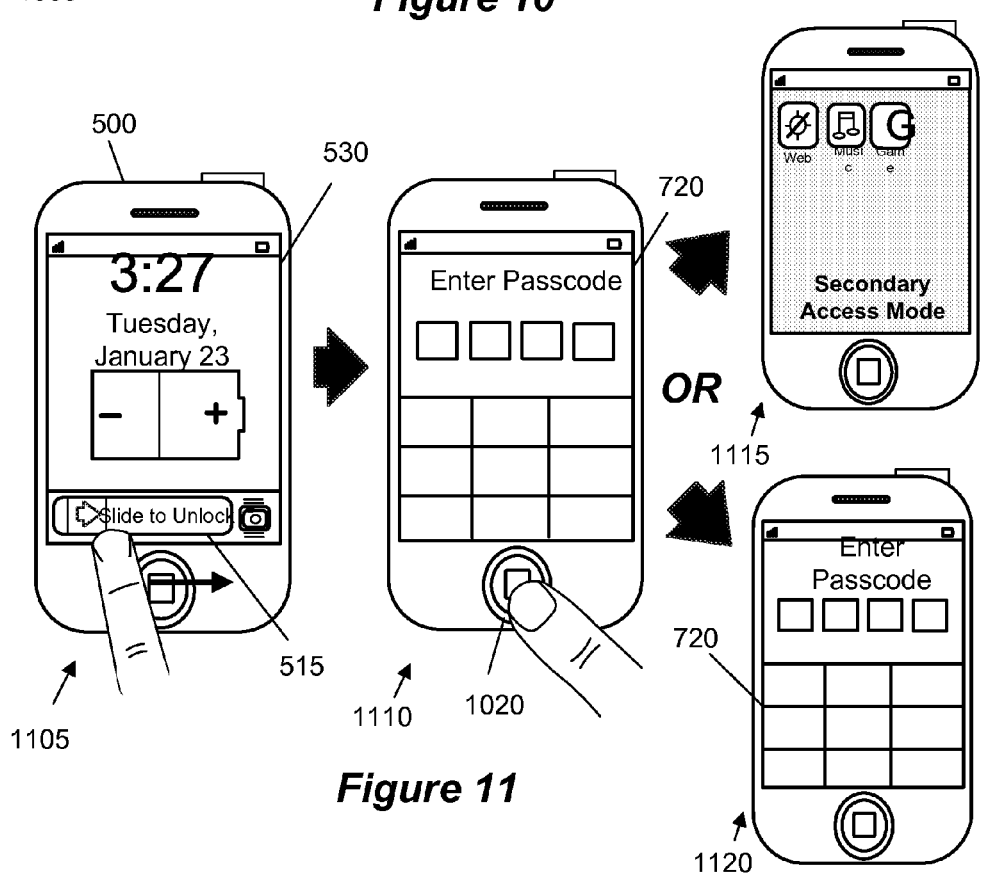
FIG. 11 illustrates two example operations that a mobile device performs when a user unsuccessfully attempts to access the device through fingerprint recognition.

FIG. 11 illustrates two example operations that the device performs when a user attempts to access the device through fingerprint recognition but the fingerprint recognition fails. Specifically, this figure shows unlocking the device to the secondary access mode when the fingerprint recognition fails. This figure also shows an alternative scenario, where the device does not unlock to the secondary access mode when the fingerprint recognition fails but denies access to the user.

Three operational stages 1105-1115 of the mobile device are shown in this figure. In the first stage 1105, the mobile device displays the lock screen page 530 on its touch-screen display. To display the passcode page 720, the user selects the slider 515 and performs a touch-based gesture on the slider affordance 515 (e.g., by dragging the slider handle with the user's finger at least partially across to the end of the slider bar). The second stage 1110 illustrates the user placing the user's finger on the button 1020. Different from the previous figure, the fingerprint of this finger has not been previously recorded with the device 500.

The third stage 1115 illustrates that the device of some embodiments allows the user to gain access in the secondary access mode when the fingerprint recognition fails. In the alternate stage 1120, the device of some embodiments denies access to the user. Here, the stages 1105-1115 illustrate that the device does not update its display in response to user placing the finger on the button 1020. The same passcode page 720 is shown on the touch-screen display. In some embodiments, the input of an incorrect fingerprint pattern may cause the device to show a previous page (e.g., the lock screen) or cause it to show a visual or textual indication that the fingerprint could not be recognized. In some embodiments, the device provides a menu option to specify whether an input of an incorrect fingerprint pattern results in it being unlocked to secondary access mode or remaining locked.

Figure 12:
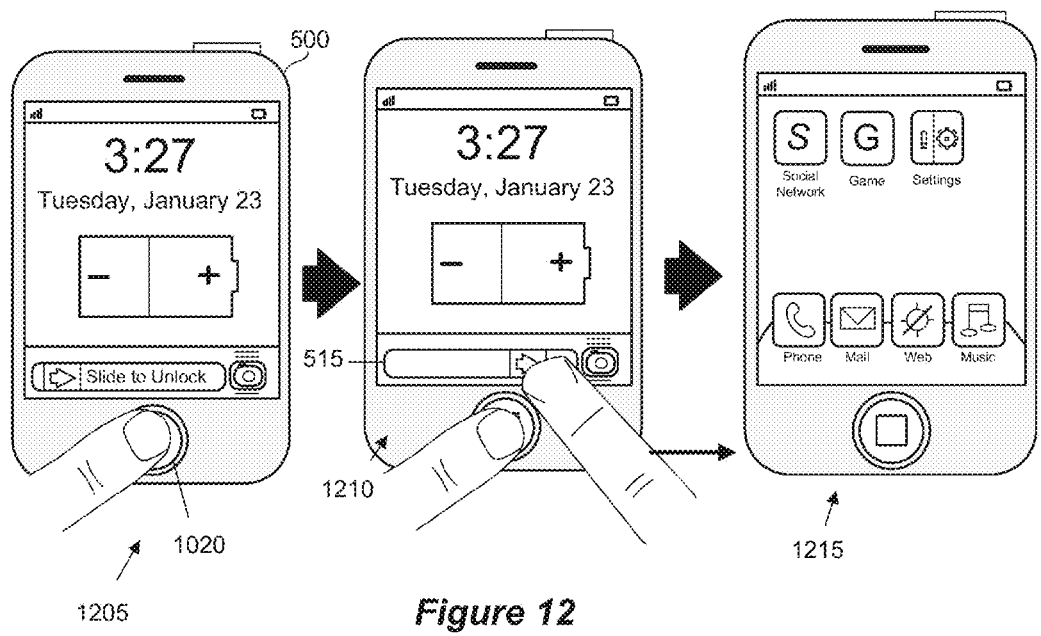
FIG. 12 illustrates an example of gaining access to the primary access mode of a mobile device through fingerprint recognition when the device is on the lock screen.
Figure 13:
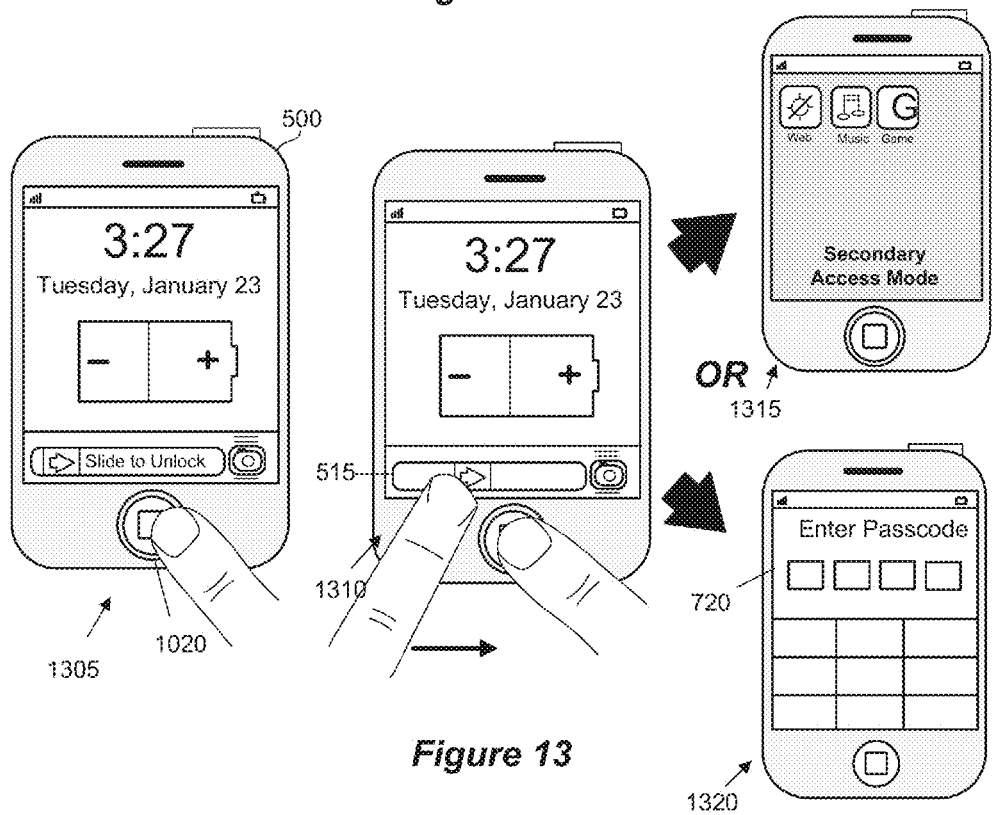
FIG. 13 illustrates two example operations that a mobile device performs when a user unsuccessfully attempts to access the device through fingerprint recognition.

In the previous two examples, the fingerprint recognition operation is performed after navigating from the first page (e.g., the lock screen page) to the second page (e.g., the passcode page). In some embodiments, the device's operating system allows a user to access the device on the first page without having to navigate to the second page. FIGS. 12 and 13 provide illustrative examples of the fingerprint recognition operations that are performed at the lock screen page. Specifically, FIG. 12 illustrates an example of gaining access to the primary access mode of the device 500 through fingerprint recognition when the device's touch screen display shows the lock screen. This is followed by FIG. 13, which illustrates two alternate operations that the device perform when a user attempts to access the device through fingerprint recognition but the fingerprint recognition fails.

Three operational stages 1205-1215 of the mobile device are shown in FIG. 12. The first stage 1205 illustrates the device displaying its lock screen page. The user then performs a combination of gestures to unlock the device to the primary access mode. Specifically, the user places the user's finger on the button 1020. In the second stage 1210, while holding the button 1020 with one finger, the user selects the slider affordance 515 with another finger and performs a touch-based gesture (e.g., by dragging the slider handle with the user's finger at least partially across to the end of the slider bar). The combination of the two gestures causes the button's sensor to capture a fingerprint pattern of that finger. The captured pattern is then compared with one or more previously stored fingerprint patterns to determine if the patterns match.

The third stage 1215 illustrates the device after authenticating the user thorough fingerprint recognition. Specifically, the fingerprint recognition has launched the device 500 in the primary access mode because the captured fingerprint pattern matched a previously stored fingerprint pattern.

FIG. 13 illustrates two example operations that the mobile device 240 performs when a user attempts to access the device through fingerprint recognition but the fingerprint recognition fails. Specifically, this figure shows unlocking the device to the secondary access mode when the fingerprint recognition fails. This figure also shows an alternative scenario, where the device does not unlock to the secondary access mode when the fingerprint recognition fails but denies access to the user altogether. Three operational stages 1305-1315 of the mobile device are shown in this figure.

In the first stage 1305, the user places the user's finger on the button 1020. The fingerprint of this finger has not been previously recorded with the device 500. The user then performs a combination of gestures to gain access to device. As shown in the second stage 1310, the user performs a touch-based gesture while holding the button 1020 with the user's finger. This is the same combination gesture that has been described above by reference to stage 1210 of FIG. 12.

The third stage 1315 illustrates that the device of some embodiments allows the user to gain access in the secondary access mode when the fingerprint recognition fails. In the alternate stage 1320, the device of some embodiments denies access to the user. Here, the stages 1305-1315 illustrate that the device does not update its display in response to user placing the finger on the button 1020. The same passcode page 720 is shown on the touch-screen display. In some embodiments, the input of an incorrect fingerprint pattern may cause the device to show a previous page (e.g., the lock screen) or cause it to show a visual or textual indication that the fingerprint could not be recognized.

The two previous examples illustrated bypassing the passcode page through fingerprint recognition and gaining access to the device in either the primary or secondary access mode. The examples also illustrated a combination gesture to gain access to the device. Specifically, these examples show selecting the physical button 1020 with one finger and performing a touch gesture on the slider affordance 515 with another finger to unlock the device.

Figure 14:
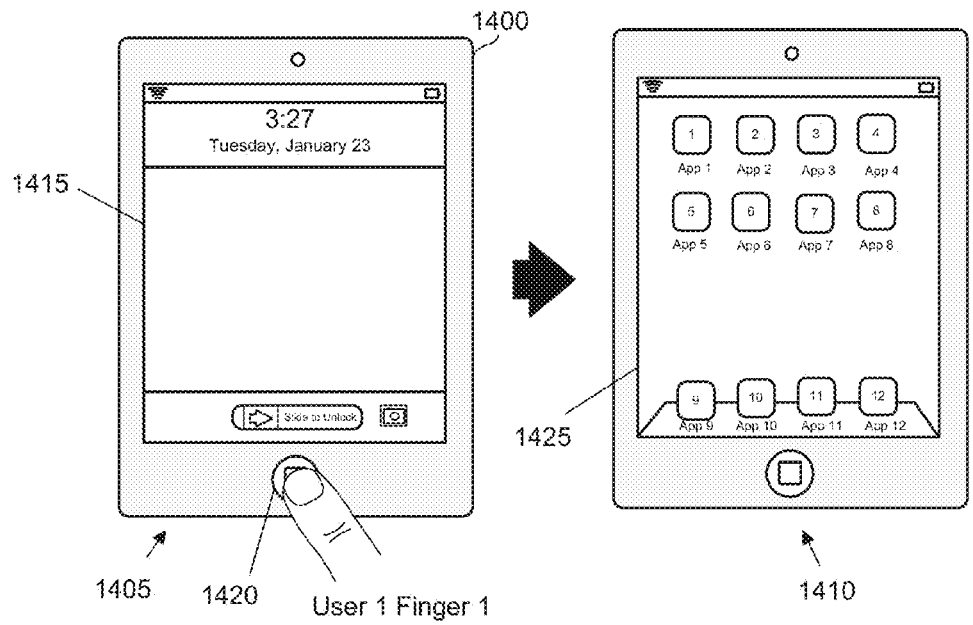
FIG. 14 illustrates an example of gaining access to a mobile device through fingerprint recognition technology.
Figure 15:
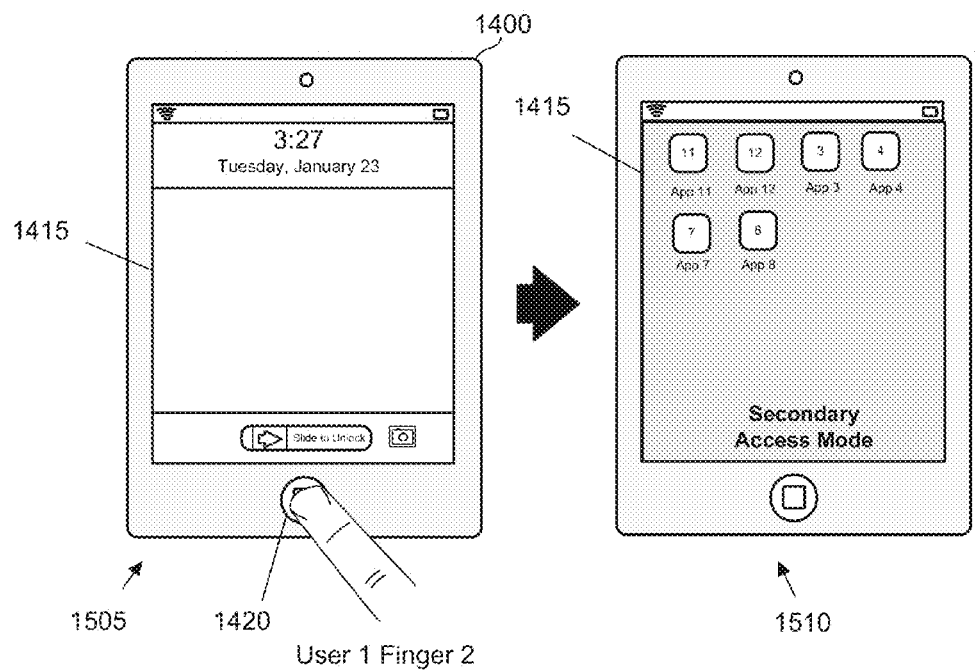
FIG. 15 illustrates an example of gaining access to a mobile device through fingerprint recognition technology.

FIGS. 14 and 15 illustrate additional examples of gaining access to a device 1400 through fingerprint recognition technology. However, in these examples the user simply selects a physical button to initiate the fingerprint recognition operation. In other words, the user does not have to input a combination of gestures to direct the device's operating system to unlock the device. These examples also show a device 1400 that has a different form factor than the ones shown in the previous examples. Specifically, instead of a smart phone, the device is a tablet-computing device.

Different from the previous examples, multiple fingerprints have been recorded and stored for one particular user. That is, in this example, at least one fingerprint has been recorded to gain access to the device in the primary access mode and at least one other fingerprint has been recorded to gain access to the device in the secondary access mode. Two operational stages 1405 and 1410 of the device 1400 are shown in FIG. 14.

The first stage 1405 illustrates the device displaying its lock screen page. To initiate the fingerprint recognition, the user places the user's finger on the device's button 1420. The placement of the finger causes the device to scan that finger for a fingerprint pattern. The scanned pattern is then compared with one or more stored fingerprint patterns. If the fingerprint recognition passes, the device's operating system allows the user to gain access to the device.

The second stage 1410 illustrates the device after it has passed the fingerprint recognition test. Since the fingerprint pattern matched a stored pattern, and the stored pattern was to authorize the user to the primary access mode, the second stage 1410 shows that device has been unlocked to the primary access mode.

FIG. 15 illustrates the same user using a different finger to gain access to the device in the secondary access mode. In the first stage 1505, the user places the user's finger on the button 1420. This finger is different from the one shown in the previous example. Also, the fingerprint for the finger has been previously recorded as one that should allow the user to unlock the device to the secondary access mode. In other words, the fingerprint pattern of that finger is associated with authorization to access the device in the secondary access mode.

The second stage 1510 illustrates the device after it has passed the fingerprint recognition test. Since the fingerprint pattern matched a stored pattern, and that stored pattern was to authorize the user to the secondary access mode, the second stage 1510 shows that device has been unlocked to the secondary access mode.

In the examples described above, one user (1) gains access to the mobile device in the primary mode through one finger and (2) gains access to the mobile device in the secondary mode through another finger. The device of some embodiments allows multiple fingerprints to be recorded for multiple users. In some such embodiments, fingerprint recognition may launch the device in either the primary access mode or secondary access mode. If a user is granted access to the secondary mode, the device may launch a mode that is specific for that user. This means that different users can have their own personal secondary access modes. For example, a first user may have access to one set of applications, while a second different user may have access to another set of applications. In addition, the first guest user might have different data access privileges (e.g., write access, read access, etc.) than the second guest user.

Figure 16:
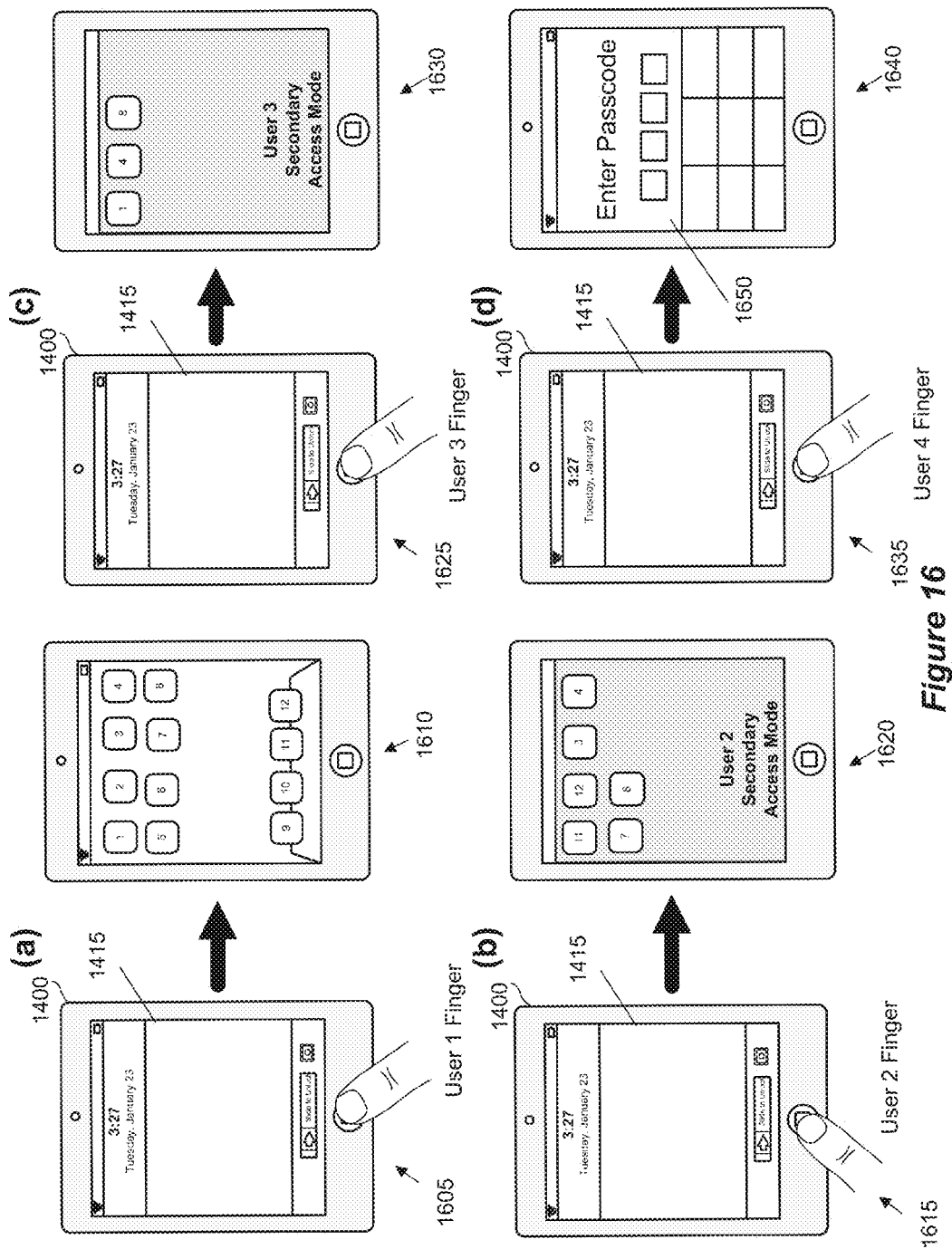
FIG. 16 provides examples of multiple different users attempting to gain access to the device in the secondary access mode.

FIG. 16 illustrates several examples of different users accessing the device through fingerprint recognition. Specifically, this figure illustrates four different users (i.e., users 1-4) trying to access the secondary mode. The fingerprint of user 1 has been previously recorded with the device as one that should be allowed access to the device in the primary access mode. The fingerprint of user 2 has been previously recorded with the device as one that should be allowed access to the device in the user 2's secondary access mode. The fingerprint of user 3 has been previously recorded with the device as one that should be allowed access to the device in the user 3's secondary access mode. The fingerprint of user 4 has not been previously recorded with the device as one that should be allowed access to the device in any mode.

The stage 1605 illustrates user 1 attempting to access the device through the user's fingerprint. The fingerprint of user 1 has been previously recorded with the device as one that should be allowed access to the device in the primary access mode. Accordingly, in the stage 1610, the device is unlocked to the primary access mode.

The stage 1615 illustrates user 2 attempting to access the device 1400. The fingerprint of user 2 has been previously recorded with the device as one that should be allowed access to the device in the user 2's secondary access mode. Accordingly, in the stage 1620, the device 1400 unlocks to user 2's personal secondary access mode. As it is illustrated in this stage, the applications that are accessible to user 2 are less than the applications that are accessible to user 1 in the primary access mode.

The stage 1625 illustrates user 3 attempting to access the device 1400. The fingerprint of user 3 has been previously recorded with the device as one that should be allowed access to the device in the user 3's secondary access mode. Accordingly, in the stage 1630, the device 1400 unlocks to user 3's personal secondary access mode. As it is illustrated in this stage, the applications that are accessible to user 3 are even less than the applications that are accessible to user 2 even though both of these users have access to secondary access mode. In some embodiments, the device provides menu options to specify which applications are available to different users. For example, with such menu options, the owner of the device can specify different applications for different users or groups of users (e.g., friends, family, children, etc.).

The stage 1635 illustrates user 4 attempting to access the device 1400. The fingerprint of user 4 has not been previously recorded with the device. Accordingly, in the stage 1640, the selection of the affordance (e.g., the button) causes the device to display the passcode page 1650. In some embodiments, when the fingerprint recognition fails, the device unlocks to a default secondary access mode account instead of a personal secondary account such as the ones illustrated in stages 1630 and 1620.

Figure 17:
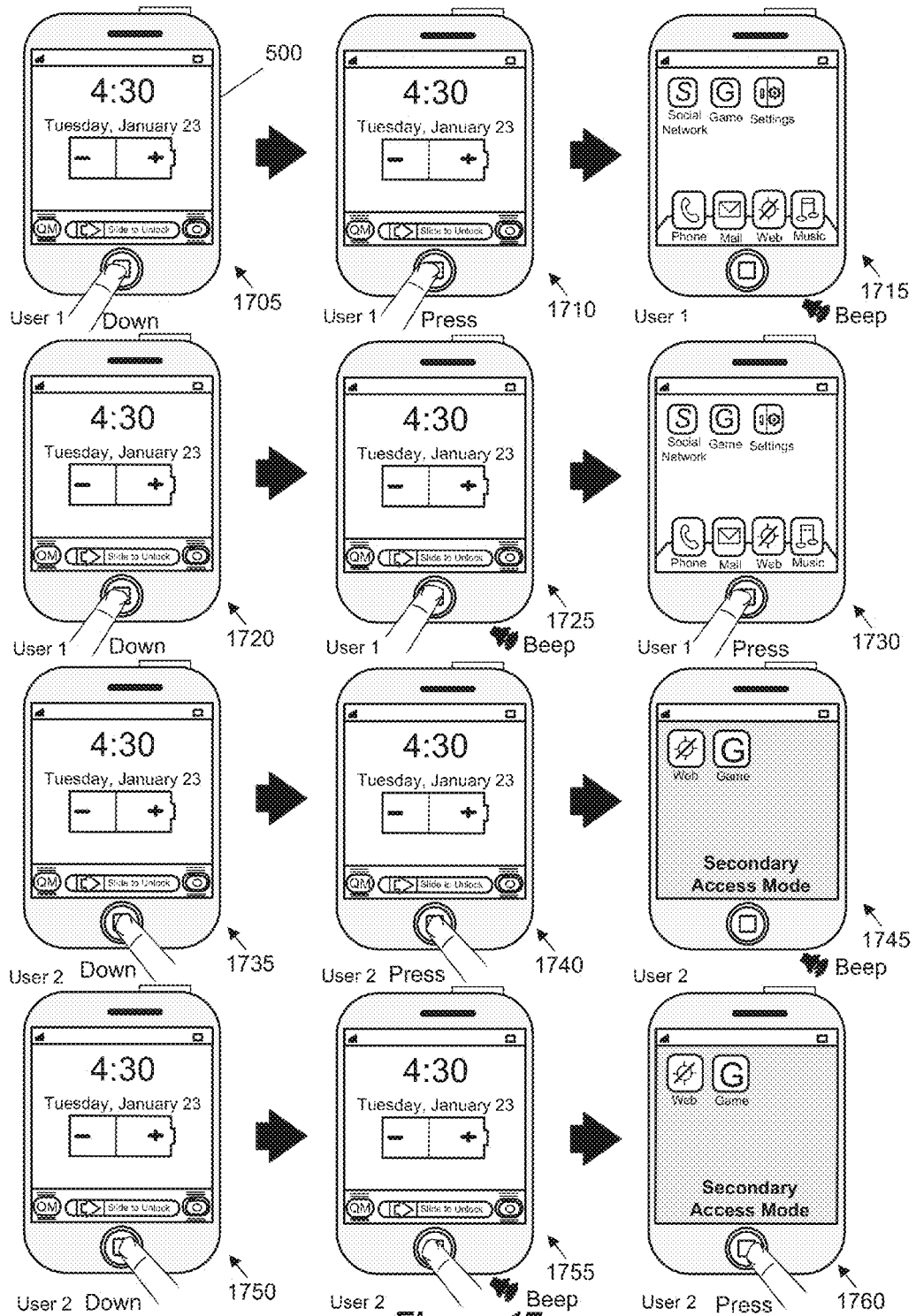
FIG. 17 illustrates initiating fingerprint recognition by placing a finger over a fingerprint sensor.

FIG. 17 illustrates additional examples of accessing a device using fingerprint recognition technology. This figure shows four different sets of operations that are performed on the device to gain access to the device in either the primary access mode or the secondary access mode. Each set of operations shows a particular user holding the user's finger down on a button without pressing it to initiate the fingerprint recognition operation. The user then presses the button to gain access to the device in either the primary or secondary access mode.

The first set of operations 1705-1715 illustrates user 1 attempting to access the device 500 in the primary access mode. The fingerprint of user 1 has been previously recorded with the device as one that should be allowed access to the device in the primary access mode. As shown in stage 1705, the user holds down the user's finger over the button. This causes the device to initiate the finger print recognition operation. For example, the user's finger may be scanned when the device detects the user's finger over the scanner. The stage 1710 illustrates the user pressing the button to open the device. The stage 1715 illustrates the device unlocking to the primary access mode. This stage 1715 also illustrates the device playing a sound to indicate that the fingerprint recognition has passed. In conjunction with the sound or instead of it, the device of some embodiments provides a different indication (e.g., the device might vibrate if the feature has been turned on).

The second set of operations 1720-1730 is similar to the first set of operations. However, the sound is played prior to the user pressing the button. Therefore, in this set of operations the fingerprint recognition occurs immediately after the user holds down the finger over the button at stage 1720. If the fingerprint recognition has passed, the device then plays a sound. This is shown in the stage 1725. In stage 1725, the user then presses the button to unlock the device to the primary access mode. The primary access mode is shown in stage 1730.

The third set of operations 1735-1745 illustrates user 2 is attempting to access the device 500 in the secondary access mode. This set of operations is identical to the first set 1705-1715 in that the sound is played after the user presses the home button. The fourth set of operations 1750-1760 illustrates that user 2 is attempting to access the device 500 in the secondary access mode. This set of operations is identical to the second set 1720-1730 in that the sound is played prior to the user pressing the home button.

Figure 18:
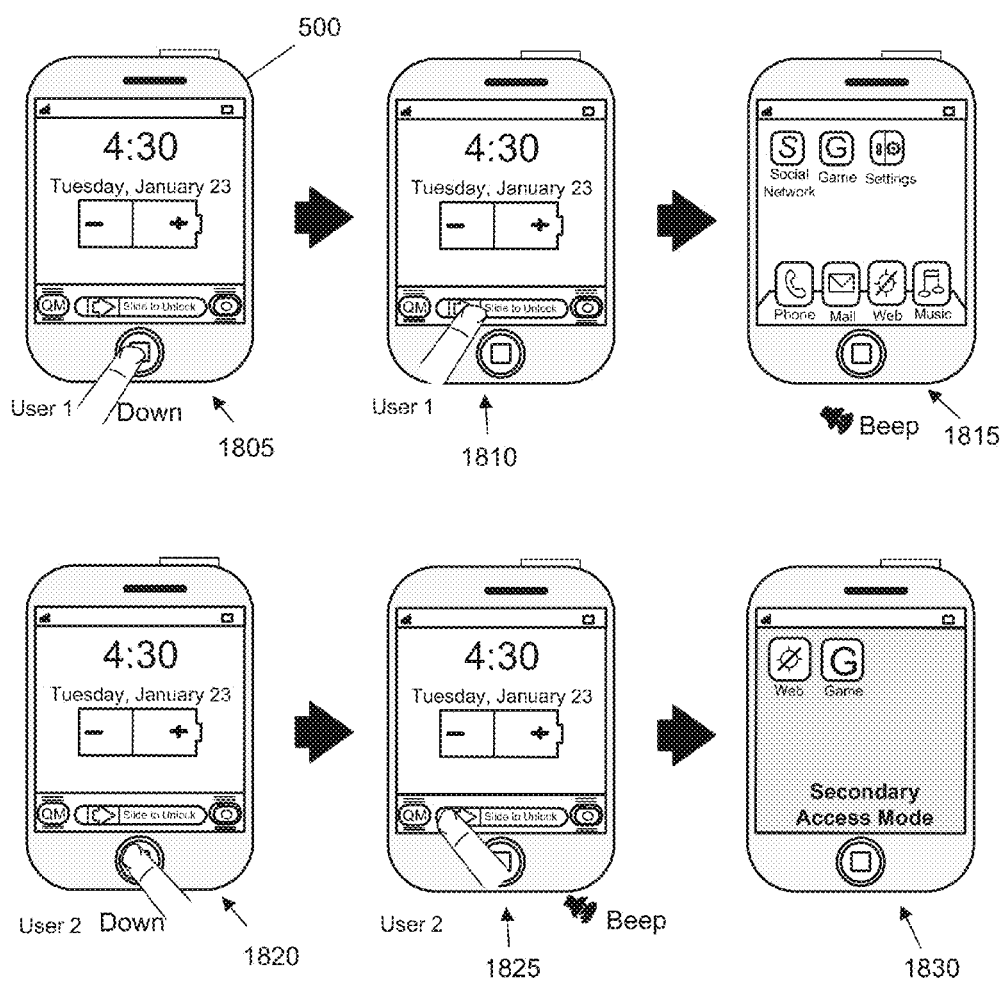
FIG. 18 illustrates additional examples of accessing a device using fingerprint recognition technology.

FIG. 18 illustrates additional examples of accessing a device using fingerprint recognition technology. The first set of operations 1805-1815 illustrates user 1 attempting to access the device 500 in the primary access mode. The fingerprint of user 1 has been previously recorded with the device as one that should be allowed access to the device in the primary access mode. As shown in stage 1805, the user holds down the user's finger over the home button without pressing it to initiate the fingerprint recognition. Here, the fingerprint recognition occurs immediately after the user holds down the finger over the button at stage 1805. If the fingerprint recognition has passed, the device then plays a sound. This is shown in the stage 1810. In stage 1810, the user then uses the slider affordance to unlock the device to the primary access mode (shown in stage 1815). The second set of operations 1820-1830 is similar to the first set of operations; however, User 2 in the second set accesses the device in the secondary access mode. In the example described above, the device's user is granted access to the primary or secondary access mode using fingerprint recognition. One of ordinary skill in the art would understand that the fingerprint is just one biometric pattern and that other patterns (e.g., palm print, hand geometry, face) or human characteristics (iris, sound of the voice) can be used to authenticate a person and authorize the person to access the device in one of several different access modes.

Figure 19:
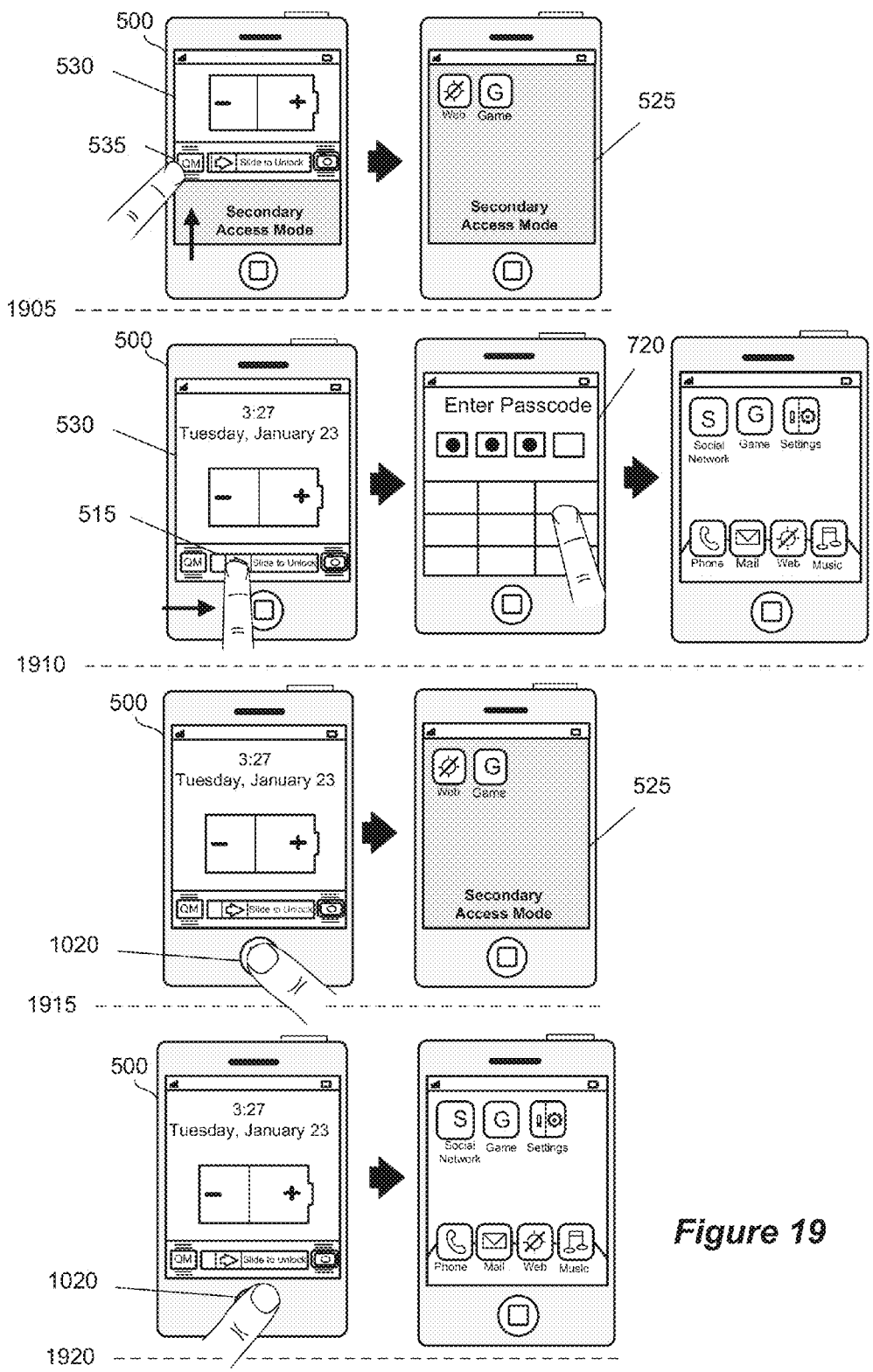
FIG. 19 illustrates four different sets of operations that can be performed to gain access to a mobile device in either a primary access mode or a secondary access mode.

Various different examples of entering a primary access mode or a secondary access mode have been described above by reference to FIGS. 5-18. One of ordinary skill in the art would realize that the various embodiments shown in these figures and described herein are not necessarily mutually exclusive combinations of features and can be combined in different ways. For example, the secondary access passcode feature of FIG. 7 can be combined with any one or more of the fingerprint recognition features of FIGS. 10-18. As another example, FIG. 19 illustrates a different combination. In particular, this figure shows four different sets of operations 1905-1920 that are performed on the device to gain access to the device in either the primary access mode or the secondary access mode.

The first set of operations 1905 illustrates an example of a touch gesture that can be performed on the lock screen page 530 to unlock the mobile device 500 and place it in the secondary access mode 525. This set of operations 1905 is described above by reference to FIG. 5.

The second set of operations 1910 illustrates an example of inputting a passcode through the passcode page 720 to gain full access to the device in the primary access mode. Specifically, the figure illustrates switching to the passcode page 720 using the slider affordance 515 on the lock screen page 530. The user then uses the passcode page 720 to input a passcode. Lastly, the device is unlocked to the primary access mode upon receiving the correct passcode through the passcode page.

The third and fourth sets of operations 1915 and 1920 illustrate that fingerprint recognition features can be combined with any other operations for accessing the device. Here, the examples are similar to the ones describe above by reference to FIGS. 14 and 15. Specifically, theses sets of operations show that one user can gain access to the device in the primary mode using one finger and gain access to the device in the secondary access mode using a different finger.

Figure 20:
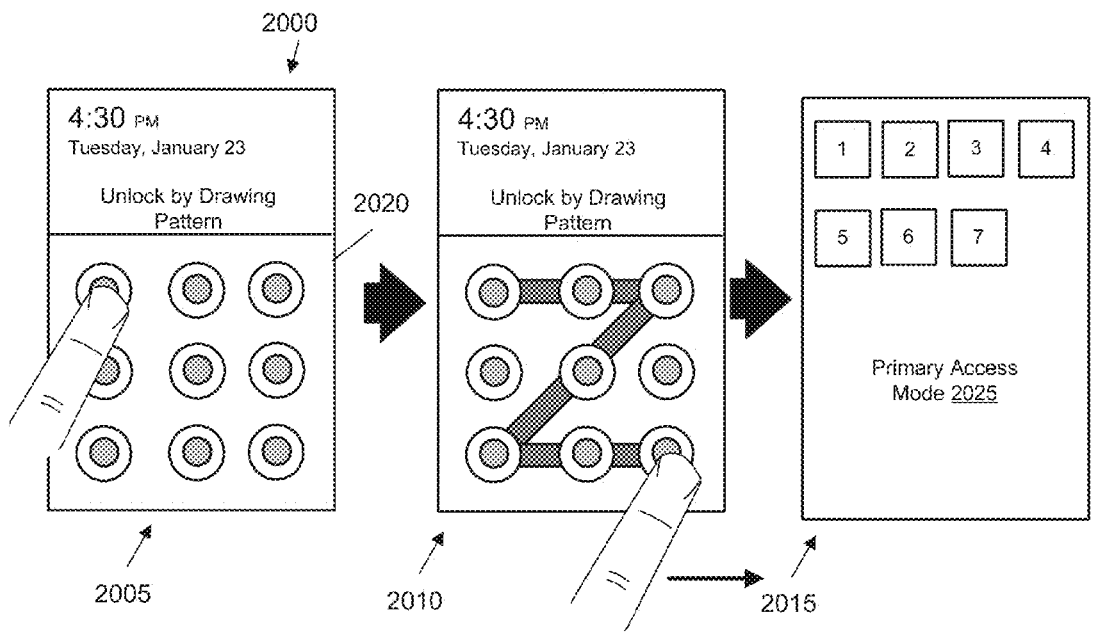
FIG. 20 illustrates an example of unlocking a mobile device to the primary access mode by drawing a first pattern.
Figure 21:
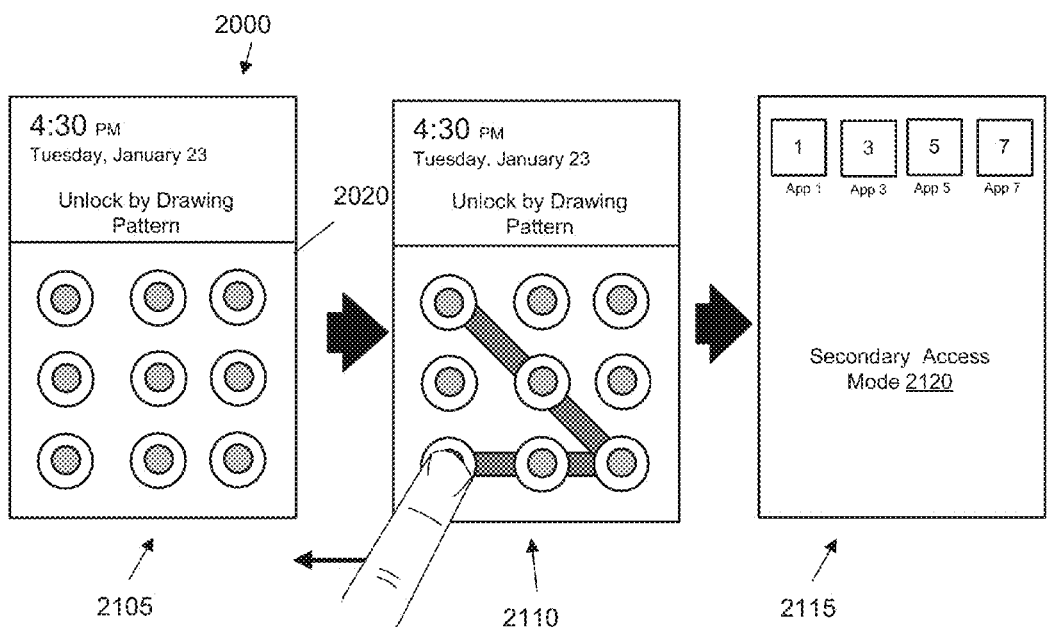
FIG. 21 illustrates an example of unlocking a mobile device to the secondary access mode by drawing a second different pattern.

In several examples that are described above, the device of some embodiments displays a passcode page to grant access to the device. In addition, depending on the passcode input, the device is directed to operate in either the primary or the secondary access mode. Instead of the passcode input, the mobile device of some embodiments allows a user to access the device through a different touch code, such as a pattern code. FIGS. 20 and 21 illustrate unlocking a mobile device 2000 to different modes by drawing different patterns.

FIG. 20 provides an illustrative example of unlocking a mobile device to a primary access mode 2025 based on input of a pattern. In this example, the device is associated with a pattern to unlock it to the primary access mode. The first stage 2005 illustrates a touch code panel 2020 of the device. The touch code panel 2020 includes several affordances (e.g., selectable items) to draw different patterns. The affordances are arranged in different rows (e.g., in a 3×3 grid). The user can drag the user's finger over different affordances to input a pattern by drawing connections between the affordances. If the input pattern matches a previously stored pattern, then the device is unlocked (e.g., to the primary access mode).

In the second stage 2010, the user drags the user's finger over several of the affordances to input a pattern. The input pattern matches a previously stored pattern that grants access to the device in the primary access mode. As such, in the third stage 2015, the device is shown as being unlocked to the primary access mode 2025. In this mode, the user has access to all applications that execute on the device and that are available to a user of the device. The example of the third stage 2015 illustrates seven applications (i.e., App 1-7) that are arranged in-line on the device's screen.

FIG. 21 provides an illustrative example of unlocking a mobile device to a secondary access mode 2120 based on input of a different pattern. In this example, the device is associated with a second different pattern to unlock it to the secondary access mode 2120. Similar to the previous example, the first stage 2105 illustrates the touch code panel 2020 of the device. In the second stage 2110, the user drags the user's finger over several of the affordances to input a pattern. The input pattern matches a previously stored pattern that grants access to the device in the secondary access mode. As such, in the third stage 2115, the device is shown as being unlocked to the secondary access mode 2120. In this mode, the user has access to a limited number of applications that execute on the device. The example of the third stage 2115 illustrates that four of the seven applications are accessible in this secondary access mode. More specifically, only applications App 1, App 3, App 5, and App 7 are available in this secondary access mode 2120.

Some embodiments provide still other mechanisms for launching the device in the secondary access mode. Examples of these other mechanisms include motion-based inputs, multi-tap inputs (e.g., multiple taps on a soft or physical affordance of the device), voice commands, etc. Several of these mechanisms do not require the user to navigate to a particular page (e.g., the lock screen page, the passcode page). Instead, the user can input a command on any page to direct the device to operate in one mode or another. For example, when the device has already been unlocked to the primary access mode, the user can input a gesture or a command to quickly switch the device from operating in the primary access mode to the secondary access mode. These embodiments can be used alone, in combination with one another, or with any one or more of the other techniques described above by reference to FIGS. 5-18.

Figure 22:
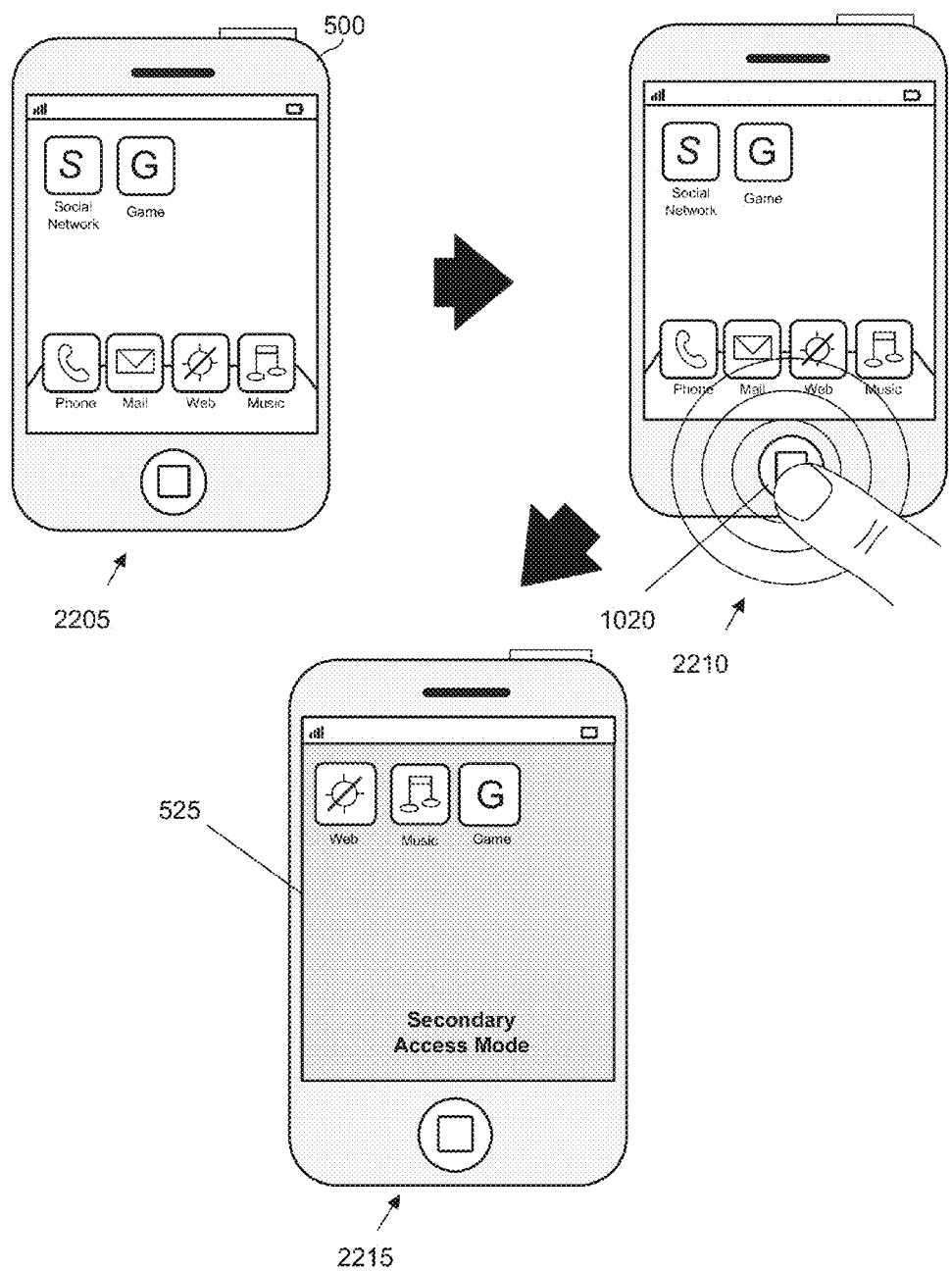
FIG. 22 provides an illustrative example of gaining access to a secondary access mode of a mobile device through a touch-based gesture.

FIG. 22 provides an illustrative example of gaining access to secondary access mode through a touch-based gesture. Three operational stages 2205-2215 of the mobile device 500 are illustrated in this figure. The first stage 2205 presents the device 500 while it is operating in the primary access mode. The second stage 2210 illustrates the selection of an affordance 1020 (e.g., a physical button). Specifically, the user taps the affordance multiple times (e.g., three times) to direct the device to operate in the secondary access mode. The third stage 2215 illustrates that the selection of the affordance has resulted in the device switching from operating in the primary access mode to operating in the secondary access mode 525.

In the previous example, the user taps on the affordance 1020 (e.g., the physical button) multiple times to direct the device to switch to the secondary access mode. The secondary access mode, however, may be activated differently in some embodiments. For example, the secondary access mode may be activated through a selection (e.g., a single tap, a double tap) of a touch screen affordance (e.g., a soft share button, or an icon on the screen). In some embodiments, the device allows the user to activate the secondary access mode through a press pattern. An example of such a press pattern includes a short press of the affordance 1020 followed by a long press of that same affordance. The device of some such embodiments includes a menu option to record one or more press patterns. The recorded patterns can then be used direct the device to operate in the secondary access mode.

Figure 23:
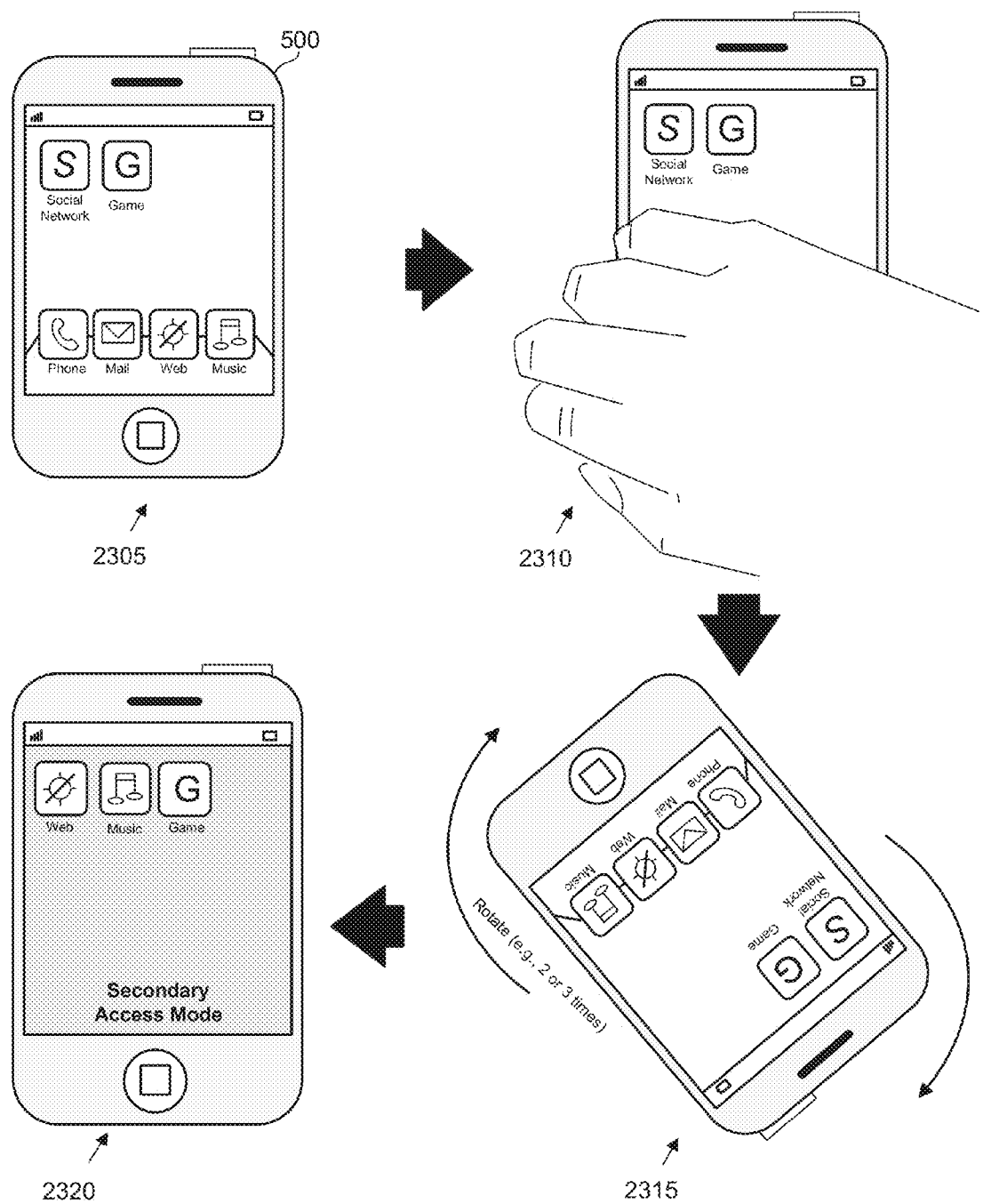
FIG. 23 provides an illustrative example of gaining access to a secondary access mode of a mobile device through a particular motion.

FIG. 23 provides an illustrative example of directing the device to operate in the secondary access mode through a motion gesture. In this example, instead of selecting an affordance (e.g., a button in the previous example) multiple times (e.g., three times), the user rotates the device to place the mobile device in the secondary access mode. Specifically, this figure illustrates in four operational stages 2305-2320 how the mobile device 500 can be rotated to switch the device from operating in the primary access mode to operating in the secondary access mode.

The first stage 2305 illustrates the mobile device 500 opening in the primary access mode. The second and third stages (2310 and 2315) illustrate the selection and rotation of the mobile device 500. In the second stage 2310, the user grabs or holds the device with the user's hand to rotate it in a particular direction. As shown in the third stage 2315, the device is then rotated to place it in the secondary access mode. Specifically, the device is rotated in a clockwise direction several times (e.g., two or three times). However, the device may be rotated in any direction (e.g., counter clockwise direction) for any number of times (e.g., one, two, three) to place it in the secondary access mode. The fourth stage 2320 illustrates the mobile device 500 after it has transitioned to the secondary access mode.

In the example described above, the user rotates the mobile device 500 to place it in the secondary access mode. The rotate motion gesture is just one of many different motion gestures that can be used to activate or deactivate the secondary access mode. Examples of other motion gestures include placing the mobile device 500 face down; shaking, tilting, or flipping the device; or any other motion gestures that can be detected through one or more motion detecting components of the mobile device, such as a gyroscope or an accelerometer.

Figure 24:
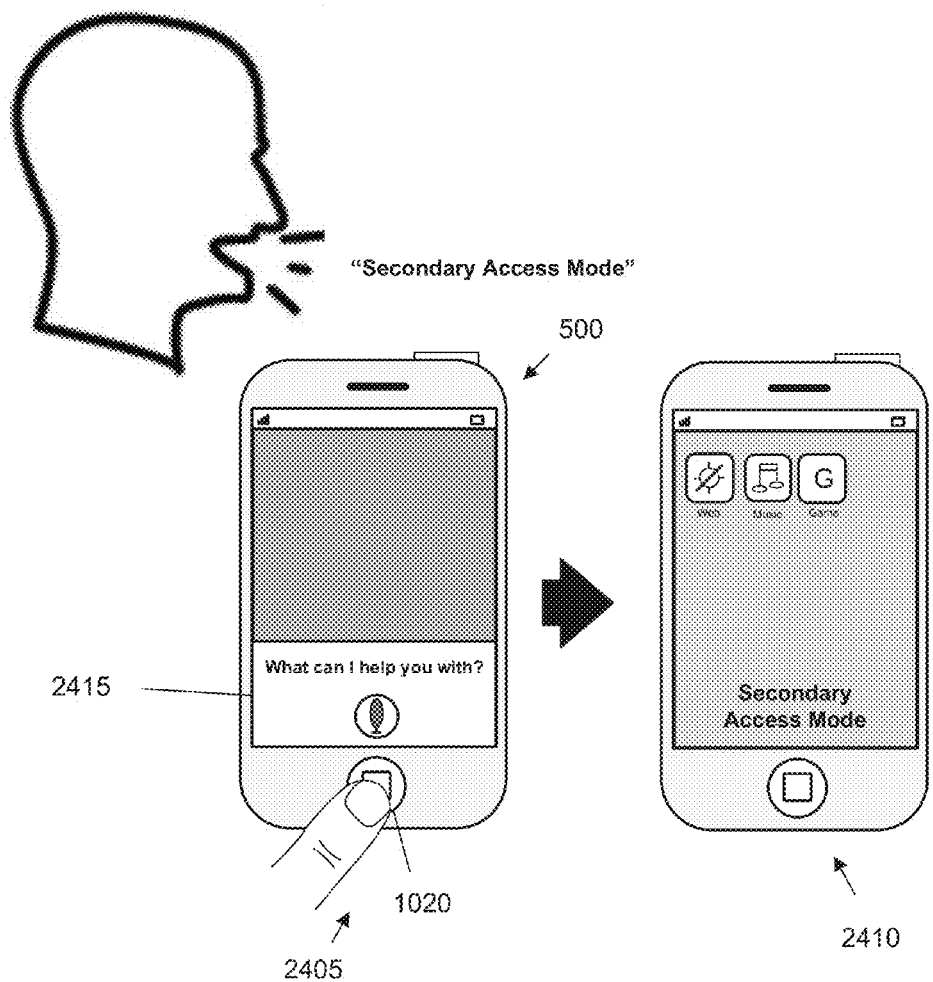
FIG. 24 provides an illustrative example of gaining access to a secondary access mode of a mobile device through voice recognition.

FIG. 24 provides an illustrative example of directing the mobile device 500 to operate in the secondary access mode through voice recognition. In this example, the user speaks a command into a microphone of the mobile device, which causes a voice recognition program or framework to recognize the command. The voice recognition program then interfaces with the device's other operating system modules (e.g., access modules) to place the device in either the primary or secondary access mode.

Two operational stages 2405 and 2410 of the mobile device are shown in FIG. 24. The user in the first stage 2405 selects the affordance 1020 (e.g., the button). In this example, the user holds the affordance with the user's finger for a short period of time (e.g., a pre-defined time period). As shown, the gesture causes a prompt 2415 to be displayed on the device's screen. In this example, the prompt indicates to the user that it is waiting for the user's voice command. In some embodiments, the program plays a sound (e.g., speaks to the user) indicating that the program has been activated and that it is awaiting input of a voice command.

As shown in the first stage 2405, the user inputs a voice command through the microphone of the mobile device to gain access to the device in the secondary access mode. In this example, the voice command is shown as being "secondary access mode". However, the voice command may be any word or combination of words capable of being recognized by the voice recognition program. The second stage 2410 illustrates that the input of the voice command has caused the device to operate in the secondary access mode (e.g., unlocked and placed in the secondary access mode).

Having described many different examples of entering the secondary access mode, several examples of the device indications during the secondary mode will now be described below by reference to FIGS. 25-29. As mentioned above, the mobile device of some embodiments provides one or more visual indications that it is operating in the secondary access mode rather than the primary access mode. To provide such indications, the device in some embodiments changes the background image that is used for the pages displayed during the secondary access mode or provides textual indication on these pages regarding the operation of the device in the secondary access mode. When operating in its secondary access mode, the device of some embodiments displays only the icons of the applications that are available in this mode. Instead of removing the icons of the applications that are not available in the secondary access mode, the device of some embodiments provides a deprecated (e.g., grayed out, reduced in size, etc.) display of the icons of the unavailable applications and makes these icons non-selectable items in its user interface.

Figure 25:
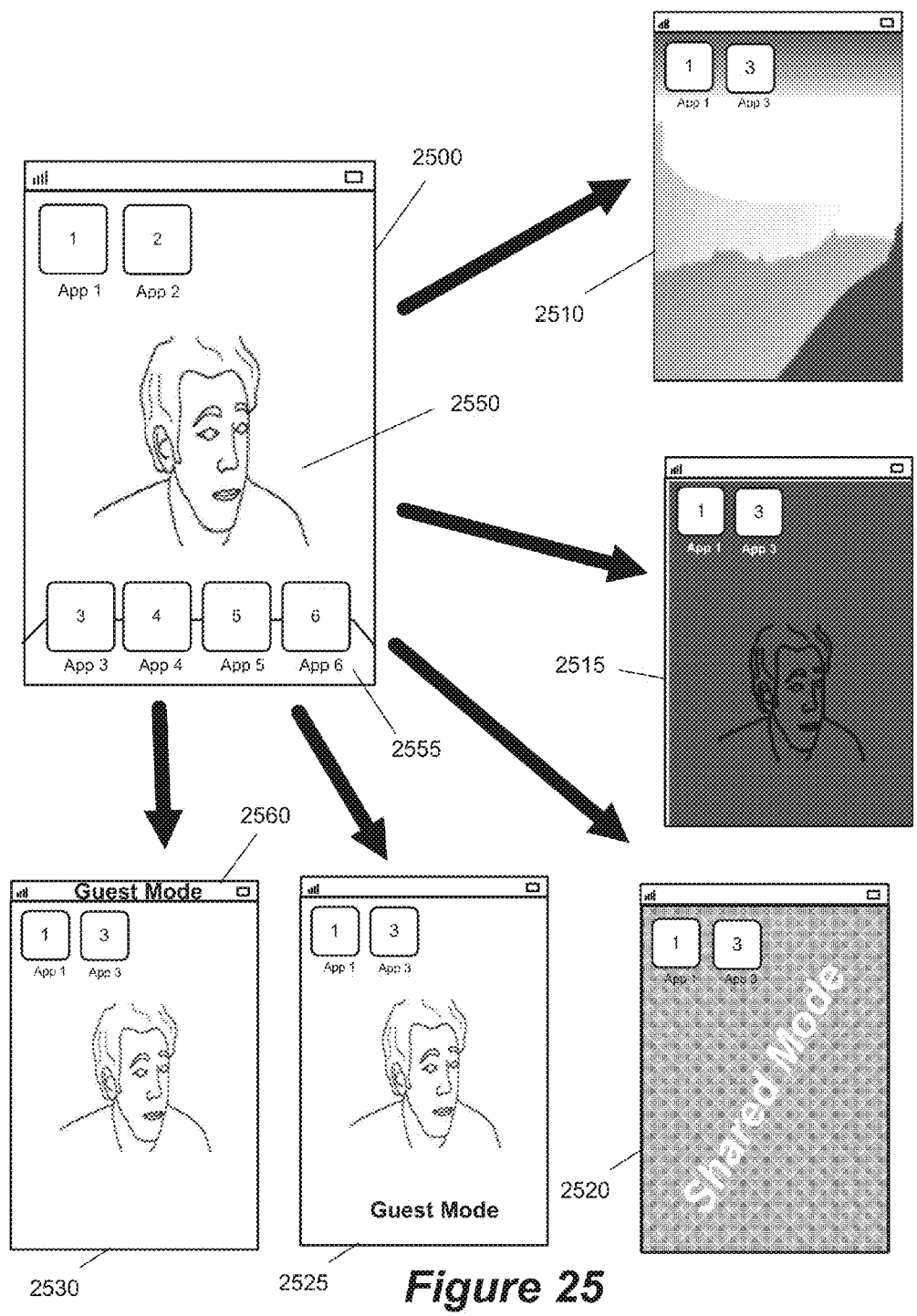
FIG. 25 illustrates different examples of the home screen page of a mobile device in a primary and secondary access mode.

FIG. 25 illustrates example visual indications that the device can show to indicate that it is operating in the secondary access mode. This figure illustrates various different ways to present pages in the secondary access mode so that they appear different from the pages in the primary access mode. One primary reason for providing one or more of these visual indications is that it allows the device's user to identify whether the device is operating in the primary access mode or the secondary access mode. That is, without any visual indications, the user can potentially have no idea whether the device is operating in the primary access mode or the secondary access mode.

As shown in FIG. 25, the page 2500 (herein after the home screen page) represents the device operating in the primary access mode. In this mode, the home screen page is shown with a user-specified background image 2550 (e.g., wallpaper). This figure also illustrates different example home screen pages when the device is operating in the secondary access mode. Specifically, the home screen page 2510 illustrates that the device of some embodiments uses a default background image during the secondary mode that is different from the background image(s) used during the primary mode. Examples of such a default background image include a generic wallpaper and an out of box wallpaper.

As shown by the home screen page 2515, the device of some embodiments might use in the secondary mode a slightly or highly blurred or tinted version of the background image used in the primary access mode. To display such background image, the device may perform one or more different filtering operations on the current background image.

In some embodiments, any background image used in the secondary mode might contain text or watermark text such as "secondary access mode," "quick-access mode," "shared mode," "guest mode," or similar such words, to provide further textual indication of the secondary access mode of the device. In the example of FIG. 25, the background image of the home screen page 2520 contains a watermark, which states that the device is operating in the shared mode. The example of the home screen page 2520 shows that the label can also be rotated about an axis. The home screen page 2525 shows that the dock 2555 has been removed and a label has been placed at or near the previous position of the dock. The home screen page 2530 shows a similar label on the status bar 2560.

As mentioned above, when operating in the secondary access mode, the device of some embodiments displays only the icons of the applications that are available in this mode. Instead of removing the icons of the applications that are not available in the secondary access mode, the device of some embodiments provides a deprecated (e.g., grayed out, reduced in size, etc.) display of the icons of the unavailable applications and makes these icons non-selectable items in its user interface.

Figure 26:
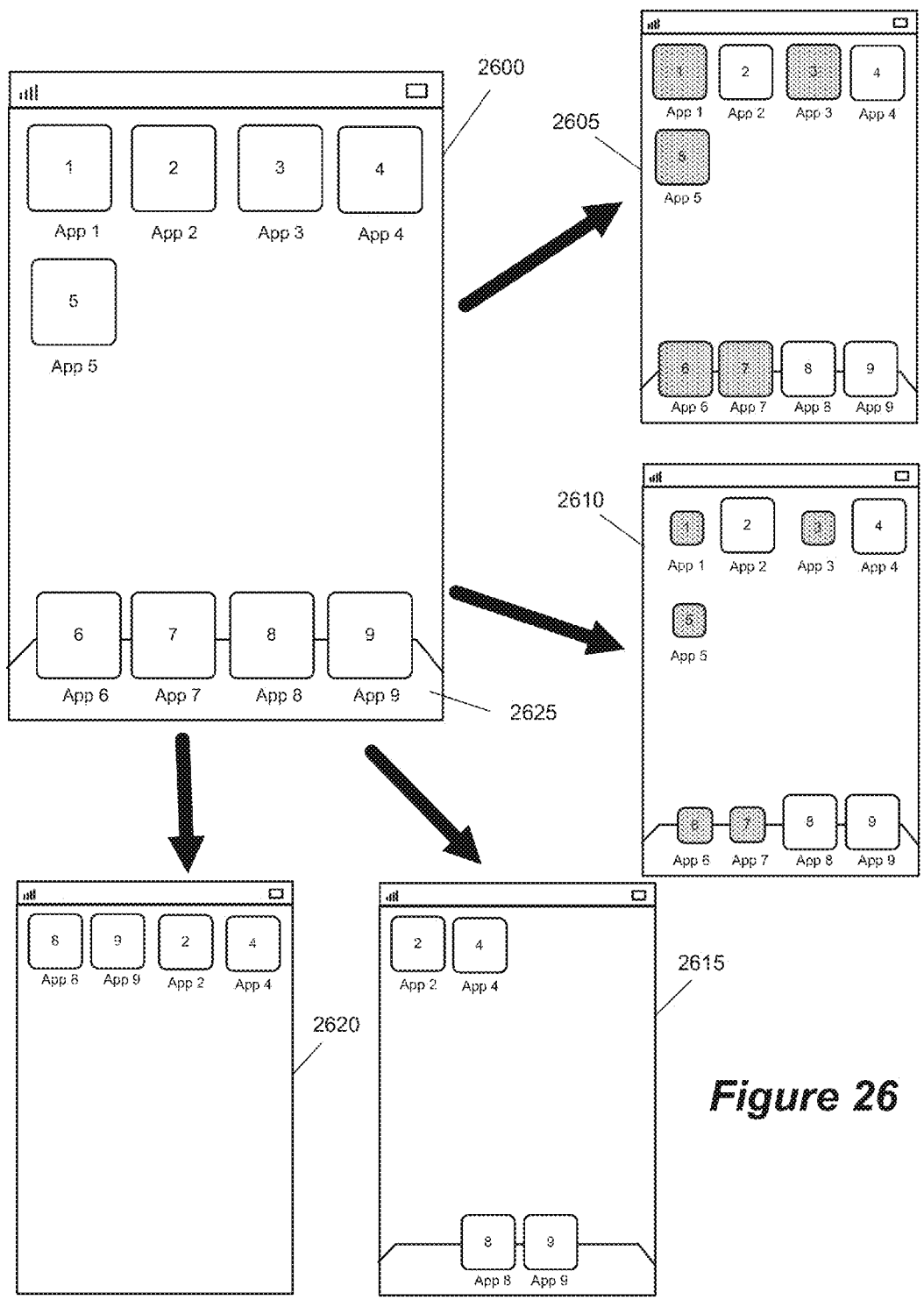
FIG. 26 illustrates different examples of changing the appearance of icons or hiding them in the secondary access mode of a mobile device.

FIG. 26 illustrates different examples of changing the appearance of icons or hiding them in the secondary access mode. As shown, the home screen page 2600 represents the device operating in the primary access mode. This figure also illustrates different example home screen pages when the device is operating in the secondary access mode. Specifically, the home screen page 2605 illustrates that the device of some embodiments greys out icons (e.g., make them semi-transparent) of applications that are restricted in the secondary access mode. Alternatively or conjunctively with greying out icons, the home screen page 2610 illustrates that the size of the icons may be altered (e.g., reduced or enlarged). In this example, the icons are reduced in size such that they appear as if they are in a plane with a different depth as compared to the icons of the applications that are accessible in the secondary access mode.

The home screen pages 2615 and 2620 illustrate examples of hiding icons of applications that are not accessible in the secondary access mode. One reason for hiding the icons over changing the icon's appearance is that the device looks less broken. That is, with icons that are functionless and appear different from other icons, the user of the device may believe that the device is malfunctioning. Another advantage of hiding the icons is that some users do not want anyone to know what applications that they have installed on their devices.

Referring to FIG. 26, as shown by the home screen page 2615, the device of some embodiments retains the dock 2625 in the secondary access mode. The home screen page 2615 also illustrates that the icons are aligned (e.g., center aligned) on the dock. As shown by home screen page 2620 the device of some embodiments removes the dock and places any remaining icons inline with other icons on the page. In some of these embodiments, the device reserves the first few icons slots on the first page of the secondary mode for the available-application icons that are removed from the dock.

In addition to removing icons, the mobile device of some embodiments rearranges icons. That is, the mobile device re-arranges the available icons on the displayed pages to remove any positions that are empty because of the removed icons. When there are folders with multiple icons in the primary access view, the device of some embodiments may move folder's icons that are accessible in the secondary access mode to a displayed page. In some embodiments, an icon will only be moved from the folder to the displayed page when that icon is the only one left in that folder. For example, if two icons are left in a folder as a result of entering the secondary access mode, that folder will remain in the secondary access mode with those two icons.

Figure 27:
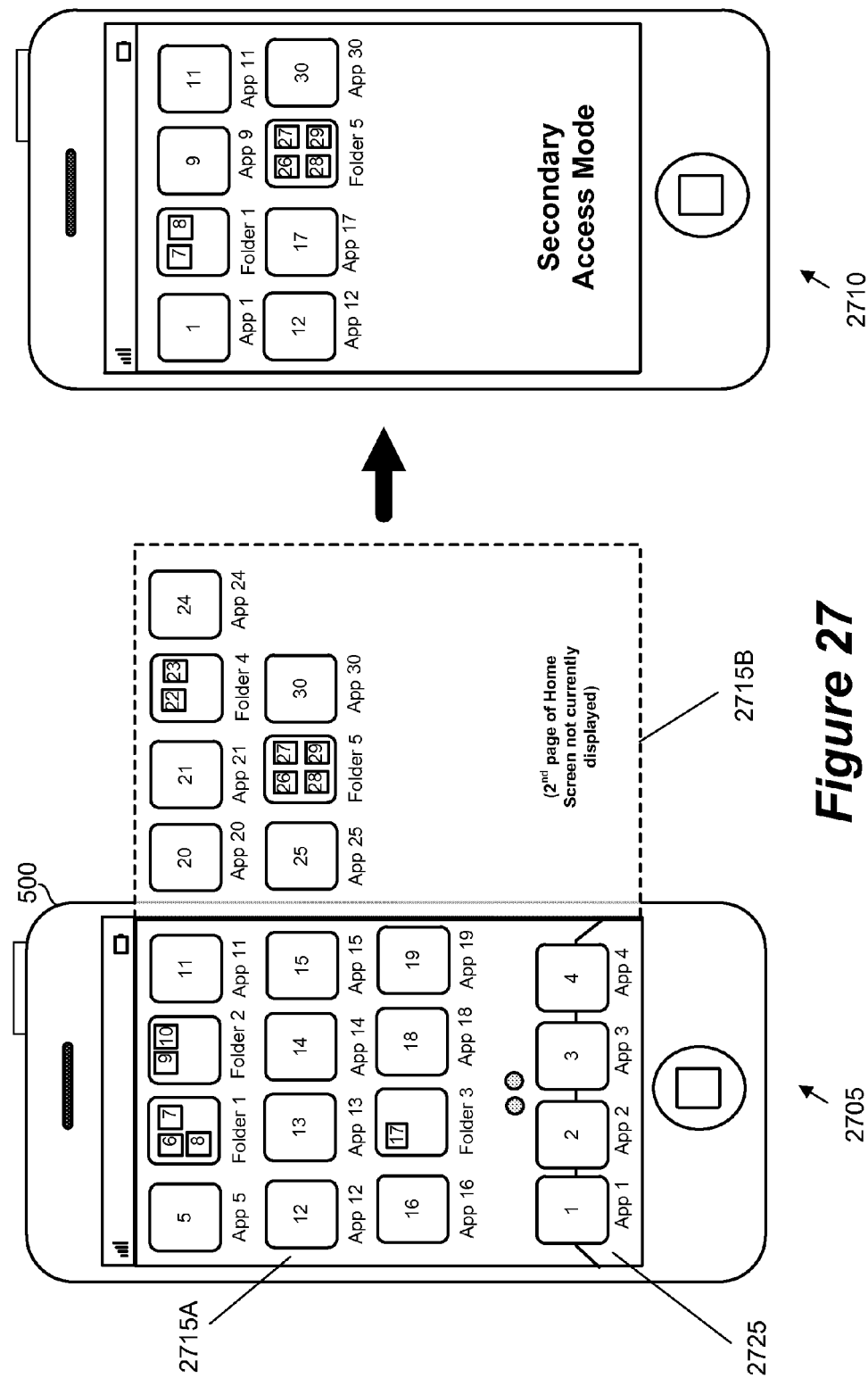
FIG. 27 illustrates an example of arranging icons when entering the secondary access mode of a mobile device.

FIG. 27 illustrates an example of arranging icons when entering the secondary access mode. Two operational stages 2705-2710 of the mobile device 500 are shown in this figure. Specifically, the stage 2705 shows the device in the primary access mode, and the stage 2710 shows the device in the secondary access mode.

The first stage 2705 presents the device 500 while it is operating in its primary access mode. In this mode, the user has access to all applications that execute on the device and that are available to a user of the device. The first stage 2705 illustrates thirty available applications, twenty-six of which are arranged in-line across multiple pages, and four of which are positioned in the dock 2725. Here, the page 2715A is the first page that is visible on the device' touch-sensitive screen, while the page 2715B represents the second page that is not currently displayed on the screen. In some embodiments, the user can place the user's finger on the touch-sensitive screen and perform a gesture (e.g., a swipe gesture) to switch between pages (e.g., switch to next or previous pages, depending on the direction of the swipe gesture).

Along with different icons, the first stage 2705 illustrates that the home screen pages include multiple different folders. Specifically, the two pages include five different folders with varying numbers of icons in them. The first folder, in the first page, includes three icons, the second folder, in the first page, includes two icons, the third folder, in the first page, includes one icon, the fourth folder, in the second page, includes two icons, and the fifth folder, in the second page, includes four icons. The user can select any one of these folders to view its content and make selections of the different icons. The user can also add one or more icons to a folder by selecting an icon and dragging it into that folder.

The second stage 2710 illustrates the device after it has been launched in the secondary access mode. Specifically, this stage illustrates that when operating in the secondary access mode, the device 500 displays only the icons of the applications that are accessible in the secondary access mode and removes the icons of the applications that are not available in the secondary access mode. The device has also removed the dock 2725 and placed on the displayed page, the icons of any available applications that were previously positioned in the dock (i.e., App 1).

Accordingly, in the second stage 2710 of the example illustrated in FIG. 27, the thirty icons of different applications that are available in the primary access mode have been reduced to twelve icons. The device has also removed any folder that contains only one icon and placed that icon on the displayed page. For example, Folder 3 that contained only the icon of the seventeenth application is not shown in the secondary access mode. Instead, the icon of the seventeenth application is now on the displayed homepage in the secondary access mode.

The second stage 2710 also illustrates that the device does not have an associated second page in the secondary access mode. This is because the remaining icons and folders can fit in the available slots on the first page and the icons have been compacted to that first page. Specifically, the icons have been compacted following their natural order, with any remaining icons from the dock taking the first few positions on the first row of the first page. Accordingly, the one remaining icon from the dock is the first icon on the first page.

Figure 28:
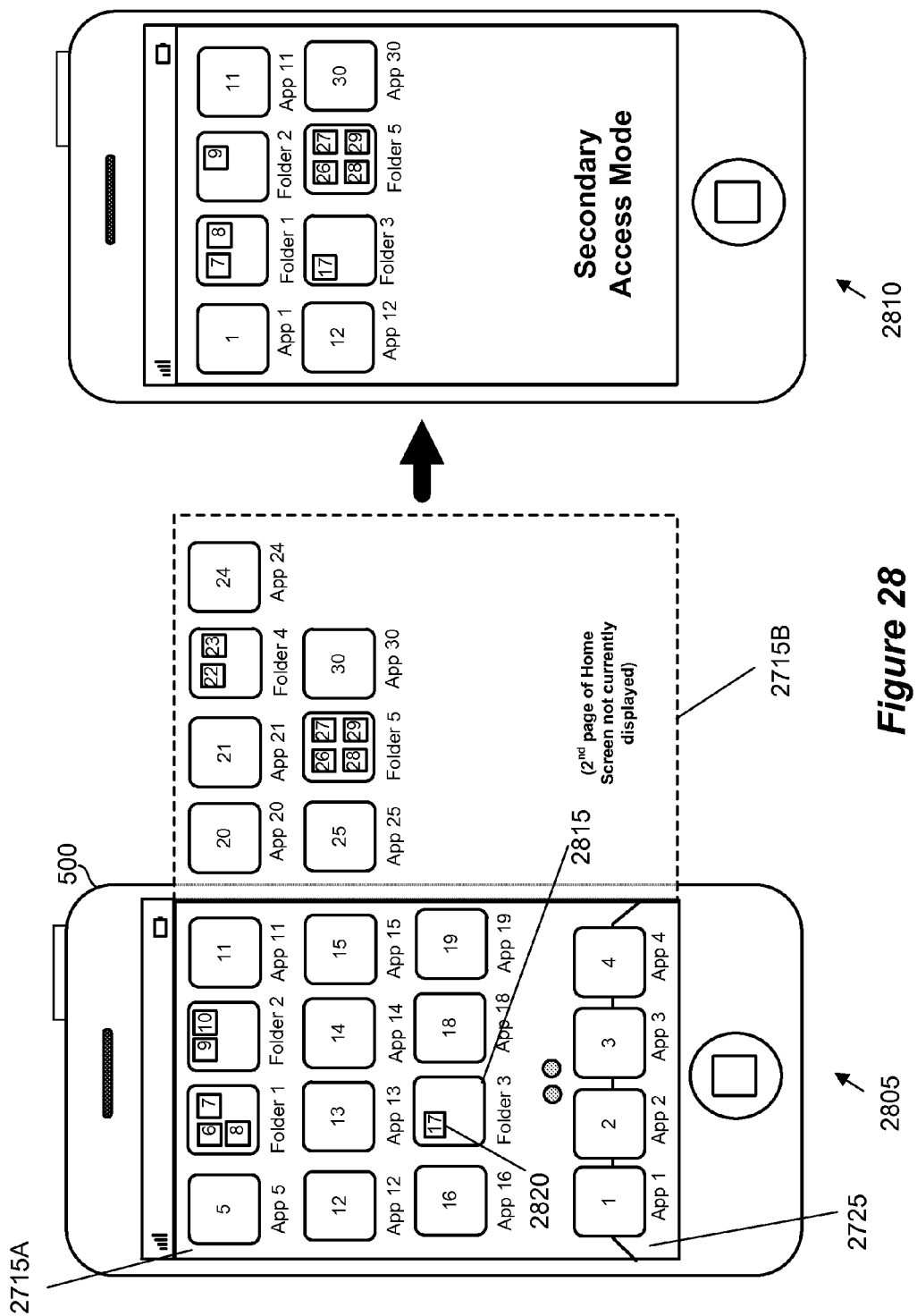
FIG. 28 illustrates an example of how folders with one or more icons in the primary access mode carry over to the secondary access mode.

FIG. 28 illustrates another example of arranging icons when entering the secondary access mode. Specifically, this figure illustrates how folders with at least one item (e.g., application icon) carry over to the secondary access mode. Two operational stages 2805 and 2810 of the mobile device 500 are in this figure. The first stage 2805 is identical to the first stage 2705 of the previous figure. In particular, the page 2715A includes a folder 2815 with one application icon 2820. The icon 2820 represents an application that is accessible in the secondary access mode of the mobile device.

The second stage 2810 illustrates the device 500 operating in the secondary access mode. This stage is similar to the second stage 2710 of the previous figure. However, the folder 2815 is carried over to the secondary access mode from the primary access mode. This is because the folder has at least one item in it (i.e., application icon 2820) that is still accessible in the secondary access mode. If a folder does not contain any items in the secondary access mode (e.g., its items are not accessible in the secondary access mode), that folder is not carried over from the primary access mode to the secondary access mode.

In the examples described above, the icons have been compacted following their ordering in the primary access mode with any remaining icons from the dock taking the first few positions on the first row of the first page. In some embodiments, the ordering of different item (e.g., the icons, folder) is not carried over from the primary access mode to the secondary access mode. For example, during a secondary access mode session, the icons of different applications can be rearranged. However, when the primary access mode session is started, the arrangement of icons and/or folders will remain the same as the previous primary access session.

Figure 29:
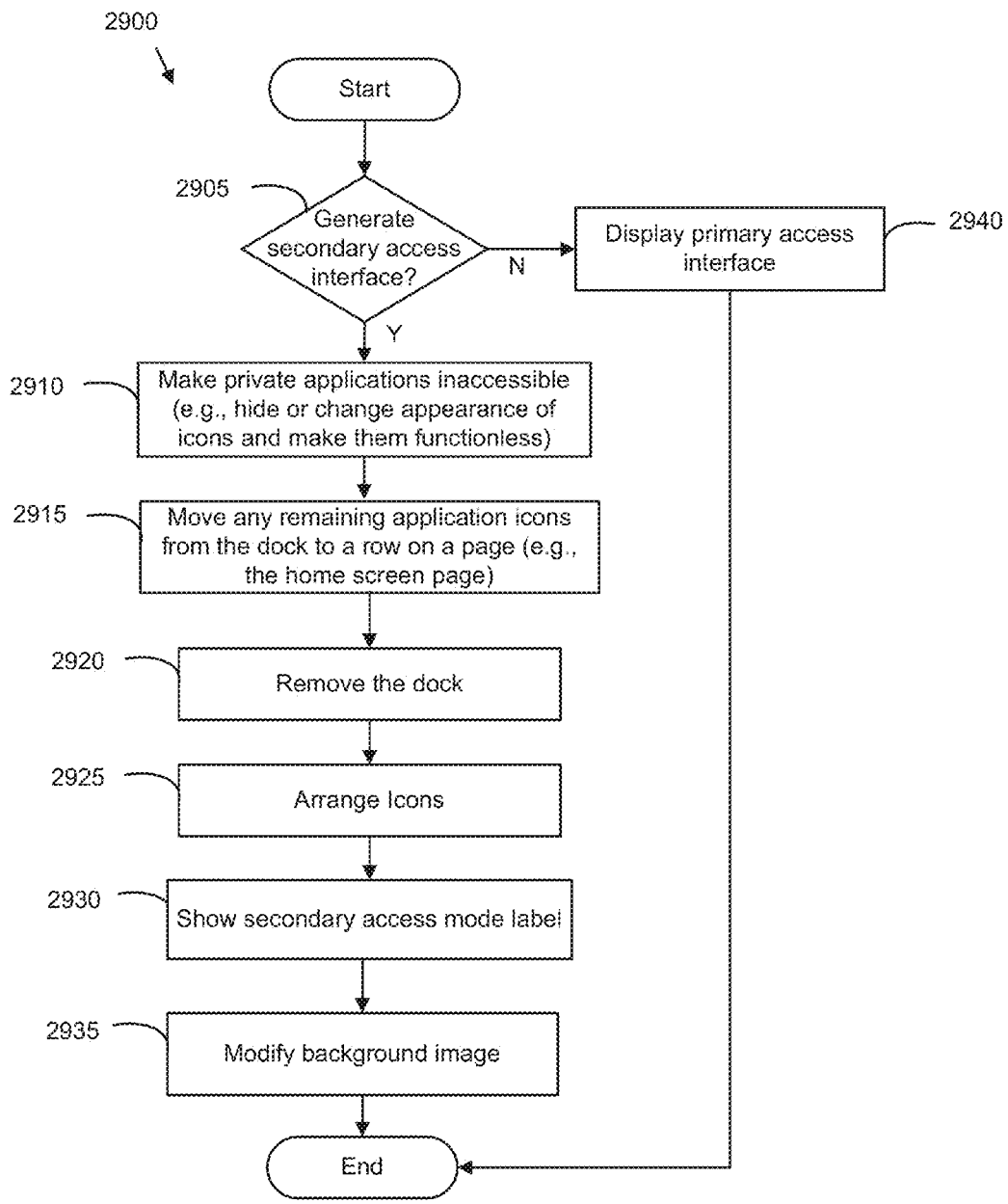
FIG. 29 conceptually illustrates a process that some embodiments perform to change a mobile device's appearance and make its applications inaccessible.

Having described examples device indications during the secondary access mode, an example process will now be described. FIG. 29 conceptually illustrates a process 2900 that some embodiments perform to change the device's appearance and make applications inaccessible. In some embodiments, the process 2900 is performed by a set of access modules associated with the device's operating system when it is instructed to place the device in the secondary access mode.

As shown in FIG. 29, the process 2900 begins by determining (at 2905) whether the device should generate a secondary access interface. Many examples of placing a device in the secondary access mode have been described above. For instance, the secondary access mode can be activated through a touch gesture on an affordance on a particular page (e.g., the lock screen page, the passcode page) of the device, through a motion gesture (e.g., rotating the device), through a voice command, etc. If the process 2900 determines that the secondary access mode interface should be generated, the process proceeds to 2910, which is described below. Otherwise, the process 2900 displays (at 2940) the primary access mode interface.

The process 2900 makes (at 2910) the private applications inaccessible. This may entail making icons of private applications functionless and changing the icons' appearances or hiding them. By making icons of applications functionless, the process makes the icons of the private applications incapable of launching their associated applications upon selection. For example, the touch input selection of an icon of a private application is ignored when the device is operating in the secondary access mode. In some embodiments, the process 2900 simply hides those icons, thereby making them inaccessible to the end-user. In changing the appearance of the icons, the process may visually distinguish the icons of the private applications from the other icons of other applications that are available in the secondary access mode. As mentioned above, the process may grey out the icons (e.g., change the opacity of the icons) and/or change their size (e.g., make them appear smaller, larger, or in a different depth plane).

At 2915, the process 2900 moves any remaining application icons from a dock (e.g., taskbar) to a row on a page (e.g., the home screen page). In some embodiments, the remaining icons of the dock are placed on the first row of the first page. However, in other embodiments, they can be placed elsewhere such as at the end of the first page, at the end of the last page if there are more than one page, etc. The process 2900 then removes (at 2920) the dock.

As shown, the process 2900 rearranges (at 2925) the remaining available icons on one or more pages. The process may rearrange the available icons on the displayed pages to remove any positions that are empty because of removed icons. Examples of rearranging icons are described in detail above by reference to FIG. 27. The process 2900 then generates a display of a secondary access mode label 2930. This label provides a visual indication to the user that the mobile device is operating in the secondary access mode. As mentioned above, the label may be placed in a number of different places, including the status bar, watermarked on the background, at the place where the dock used to be, etc.

At 2935, the process 2900 modifies the background image that is used for the pages displayed during the secondary access mode. For instance, the process 2900 might set the background image to a default image (e.g., out of box wallpaper, generic wallpaper). Instead of using a default background image during the secondary access mode, the process of some embodiments might use in this mode a slightly/highly blurred and/or tinted version of the background image used in the primary access mode. Alternatively or conjunctively with the background image, the process 2900 might select a particular color for the background in the secondary access mode, or specify a pattern based on a selected background image. The selected background image can also be scaled to fit a portion of one page, all of one page, etc.

Some embodiments perform variations of the process 2900. The specific operations of the processes 2900 may not be performed in the exact same order shown and described. The specific operations may not be performed in one continuous series of operations, and different specific operations may be performed in different embodiments. For example, if the process 2900 does not hide icons, then there may be no reason to arrange icons. Furthermore, the process 2900 could be implemented using several sub-processes, or as part of a larger macro process.

Having described several example device appearances during the secondary access mode, several example device behaviors will now be described below by reference to FIGS. 30-42. In some embodiments, the secondary access mode specifies different restrictions for accessing the applications of the devices, services (e.g., operating system services), and/or data stored on the device. For instance, during the secondary access mode, the device might (1) not allow the user to access data that is normally available in the primary access mode, (2) allow the user access the data but prevent that user from modifying the data, and/or (3) allow the user access a filtered or condensed version of the data.

FIGS. 30 and 31 provide an illustrative example of restricting access to private data in the secondary access mode. Specifically, FIG. 30 illustrates accessing user data associated with a web browser in the primary access mode, and FIG. 31 illustrates that same user data being inaccessible in the secondary access mode.

Three operational stages 3005-3015 of the device 500 in the primary access mode are shown in FIG. 30. The first stage 3005 shows several available applications, including a web browser that is represented on the dock 3090 with the icon 3080. To launch the web browser, the user performs a touch gesture (e.g., by tapping the user's finger) on the icon 3080. The selection of the icon causes the web browser to be opened, as illustrated in the second stage 3010.

The second stage 3010 illustrates that the browser has been opened to the user homepage. This is a custom homepage set by the user. In this second stage 3010, the user selects an affordance 3070 (e.g., a bookmark button) to direct the web browser to show any saved bookmarks. As shown in the third stage 3015, the selection results in the display of the bookmarks page 3060. The bookmarks page lists different bookmarks. In this example, the bookmarks include a couple of user specified bookmarks 3040 and 3045 and a couple of other default bookmarks 3050 and 3055. The default bookmarks are those that are not set by the end-user but are preset by the developer.

As shown in the third stage 3015, the bookmarks page 3060 also includes an affordance 3090 (e.g., the history tab). The user can select this affordance to show a history page that contains a list of webpages the user has visited recently and other associated data (e.g., page title and time of visit). The associated data may be recorded webpages for a specified period of time.

FIG. 31 illustrates three similar stages of the mobile device as the previous figure. However, in stages 3105-3115, the device is operating in the secondary access mode. The first stage 3105 shows several available applications. The icons of applications that are not accessible in the secondary access mode have been made functionless. In addition, those same icons have been made to appear different from the icons of applications that are accessible in the secondary access mode. As shown by the icon 3080, the web browser is one of the accessible applications. To launch the web browser, the user performs a touch gesture (e.g., by tapping the user's finger on) the icon 3080.

As shown in the second stage 3110, the selection of the icon causes the web browser to be opened. Different from the second stage 3010 of FIG. 30, the second stage 3110 here illustrates that the web browser has been opened to a default homepage. In some embodiments, the web browser presents the same homepage as the one selected for the primary access mode or presents a blank webpage. Alternatively, the default homepage may be any webpage that has been previously set (e.g., by the end-user for the secondary access mode or by the developer).

In this second stage 3110, the user selects the affordance 3070 (e.g., a bookmark button) to direct the web browser to show the saved bookmarks. As shown in the third stage 3115, the selection results in the display of the saved bookmarks. The third stage 3115 also illustrates that the user bookmarks are kept private in the secondary access mode. Specifically, the user bookmarks 3040 and 3045 that are shown in the third stage 3015 of the previous figure are not shown in this third stage 3115. The default bookmarks are still shown in the third stage 3115. However, the web browser may not be associated with any default bookmarks, in some embodiments. In the secondary access mode, the history page (not shown) that contains a list of recently visited webpages may appear blank. In other words, similar to the bookmarks, the history data may be kept private in the secondary access mode.

In the example described above, the user data that is normally available in the primary access mode is not available in the secondary access mode. To facilitate such private data restrictions, the application of some embodiments is associated with multiple data stores for different users or different modes. For example, the user may be associated with one or more folders or directories that store user files for the primary access mode. In some embodiments, the data that is available in the secondary access mode is persistent across different secondary access mode sessions. For example, if the user saves a bookmark in one secondary access mode session, then that same bookmark may be shown in another subsequent secondary access mode session.

In the example of FIG. 30, the affordance 3090 (the history tab) to show the history page is not shown. This allows the history to be completely hidden in the secondary access mode. Otherwise, one guest could see a previous guest's browsing history. Alternatively, the data that is available in the secondary access mode may not persist across different sessions but may be cached and cleared with each session.

Figure 32:
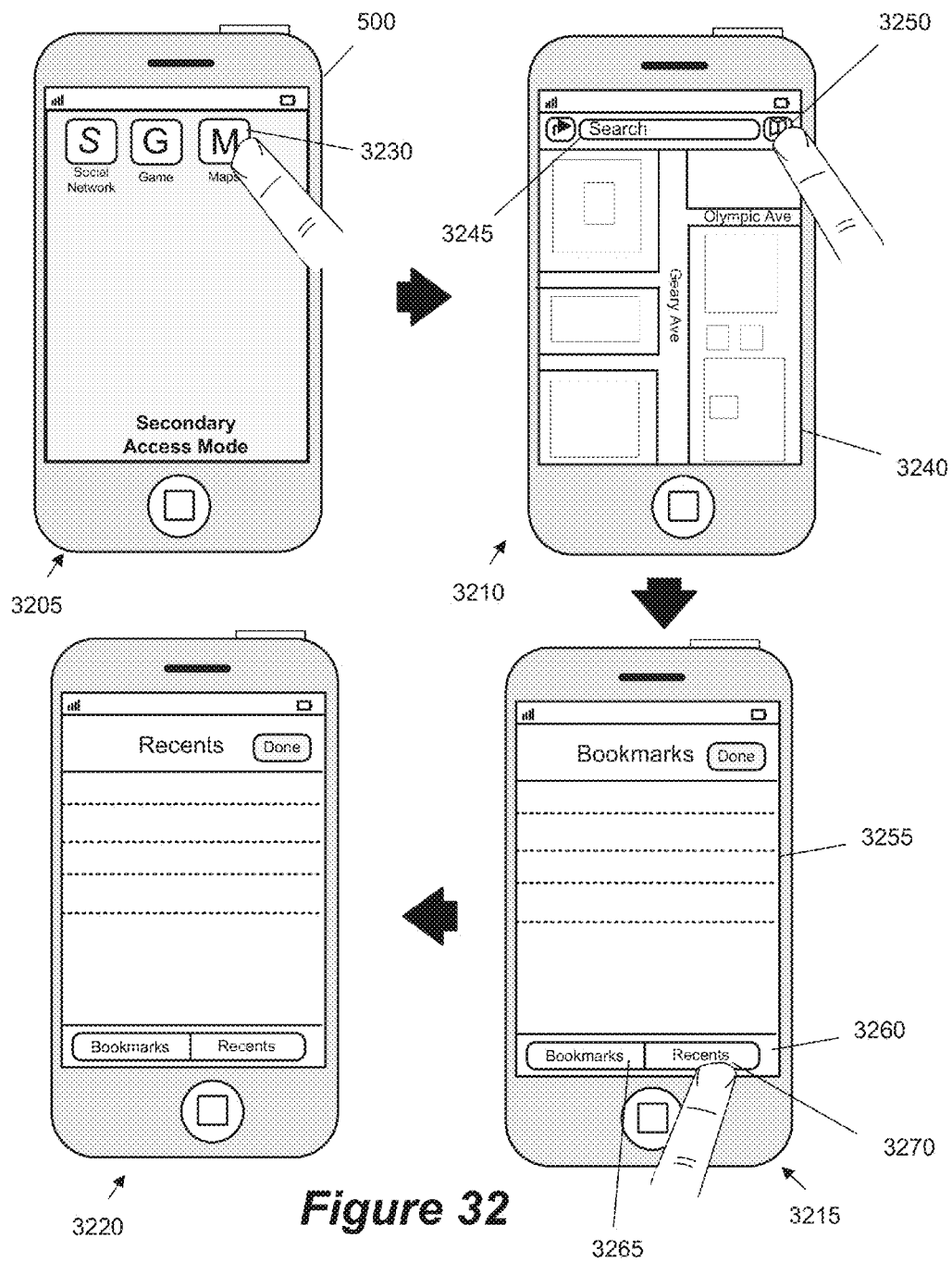
FIG. 32 provides an example of restricting access to private data in the secondary access mode of a mobile device.

FIG. 32 provides another example of restricting access to private data in the secondary access mode. Specifically, this figure illustrates in four operational stages 3205-3220 how user data associated with a map application is kept private when the mobile operates in the secondary access mode. The first stage 3205 illustrates a mobile device operating in the secondary access mode. In this example, the device 500 displays only the icons of the applications that are available in this mode and removes the icons of the applications that are not available in the secondary mode. As shown by the icon 3230, the map application is one of the accessible applications. To launch the map application, the user performs a touch gesture (e.g., by tapping the user's finger) on the icon 3230.

The second stage 3210 illustrates that the map application has opened a map 3240. The map application includes a search bar 3245 with an affordance 3250 (e.g., a bookmark button). The affordance can be selected to display any saved bookmarks. Here, the user selects this affordance. The selection results in the map application presenting the bookmarks page 3255, as illustrated in the third stage 3215. As bookmarks data is kept private in the secondary access mode, the bookmarks page 3255 does not list any bookmarks that have been saved in the primary mode.

Along the bottom of the bookmarks page is a bar 3260 with affordances 3265 and 3270 (e.g., a Bookmarks tab and a Recents tab) to switch between displaying bookmarks and recent searches (e.g., locations, places). In the third stage 3215, the user selects the affordance 3270 to direct the application to show the Recents page. The fourth stage 3220 illustrates that the selection results in the display of the Recents page 3280. As history data is kept private in the secondary access mode, the Recents page 3280 does not list any recent searches performed in the primary access mode.

In several of the previous examples, when the device is operating in the secondary access mode, the user cannot access data that would normally be accessible in the primary access mode. In addition to securing data, or instead of it, the secondary access mode of some embodiments places restrictions on one or more services (e.g., operating system services). In some embodiments, the device restricts access to a particular service when a corresponding application is set as being private in the secondary access mode. That is, when there is a one-to-one mapping between an application and a service, and that application is set to be private in the secondary access mode, the device of some embodiments sets that service to be disabled in the secondary access mode as well. For example, if a photo application is set to be disabled in the secondary access mode, all other applications that have access to the photos in the primary access mode will be denied access to those photos in the secondary access mode. Other examples of such mappings include a contacts application to a contacts service, a calendar application to a calendar service, a reminders application to a reminders service, etc. In some embodiments, when an application that has access to a service is running in memory and a secondary access mode session has been started, the device force quit the application and restarts it so that it does not have access to that service.

Figure 33:
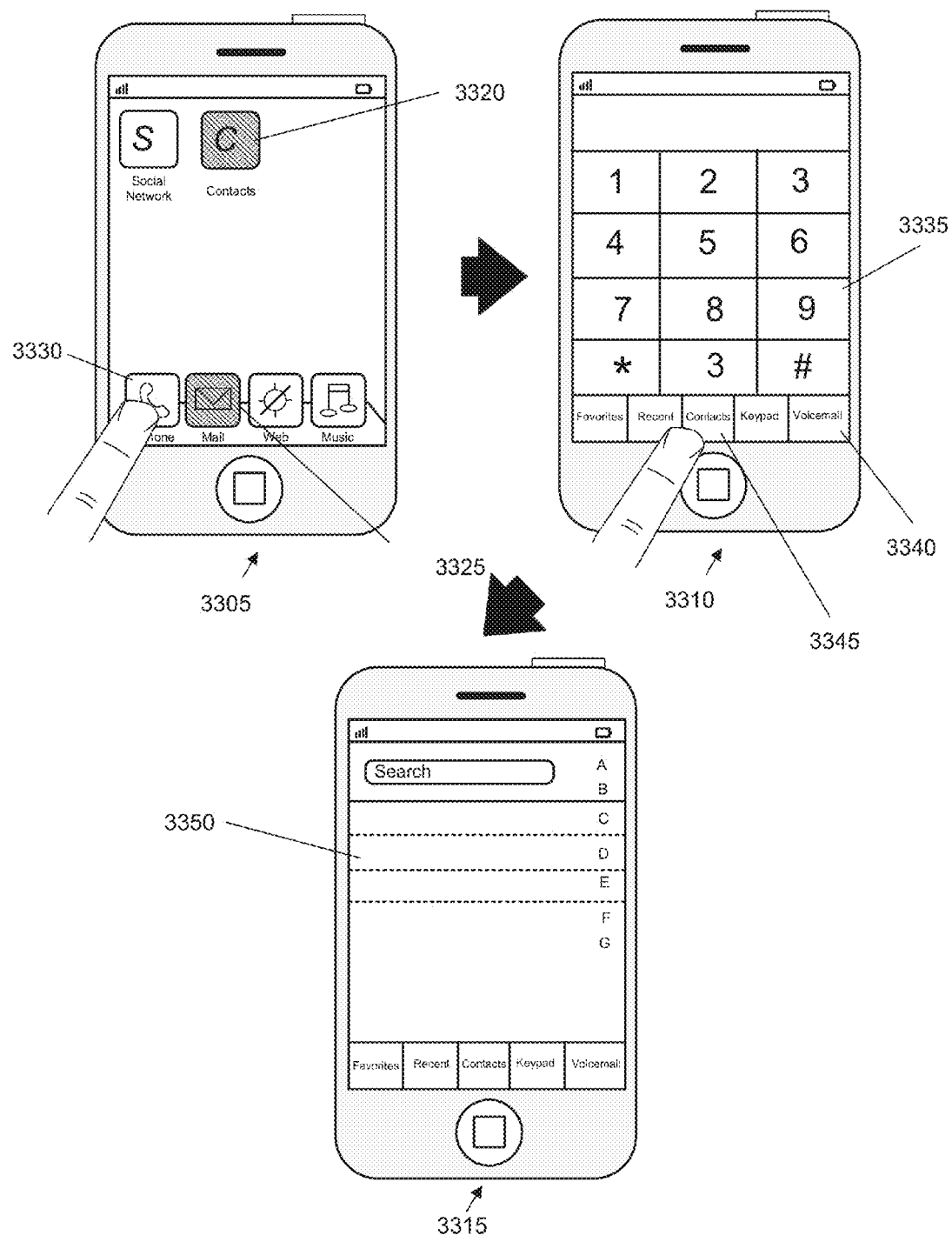
FIG. 33 illustrates an example of disabling a contacts service when a corresponding contacts application is disabled in the secondary access mode.

FIG. 33 illustrates an example of disabling a contacts service when a corresponding contacts application is disabled in the secondary access mode. Specifically, this figure illustrates in three operational stages 3305-3315 how a phone application is denied access to the contacts services as a result of the contacts application being treated as a private application in the secondary access mode.

The first stage 3305 illustrates the device operating in the secondary access mode. In this secondary access mode, the email application and the contacts application are inaccessible. Specifically, the icons 3320 and 3325 of the contacts application and the email application have been made functionless, and those same icons have been made to appear different from the icons of applications that are accessible in the secondary access mode. As shown by the icon 3330, the phone application remains accessible in the secondary access mode. In the first stage 3305, the user performs a touch gesture (e.g., by tapping the user's finger) on the icon 3330.

As illustrated in the second stage 3310, the selection of the icon 3330 in the previous stage causes the phone application to be opened. Here, the keypad page is shown on the display screen of the device. The keypad page 3335 is overlaid by a bottom bar 3340 that includes several affordances to switch between different pages (e.g., favorites, recent, contact, keypad, voicemail). To display the contacts page, the user selects the affordance 3345 (the contacts tab).

The third stage 3315 illustrates the device showing the contacts page 3350 of the phone application on its display screen. Specifically, it illustrates that the contacts page does not include any contacts. This is because the contacts application has been previously disabled for the secondary access mode. Accordingly, the phone application cannot access the contact service through which it receives contact data (e.g., the list of contacts). In some embodiments, the services may still be available but may return a null set (e.g., a list with no contacts). In the example described above, an empty contacts page is shown when the user selects the affordance 3345 (e.g., the contacts tab). In some embodiments, instead of showing an empty contacts page, the selection of the affordance 3345 causes a message to be displayed. The message may indicate that the user does not have access to contacts in the secondary access mode. In this manner, the device does not appear broken, or the phone application does not appear as if it cannot access the contacts data.

Figure 34:
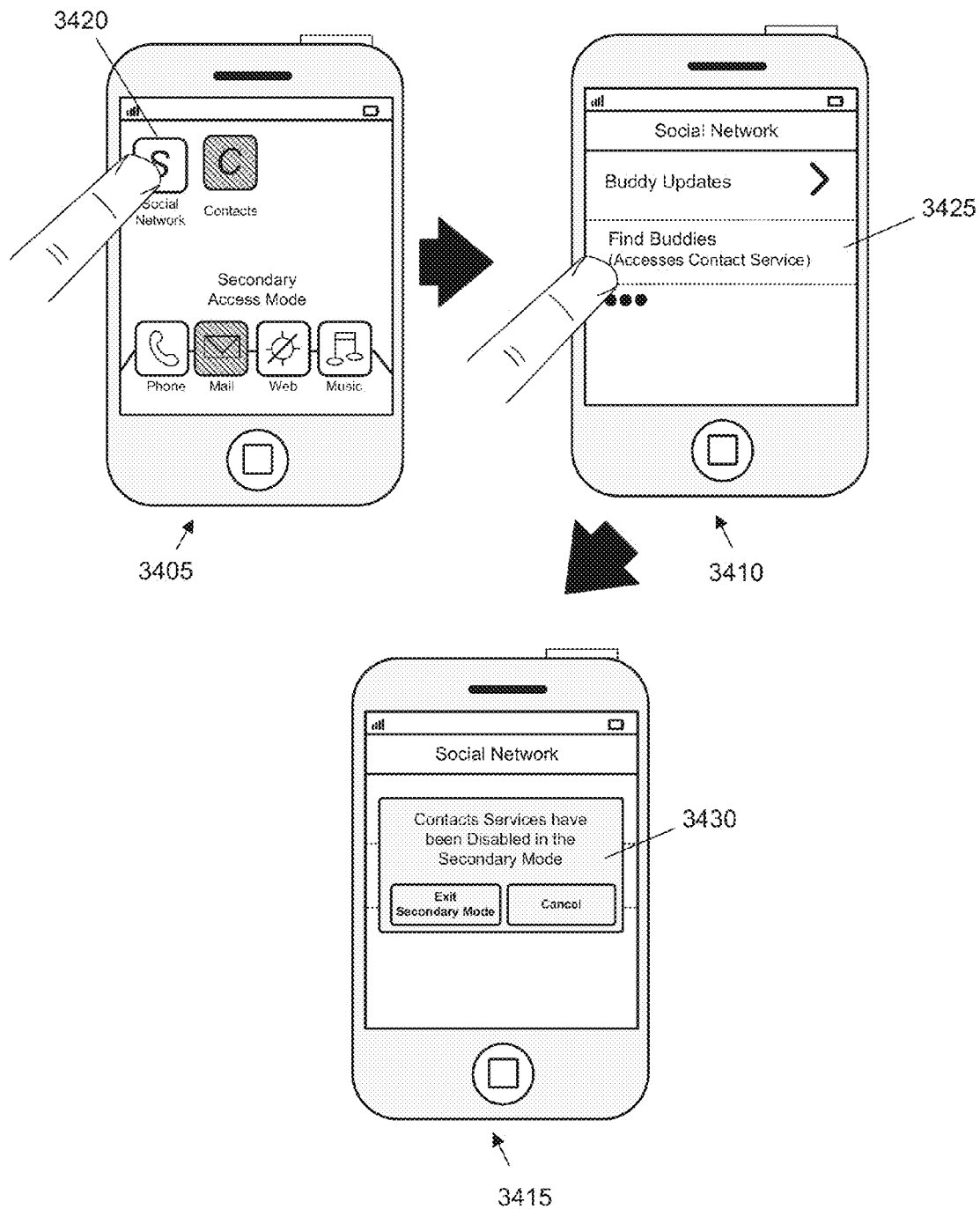
FIG. 34 illustrates an example of the contacts service that has been disabled in the secondary access mode with the contacts applications.

FIG. 34 illustrates another example of the contacts service that has been disabled in the secondary access mode along with the contacts applications. However, in this example, the application is not a first-party application but a third-party application that uses the contacts service. Three operational stages 3405-3415 of the mobile device are shown in this figure.

The first stage 3405 illustrates the device operating in the secondary access mode. Similar to the previous example, the email application and the contacts application are inaccessible. As shown by the icon 3420, the social network application remains accessible in the secondary access mode. In the first stage 3405, the user performs a touch gesture (e.g., by tapping the user's finger) on the icon 3420.

As illustrated in the second stage 3410, the selection of the icon 3420 results in the social network application being opened. The application has been opened to its menu. The menu includes an affordance 3425 that can be selected to find people that are in the user's contact directory. In particular, this feature accesses the contacts service to retrieve the contacts associated with the user and determines whether those contacts have been registered with the social network. The application then displays a page that includes a list of all the people in the contacts directory that have been registered with the social network.

In the second stage 3410, the user selects the affordance 3425. The selection causes a pop-up window 3430 to be displayed, as illustrated in the third stage 3415. The pop-up window includes a message that indicates that the contacts services have been disabled. In this example, the third stage 3415 shows that the window also includes an affordance to exit the secondary access mode and an affordance to close the window and return to the page.

Figure 35:
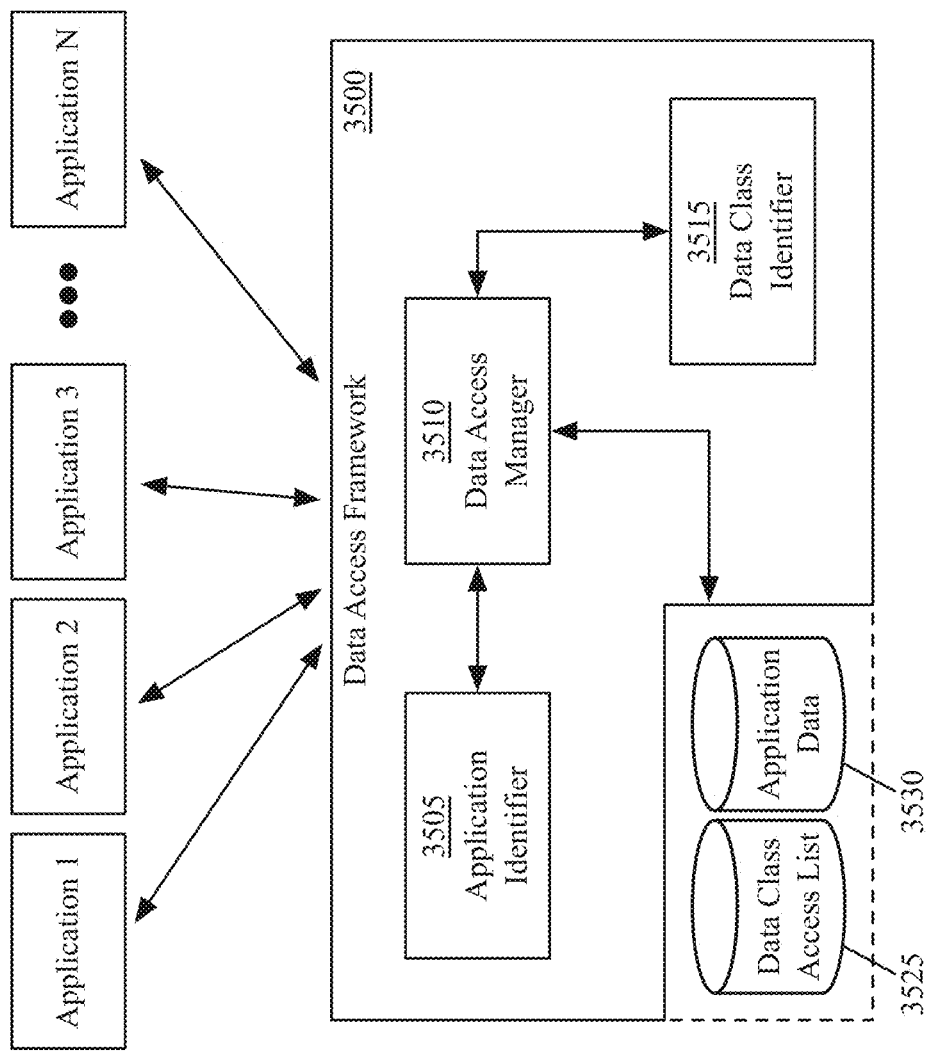
FIG. 35 conceptually illustrates a software architecture of a data access framework of some embodiments.

In several of the example described above, when operating in the secondary access mode, the device of some embodiments restricts access to data and/or services associated with different applications. FIG. 35 conceptually illustrates a software architecture of a data access framework 3500 of some embodiments. In some embodiments, the data access framework 3500 is a service for controlling access to data by applications operating on a mobile device with multiple access modes. Different embodiments of the data access framework 3500 are implemented differently. For instance, in some embodiments, the data access framework 3500 is implemented as a stand-alone service. The data access framework 3500 of some embodiments is a service that is integrated into another application while the data access framework 3500 of other embodiments might be implemented as a service within an operating system (e.g., iOS®, provided by Apple Inc.).

Furthermore, in some embodiments, the data access framework 3500 is provided as part of a server-based solution. In some such embodiments, the data access framework 3500 is provided via a thin client. That is, the data access framework 3500 runs on a server while a user interacts with the data access framework 3500 via a separate machine remote from the server. In other such embodiments, the data access framework 3500 is provided as a thick client. That is, the data access framework 3500 is distributed from the server to the client machine and runs on the client machine.

As shown, the data access framework 3500 includes an application identifier 3505, a data access manager 3510, and a data class identifier 3515. The data access framework 3500 also includes data class access list storage 3525 and application data storage 3530. In some embodiments, the data class access list storage 3525 stores different data class access lists for different access modes (e.g., a primary access mode, a secondary access mode, etc.) of the mobile device. Each data access list specifies different data classes that are accessible by different applications for the corresponding access mode. Different embodiments specify data classes any number of different ways. For instance, some embodiments specify data classes based on applications (e.g., an address book data class, a photo data class, a calendar data class, etc.), based on types of data for a particular application (e.g., a bookmark data class for a web browsing application, a phone number data class for an address book application, a search history data class (e.g., recent searches) for a web browsing or mapping application, etc.), and/or based on any other type of criteria for defining data classes, etc.

In some embodiments, some applications operable on the mobile device are each associated with a corresponding service. For instance, a contacts application is associated with an address book service, a calendar application is associated with a calendar event service, a photo application is associated with a media asset service, etc. In some embodiments, when one such application is kept private for a secondary access mode of the mobile device, the mobile device also prevents any application from accessing the service associated with the application by ensuring that the data class access list for the secondary access mode does not contain any entries or records that specify data classes associated with the application or the service associated with the application. For instance, when a contacts application is kept private for the secondary access mode, the mobile device prevents any application from accessing the address book service associated with the contacts application by ensuring that the data class access list for the secondary access mode does not contain any entries or records that specify an address book data class.

The application data storage 3530 stores the data of different applications that are operable on the mobile device. In some embodiments, the storages 3525 and 3530 are implemented in one physical storage while, in other embodiments, the storages 3525 and 3530 are implemented on separate physical storages. Still, in some embodiments, some or all of the storages 3525 and 3530 are implemented across several physical storages.

The data access manager 3510 is responsible for controlling access to the application data stored in storage 3530 by Applications 1-N. In some embodiments, the data access manager 3510 receives requests (e.g., via application programming interface (API) calls) from any one of the Applications 1-N for access to application data in storage 3530. When the data access manager 3510 receives such a request, the data access manager 3510 utilizes the application identifier 3505 and data class identifier 3515 to identify (1) the requesting application and (2) the data class of the requested data. The data access manager 3510 then accesses the storage 3525 to retrieve the data class access list that corresponds to the access mode in which the mobile device is operating.

Based on the data class access list, the identified application, and the identified data class, the data access manager 3510 determines whether to allow the requesting application access to the requested data. As described above, each data access list specifies different data classes that are accessible by different applications for a corresponding access mode. As such, the data class manager 3510 identifies any entries and/or records in the data class access list that specify the identified application. If an entry exists that specifies the identified data class of the requested data, the data access manager 3510 retrieves the data and returns the data to the requesting application. Otherwise, the data access manager 3510 returns an empty or null data to the requesting application. In some embodiments, the data access manager has full access permissions (e.g., create, read, write, and delete permissions) to the data access lists stored in the storage 3525 only when the mobile device is operating in the primary access mode. When the mobile device is operating in a non-primary access mode (e.g., a secondary access mode), the data access manager 3510 has only read access to the data access lists stored in the storage 3525. That is, while in the non-primary access mode, the data access manager 3510 is prevented from creating, modifying, and/or deleting data access lists stored in the storage 3525.

The application identifier 3505 handles the identification of an application (e.g., application 1, application 2, application 3, application N, etc.) making a request for access to application data. In some embodiments, the application identifier 3505 receives such a request from the data access manager 3510 (which the data access manager 3510 received from one of the applications 1-N). When the application identifier 3505 receives the request, the application identifier 3505 determines the application making the request and returns this information to the data access manager 3510. In some embodiments, the application identifier 3505 determines the identity of the requesting application based on information (e.g., metadata) sent along with the request that uniquely identifies the application.

The data class identifier 3515 identifies the data class of data that is requested for access. In some embodiments, the data class identifier 3515 receives a request for data from the data access manager 3510 (which the data access manager 3510 received from one of the applications 1-N). When the data class identifier 3515 receives the request, the data class identifier 3515 determines the data class of the requested data and returns this information to the data access manager 3510. The data class identifier 3515 of some embodiments determines the data class of the requested data based on information (e.g., metadata) sent along with the request that specifies the data class of the requested data.

While many of the features in this example have been described as being performed by one module (e.g., the data access manager 3510), one of ordinary skill in the art would recognize that the functions might be split up into multiple modules. Similarly, the functions described as being performed by multiple different modules in this example might be performed by a single module in some embodiments (e.g., the application identifier 3505 might be part of the data access manager 3510).

When operating in the secondary access mode, the mobile device of some embodiments allows a user to access filtered versions of data associated with applications operable on the mobile device. For instance, in some embodiments, a notification feature of the mobile device provides a summary of alerts (also referred to as notification messages) from different application operating on the mobile device. A user of the mobile device may designate the applications of which alerts are displayed in the notification feature and the manner in which the alerts appear in the notification feature, in some embodiments. While the mobile device is operating in the secondary access mode, the mobile device presents a modified version of alerts in order to prevent sensitive and/or private information from being displayed to users of the mobile device.

Figure 36:
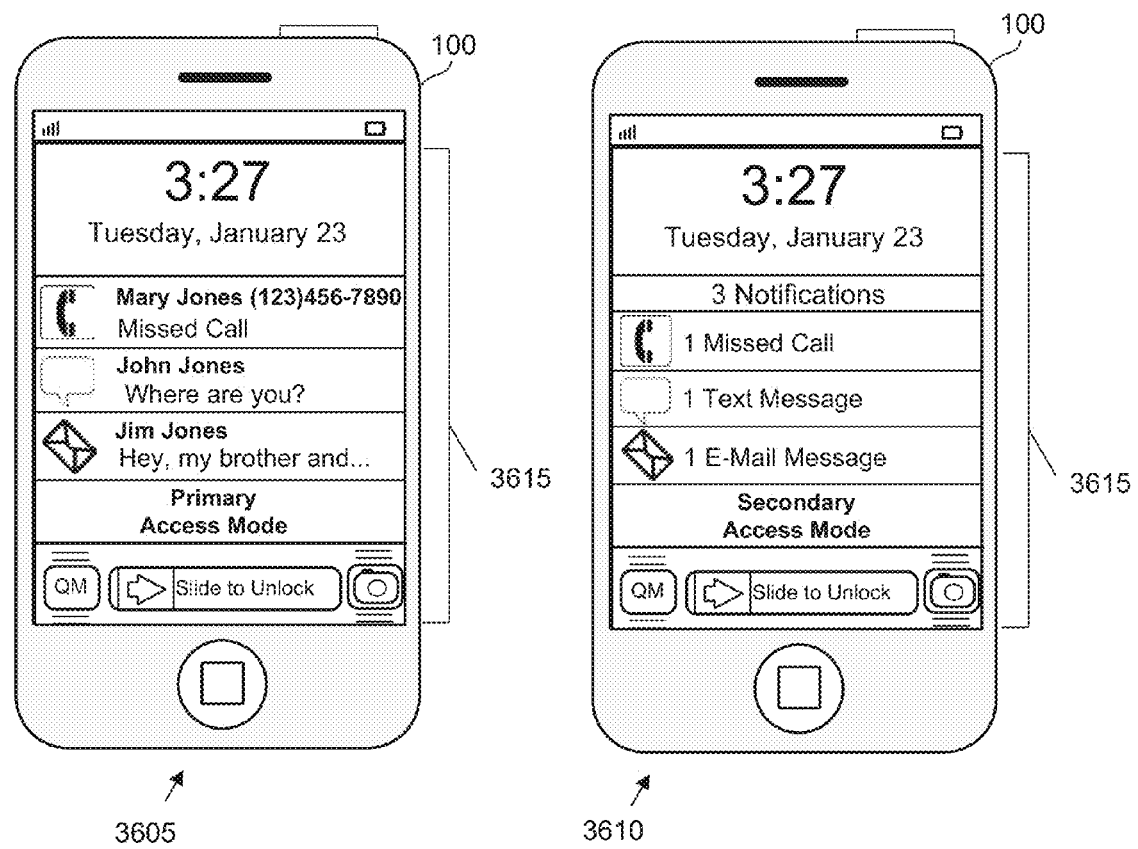
FIG. 36 conceptually illustrates an example of different appearances of notification messages provided in different access modes according to some embodiments of the invention.

FIG. 36 conceptually illustrates an example of different appearances of notification messages provided in different access modes according to some embodiments of the invention. Specifically, FIG. 36 illustrates a lock-screen page 3615 of the mobile device 100 at two stages 3605 and 3610 that show different appearances of notification messages for different access modes. In some embodiments, the lock-screen page 3615 is presented when the mobile device 100 is in a locked state. The mobile device 100 continues to receive and display notification messages in the lock-screen page 3615 until the mobile device 100 is unlocked, at which point the notification messages in the lock-screen page 3615 are cleared.

The first stage 3605 illustrates the lock-screen page 3615 of the mobile device 100 that is presented while the mobile device 100 is in a primary access mode. As shown, the lock-screen page 3615 presents several notification messages. In particular, the lock-screen page 3615 shows a notification message indicating a missed phone call was received from Mary Jones at telephone number (123) 456-7890, a notification message indicating a text message was received from John Jones and a portion of the content of the text message, and a notification message indicating an email was received from Jim Jones and a portion of the content of the email.

The second stage 3610 illustrates the lock-screen page 3615 of the mobile device 100 that is presented while the mobile device 100 is in a secondary access mode. At the second stage 3610, the lock-screen page 3615 presents a condensed version of the notification messages illustrated in the first stage 3605 in order to suppress sensitive and/or private information in the notification messages. As shown in the second stage 3610, the lock-screen page 3615 shows a summary of a total number of current notification messages, a notification message indicating a missed phone call was received, a notification message indicating a text message was received, and a notification message indicating an email was received.

Figure 37:
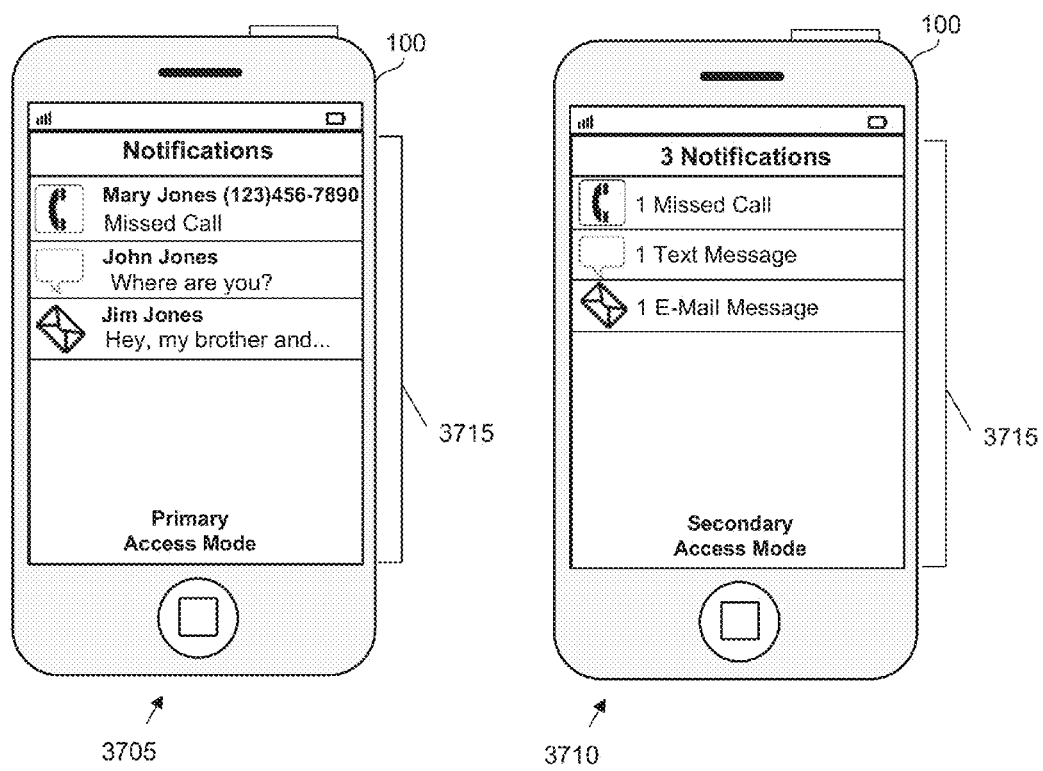
FIG. 37 conceptually illustrates another example of different appearances of notification messages provided in different access modes according to some embodiments of the invention.

FIG. 37 conceptually illustrates another example of different appearances of notification messages provided in different access modes according to some embodiments of the invention. In particular, FIG. 37 illustrates a notification page 3715 of the mobile device 100 at two stages 3705 and 3710 that show different appearances of notification messages for different access modes. In some embodiments, the notification page 3715 is presented when the mobile device 100 receives a defined gesture (e.g., a swipe in a downwards direction) at a defined location (e.g., at or near the center of the top portion) of the display screen of the mobile device 100. The mobile device 100 continues to display each of the notification messages in the notification page 3715 (when the notification page 3715 is invoked) until a user manually clears the notification message, opens the application associated with the notification message, and/or a defined amount of time has passed since the notification message was received.

The first stage 3705 illustrates the notification page 3715 of the mobile device 100 that is presented while the mobile device 100 is in a primary access mode. As shown, the notification page 3715 presents several notification messages. In particular, the notification page 3715 shows a notification message indicating a missed phone call was received from Mary Jones at telephone number (123) 456-7890, a notification message indicating a text message was received from John Jones and a portion of the content of the text message, and a notification message indicating an email was received from Jim and a portion of the content of the email.

The second stage 3710 illustrates the notification page 3715 of the mobile device 100 that is presented while the mobile device 100 is in a secondary access mode. At the second stage 3710, the notification page 3715 presents a modified version of the notification messages illustrated in the first stage 3705 in order to suppress sensitive and/or private information in the notification messages. As illustrated in the second stage 3710, the notification page 3715 shows a summary of a total number of notification messages, a notification message indicating a missed phone call was received, a notification message indicating a text message was received, and a notification message indicating an email was received.

Figure 38:
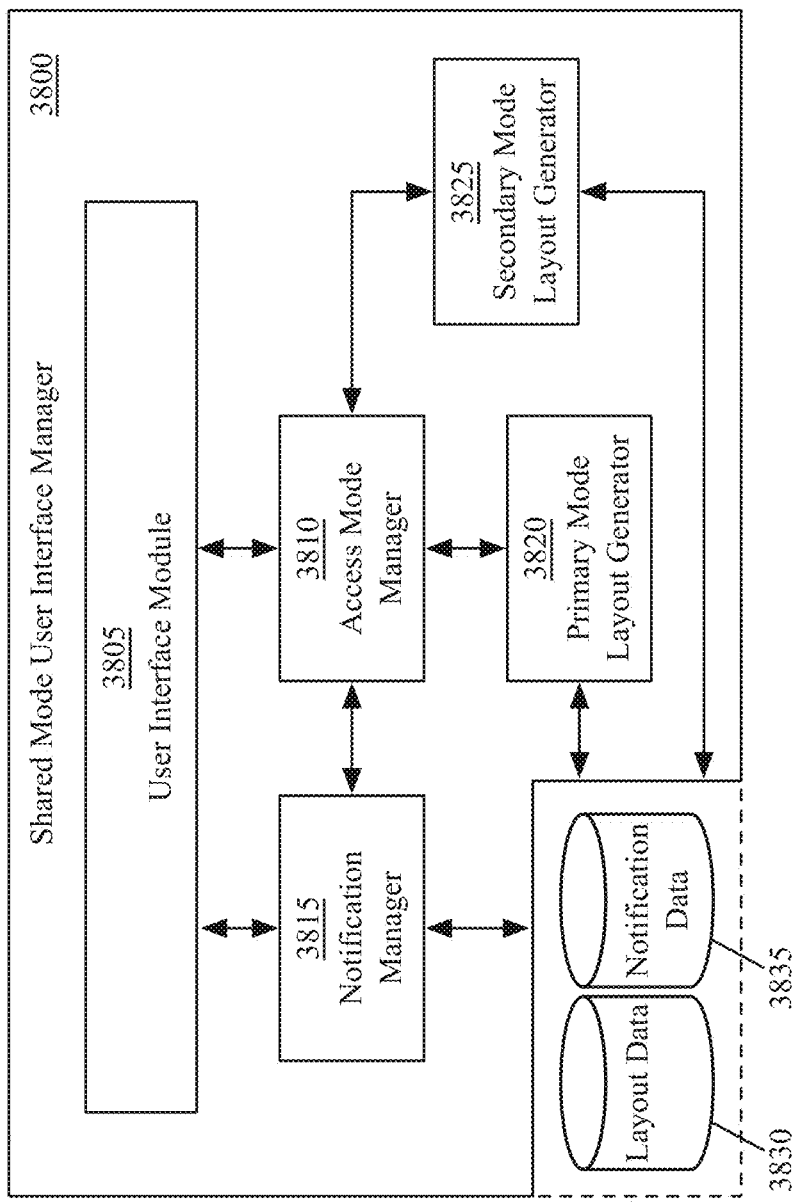
FIG. 38 conceptually illustrates a software architecture of a shared mode user interface (UI) manager of some embodiments.

FIG. 38 conceptually illustrates a software architecture of a shared mode user interface (UI) manager 3800 of some embodiments. In some embodiments, the shared mode UI manager 3800 of some embodiments runs on a mobile device that is operable in multiple access modes, including the secondary access mode described in this application. Specifically, the shared mode UI manager 3800 manages the arrangements and layouts of the UIs for different access modes.

The shared mode UI manager 3800 of different embodiments is implemented differently. For instance, in some embodiments, the shared mode UI manager 3800 is implemented as a stand-alone application. The shared mode UI manager 3800 of some embodiments is integrated into another application while the shared mode UI manager 3800 of other embodiments might be implemented within an operating system (e.g., iOS®, provided by Apple Inc.).

In some embodiments, the shared mode UI manager 3800 is provided as part of a server-based solution. In some such embodiments, the shared mode UI manager 3800 is provided via a thin client. That is, the shared mode UI manager 3800 runs on a server while a user interacts with the shared mode UI manager 3800 via a separate machine remote from the server. In other such embodiments, the shared mode UI manager 3800 is provided as a thick client. That is, the shared mode UI manager 3800 is distributed from the server to the client machine and runs on the client machine.

As shown in FIG. 38, the shared mode UI manager 3800 includes a user interface (UI) module 3805, an access mode manager 3810, a notification manager 3815, a primary mode layout generator 3820, and a secondary mode layout generator 3825. The shared mode UI manager 3800 also includes layout data storage 3830 and notification data storage 3835.

The layout data storage 3830 stores information (rules, templates, etc.) defining different layouts for different access modes, background images for different access modes, icons to display in different access modes, different appearances of icons for different access modes, etc. The notification data storage 3835 stores notification messages for display in a notification feature of the mobile device. In some embodiments, the storages 3830 and 3835 are implemented in one physical storage while, in other embodiments, the storages 3830 and 3835 are implemented on separate physical storages. Still, in some embodiments, some or all of the storages 3830 and 3835 are implemented across several physical storages.

The UI module 3805 manages the display of the UI and outputs this display information to the display screen of the mobile device. In some embodiments, the UI module 3805 receives (1) layout information (e.g., the arrangement of icons, the appearance of the icons, the appearance of a background, etc.) from the access mode manager 3810 for the home screen page(s) and for various tasks (e.g., video conferencing, making and receiving telephone calls, etc.) performed on the mobile device, (2) notification information (e.g., notification messages to display, the content of the notification messages, the appearance of the notification messages, etc.) from the notification manager 3815 for display in a notification feature of the mobile device, etc., in order to display the UI.

The access mode manager 3810 manages the different layouts to display based on the access mode in which the mobile device is operating. For instance, when the mobile device is operating in a primary access mode, the access mode manager 3810 directs the primary mode layout generator 3820 to generate a layout and then provides the layout to the UI module 3805 for display on the display screen of the mobile device. When the mobile device is operating in a secondary access mode (or other non-primary access modes), the access mode manager 3810 directs the secondary mode layout generator 3825 to generate a layout and then passes the layout to the UI module 3805 for display on the display screen of the mobile device.

The notification manager 3815 is responsible for managing notification messages for display in a notification feature of the mobile device. In some embodiments, the notification manager 3815 interfaces with the access mode manager 3810 to receive information from the access mode manager 3810 that indicates the access mode in which the mobile device is operating. The notification manager 3815 provides the UI module 3805 different formats of the notification messages based on the access mode in which the mobile device is operating. For instance, in some embodiments, the notification manager 3815 formats the notification messages according to the manner specified by the user of the mobile device when the mobile device is operating in the primary access mode and provides the notifications to the UI module 3805 for display in the notification feature.

When the mobile device is operating in the secondary access mode (or other non-primary access modes), the notification manager 3815 formats the notification messages according to a defined shared mode format (irrespective of the manner specified by the user of the mobile device). For instance, in some embodiments, the notification manager 3815 removes information of the content (e.g., the content of emails, text messages, social media messages, etc.) to which the notification messages relate and includes only information about the applications with which the notification messages are associated and the number of notification messages associated with each of the applications. In other words, the notification manager 3815 in some such embodiments generates a filtered version of the notification messages with sensitive and/or private information redacted so that such information is not presented to users when the mobile device is operating in the secondary access mode. Examples of such filtered notification messages are above by reference to FIGS. 36 and 37. In some embodiments, when the mobile device is operating in the secondary access mode (or other non-primary access modes), the notification manager 3815 suppresses the display of the notification messages in the notification feature by sending the UI module 3805 an empty or null set of data and/or information indicating that notification messages are being suppressed.

The primary mode layout generator 3820 of some embodiments generates layouts for the primary access mode of the mobile device. In some embodiments, the primary mode layout generator 3820 accesses the layout data storage 3830 for information and data to specify the arrangement of icons, the appearance of the icons, the background image, etc. for the primary access mode layout.

In some embodiments, the secondary mode layout generator 3825 generates layouts for the secondary access mode (or other non-primary access modes) of the mobile device. The secondary mode layout generator 3825 of some embodiments accesses the layout data storage 3830 for information and data to specify the icons in the layout, the arrangement of icons, the appearance of the icons, the background image, visual/textual indications that the mobile device is in the secondary access mode, etc. for the secondary access mode layout.

The secondary mode layout generator 3825 of some embodiments generates layouts for various tasks performed on the mobile device. For the layout of some tasks, the secondary mode layout generator 3825 filters information that would otherwise be displayed in the primary access mode. For instance, when the secondary mode layout generator 3825 generates layouts for receiving a telephone or video conference call while the mobile device is in the secondary access mode, the secondary mode layout generator 3825 suppresses the telephone number and/or contact information (e.g., name of contact, location of contact, etc.) of the party from which the mobile device is receiving the call.

While many of the features in this example have been described as being performed by one module (e.g., the notification manager 3815), one of ordinary skill in the art would recognize that the functions might be split up into multiple modules. Similarly, the functions described as being performed by multiple different modules in this example might be performed by a single module in some embodiments (e.g., the primary mode layout generator 3820 might be part of the secondary mode layout generator 3825).

In several of the examples described above, the mobile device performs a filtering operation to present data in the secondary access mode. In some embodiments, the mobile device allows a user to access data associated with an application but does not allow the user to modify that data. For example, when transitioning to the secondary access mode, the device of some embodiments changes the attribute of the data to be read-only data. This read-only data cannot be deleted or modified during the secondary access mode session. Several examples of such read-only data will now be described by reference to FIGS. 39 and 40.

Figure 39:
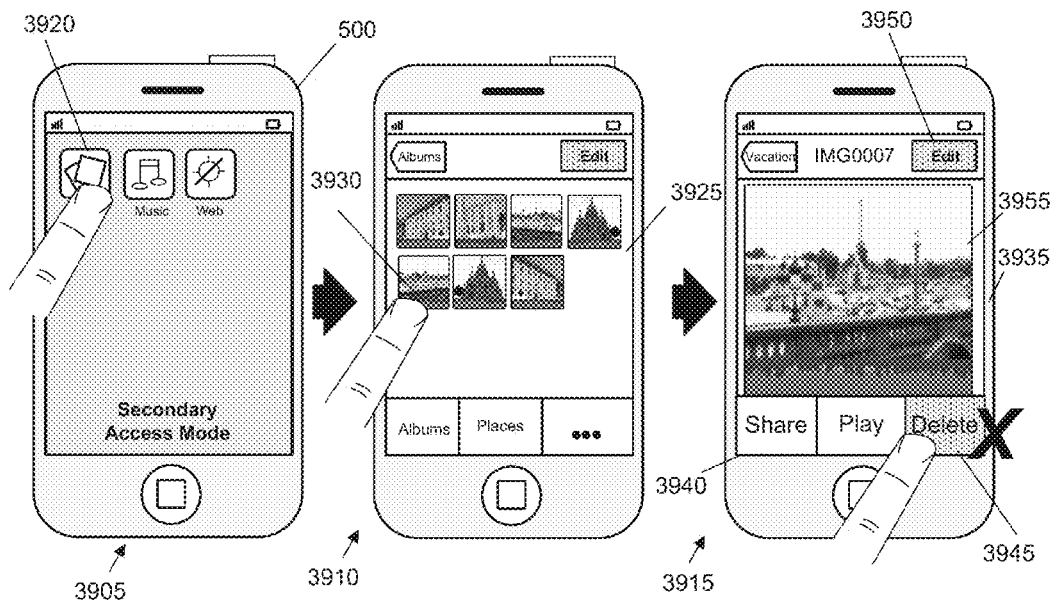
FIG. 39 illustrates an example of applications set to be read-only in the secondary access mode.

FIG. 39 illustrates an example of how some embodiments set images to be read-only during the secondary access mode. Three operational stages 3905-3915 of a mobile device 500 are shown in this figure. The first stage 3905 illustrates the device operating in the secondary access mode. As shown by the icon 3920, the photos application remains accessible in the secondary access mode. In the first stage 3905, the user performs a touch gesture (e.g., by tapping the user's finger) on the icon 3920.

As illustrated in the second stage 3910, the selection of the icon 3920 results in the photos application being opened. Specifically, the application has been opened to an album page 3925. The album page displays thumbnail representation of stored images. Unlike the bookmarks and history data of certain applications, the images are accessible in the secondary access mode. Here, the thumbnail images are arranged in a grid-like format. For example, the page 3925 shows four thumbnail images on the first grid row and three addition thumbnail images on the second grid row. The user can select any one of these thumbnail representations to show a higher resolution version of that stored image.

In the second stage 3910, the user performs a touch gesture (e.g., by tapping the user's finger) on the thumbnail image 3930. As shown in the third stage 3915, the gesture causes the photo application to present a higher resolution version of that image on the page 3935. The page 3935 is overlaid by a bar 3940 that includes several affordances, including an affordance 3945 to delete the image 3955.

In the third stage 3915, the user selects the affordance 3945 (e.g., the delete button) to delete the image 3955. However, the selection does not result in the image being deleted. This is because the image has been specified to be read-only in the secondary access mode. In the example of FIG. 39, the affordance (e.g., the delete button) has been grayed out to indicate that the delete operation cannot be performed on the image. Similarly, an affordance 3950 (e.g., the edit button) has also been grayed out to provide a visual indication that the image cannot be edited or modified during the secondary access mode session.

Figure 40:
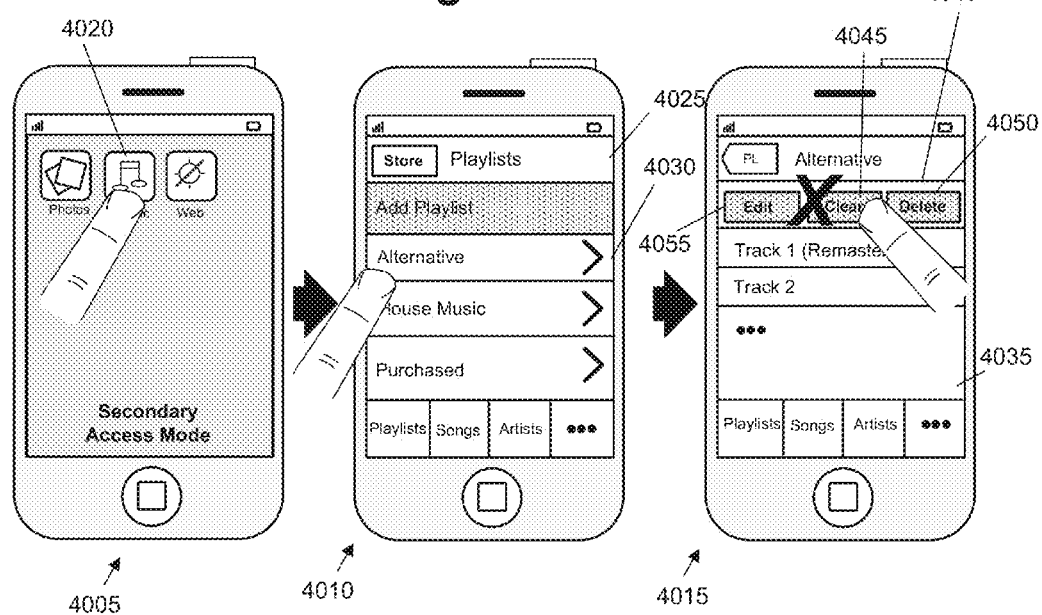
FIG. 40 illustrates an example of applications set to be read-only in the secondary access mode.

FIG. 40 illustrates another example of how some embodiments set other types of data to be read-only during the secondary access mode. Specifically, this figure illustrates in three operational stages 4005-4015 how data associated with a music application is specified to be read-only data. The first stage 4005 illustrates the device operating in the secondary access mode. As shown by the icon 4020, the music application remains accessible in the secondary access mode. In the first stage 4005, the user performs a touch gesture (e.g., by tapping the user's finger) on the icon 4020.

As illustrated in the second stage 4010, the selection of the icon 4020 results in the music application being opened. Specifically, the application has been opened to a playlist menu page 4025. The menu page displays a list of different playlists. The user can select any one of the playlists to show a listing of audio tracks or audio files associated with the selected playlist.

In the second stage 4010, the user selects the playlist 4030 from the playlist menu 4025. As shown in the third stage 4015, the selection of the playlist causes the music application to navigate to a playlist page 4035. This page lists the different audio tracks associated with the playlist. Any one of the tracks can be selected to play the associated audio file. When playback ends for that file, the music player may play some other audio tracks, such as the next audio track.

As shown, the page 4035 is overlaid by a bar 4040 that includes several affordances, including an affordance 4055 to edit the playlist (e.g., change the order of the tracks), an affordance 4045 to clear the playlist, and an affordance 4050 to delete the playlist. In the third stage 4015, the user selects the affordance 4045 to clear the playlist. However, the selection does not result in the playlist being cleared. This is because the playlist data has been specified to be read-only during the secondary access mode session. In the example of FIG. 40, the affordance 4045 has been grayed out to indicate that the clear operation cannot be performed on the playlist. Similarly, the other two affordances 4050 and 4055 (e.g., delete button, edit button) on the bar 4040 have been grayed out to provide a visual indication that the playlist cannot be edited or deleted during the secondary access mode session.

In some embodiments, the device prevents modification to other data associated with an application. For example, the music application may keep track of a play count for each audio track during the primary access code session. The play count is incremented each time that track reaches its end in playback. The primary access user can also use the play count to devise a listening strategy, such as creating a favorites playlist based on the number of play counts. During the secondary access mode session, the device of some embodiments prevents updates to the play count. In other words, if a track is played in full, the play count of that track will remain the same and will not affect the listening strategy of the primary access mode's user. As another example, a video application may keep track of the position of the playback for a video during a primary access mode session. In some embodiments, similar to the play count data, the position data cannot be updated during the secondary access mode session.

In several of the examples described above, the device of some embodiments denies access or allows read-only access to data associated with an application. The device of some embodiments requires the user to supply password for an application (e.g., an email application) in order to have that application open to the right data file (the right e-mail account). This feature in some embodiments can be used in conjunction with or in place of the secondary access mode feature.

Figure 41:
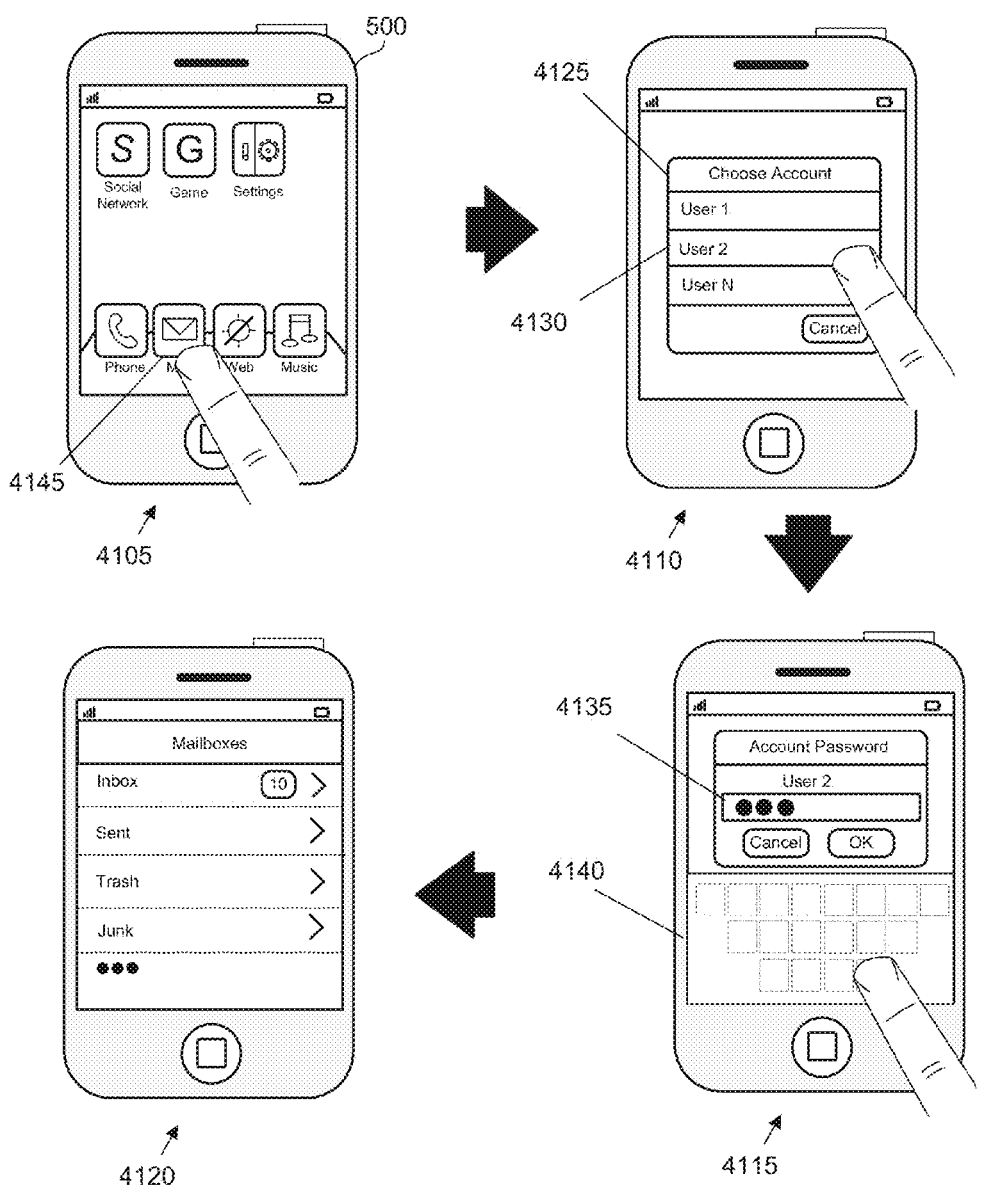
FIG. 41 provides an illustrative example of user authentication in order for the application to be loaded and opened with the data associated with the right account data.

FIG. 41 provides an illustrative example of an application that requires a user to input account information (e.g., user authentication data) in order to have that application open to the right account data. Four operational stages 4105-4120 of the mobile device 500 are shown in this figure. In this example, the application is an email application. However, the application can be any application that can be associated with different accounts.

The first stage 4105 illustrates the device 500 operating in the primary access mode. The user selects the email application icon 4145. As shown in the second stage 4110, the selection results in the email application displaying a pop-up window. The pop-up window 4125 displays different email accounts. Here, the user selects an account 4130 from the pop-up window.

The third stage 4115 shows that the selection of the account results in the display of a password window 4140. This window includes a field 4135 to input a password for the chosen account. The selection also results in the display of a keyboard (e.g., the virtual keyboard). As shown, the user uses the keyboard to input the account password. The fourth stage 4120 illustrates the email application interface after inputting the correct account password. Specifically, this stage illustrates that the email application has been loaded and opened to the chosen email account.

Figure 42:
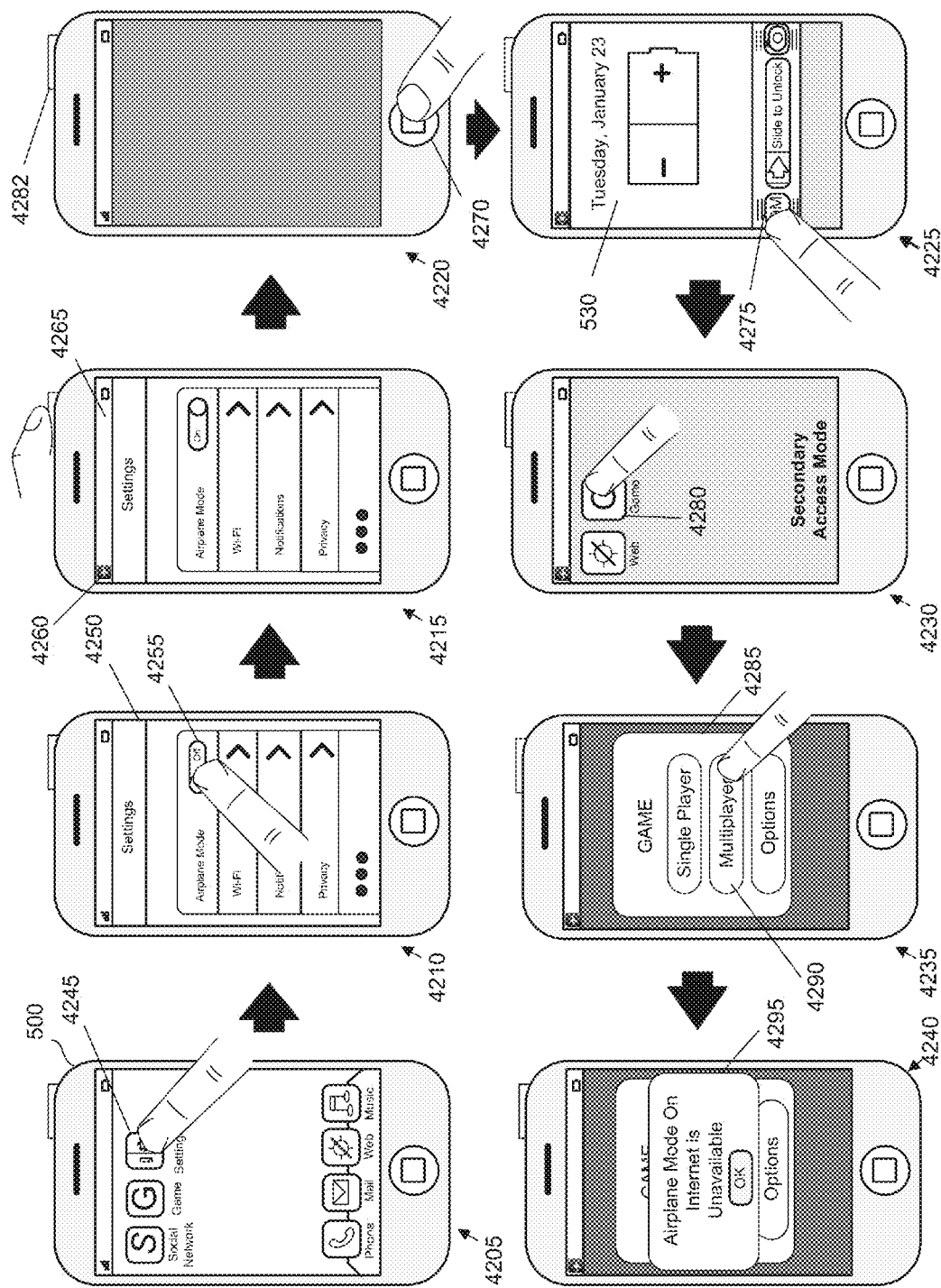
FIG. 42 illustrates an example of a user disabling a setting in the primary access mode to restrict user access in the secondary access mode.

During a secondary access mode session, the device of some embodiments prevents the user from modifying one or more of its settings. In other words, during a secondary access mode session, the settings menu will not be accessible or the settings menu will contain a limited number of modifiable settings. This allows the owner of the device to control one or more device services that are available in the secondary access mode. For example, the owner can specify a particular setting in the primary access mode. Thereafter, when the device is directed to operate in the secondary access mode, the setting carries over from the primary access mode to the secondary access mode. This feature is particularly useful for parents that let their children borrow their devices as it prevents the children from accessing particular devices' services, such as internet service, phone service, etc. FIG. 42 illustrates an example of a user specifying a setting in the primary access mode that carries over to the secondary access mode. Eight stages 4205-4240 of the mobile device are shown in this figure.

The first stage 4205 illustrates the device 500 operating in the primary access mode. The user selects the settings icon 4245 to open the settings menu. The second stage 4210 illustrates an example settings menu 4250 of the device 500. The settings menu 4250 includes several different menu items, including an affordance 4255 (e.g., a switch) to turn on or off airplane mode. The airplane mode can be turned on or off to suspend or activate some or all of the device's signal transmission capabilities. Turning the airplane mode on, for instance, causes the device incapable of placing and receiving phone calls, exchanging text messages, browsing the Internet, etc.

The second stage 4210 illustrates that the airplane is on its default settings, which is off. At this position, the device's transmission capability is not disabled. To turn on the airplane mode, the user selects the affordance 4255 (e.g., the switch) to set it on position, as illustrated in the third stage 4215. This in turn causes the airplane mode to be activated. As shown in the third stage 4215, the device also displays a visual indication that the airplane mode has been activated. Specifically, an icon (e.g., an airplane icon) 4260 is now shown on the status bar 4265 of the device.

The fourth stage 4220 illustrates that the device 500 is back in a standby mode and the device's screen is off. The mobile device of some embodiments transitions to standby mode when a user pushes physical button 4282. The fourth stage 4220 also illustrates that the user is pressing the physical button 4270 to transition the device back to active mode and to turn the device's screen back on.

In the fifth stage 4225, the device's screen is turned back on and the lock-screen page 530 is displayed in response to the user pressing the home button 4270 in the previous stage. In this stage, the user performs a touch gesture to unlock the device to the secondary access mode. Specifically, the user places the user's finger on the affordance 4275 (e.g., a soft button) for entering the secondary access mode, and swipes or slides the user's finger vertically up on the device's touch-sensitive screen. The touch gesture in turn causes the lock screen page 530 to slide up with the affordance 4275.

The sixth stage 4230 illustrates the device operating in the secondary access mode. As shown, the settings menu is inaccessible in the secondary access mode therefore the icon of the settings menu is hidden from the user. Instead of removing the icon, the device of some embodiments changes the appearance of this settings icon and makes it a non-selectable item in the secondary access mode. The sixth stage 4230 also illustrates that the user is selecting Game application by a tap gesture on the application icon 4280.

In the seventh stage 4235, in response to the user tapping on the application icon 4280, a game application screen 4285 is opened. The game application has different menu items one of which is being selected by the user through a tap gesture on the menu item 4290. Selecting this menu item will activate a multiplayer game, which requires access to the Internet services.

The eighth stage 4240 illustrate how the airplane mode setting has been carried over from the primary access mode to the secondary access mode and how it affects the services rendered by the device. In this stage, even though the user has selected multiplayer game, which requires access to the Internet, the selection does not result in gaining access to the Internet. Instead, a message box 4295 pops up which indicates the airplane mode is turned on and that there is no connection to the Internet.

In the example described above, the airplane mode setting is carried over from the primary access mode to the secondary access mode. One of ordinary skill in the art would realize that this setting is an example setting and that other settings may be carried over from one mode to another mode. For example, the device's menu might include different options to turn on or off the Internet (e.g., Wi-Fi options, 3G or 4G wireless internet options). The settings menu might include an option to prevent other people from making and/or receiving phone calls with the device. In some embodiments, the menu includes settings that enable Internet access for all applications, a group of applications (e.g., educational applications, games), etc. Similar to the airplane mode setting, the device of some embodiments carries these settings from the primary access mode to the secondary access mode.

Having described several example device behaviors, several different manners of specifying applications for the secondary access mode will now be described below by reference to FIGS. 43-65. Specifically, FIG. 43-57 illustrate tools that allow user to manually specify several applications for the secondary access mode. These figures are followed by FIGS. 58-65 that illustrate how some embodiments employ heuristics to intelligently determine whether each application that is installed on the computing device should be accessible in the secondary access mode or should be kept private.

Figure 43:
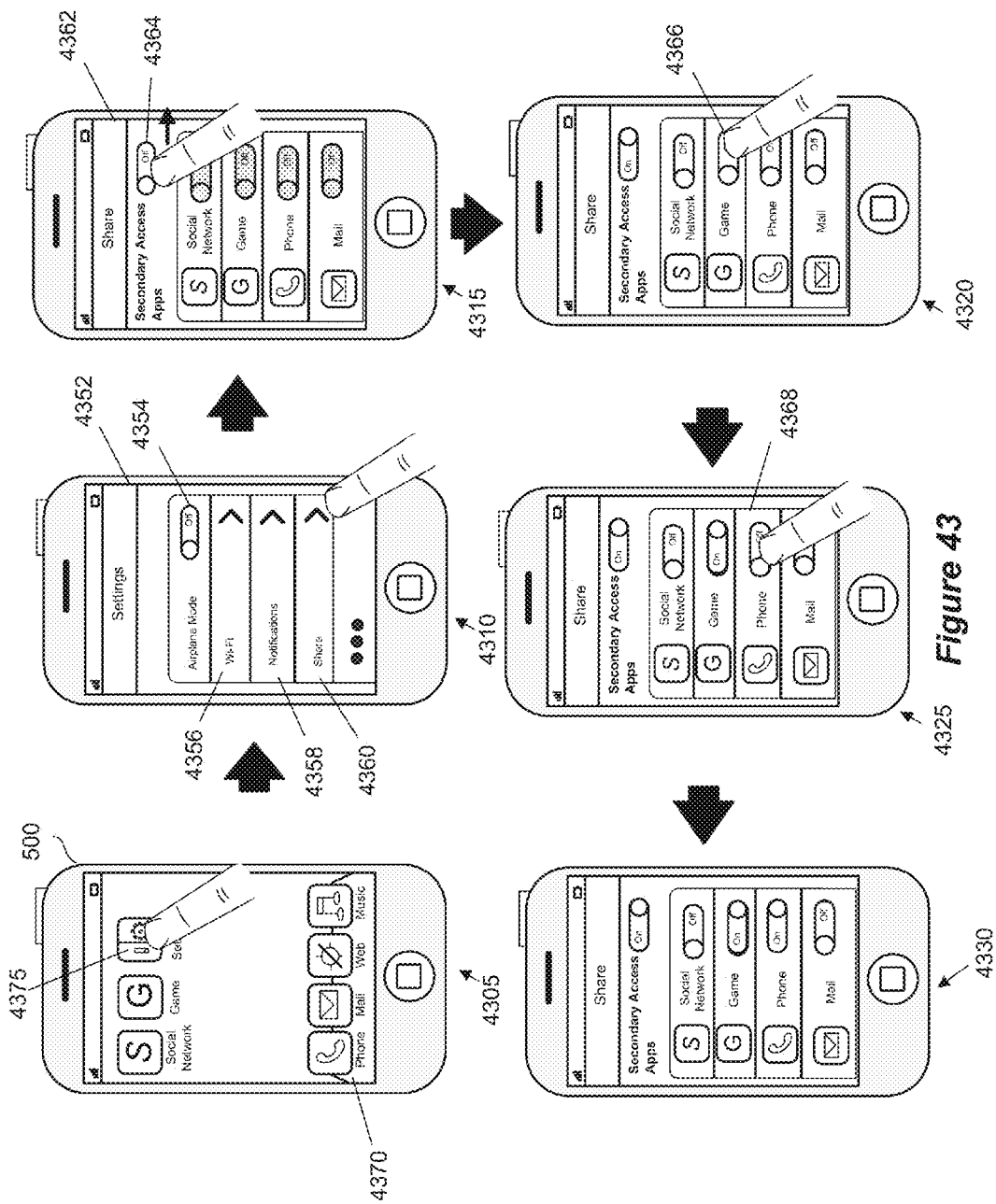
FIG. 43 illustrates one manner of enabling the secondary access mode and applications that are accessible in this mode.

As mentioned above, in some embodiments, a limited number of applications can be accessed in the secondary access mode of the device. The number of applications accessible in the secondary access mode is (1) pre-defined and static in some embodiments, (2) pre-defined but user-customizable in other embodiments, and (3) purely user-specified in still other embodiments. The secondary access mode is always enabled in some embodiments, while in other embodiments it is a mode that can be enabled or disabled by a user of the primary access mode. Different embodiments provide different mechanisms for a user to enable secondary access mode, and/or to specify applications and/or data that are available during the secondary access mode. FIG. 43 illustrates one manner of enabling the secondary access mode and applications that are accessible in this mode. This example is similar to the example described above by reference to FIG. 2. However, the example of the present figure shows a shared menu that can be used to define a whitelist of shared applications. In some embodiments, the device maintains an access list that lists different private applications.

The first stage 4305 illustrates the device 500 operating in its primary access mode and displaying a page that contains three application icons and an overlaid dock 4370 with four application icons. This stage also shows the user's touch selection of an icon 4375 to launch the settings menu of the device's operating system.

The second stage 4310 illustrates an example settings menu 4352 of the device 500. The settings menu 4352 includes several different menu items. For example, the menu 4352 includes a control 4354 for turning on or off airplane mode, a wireless network selectable item 4356 for navigating to a sub-menu for setting a wireless network connection (e.g., Wi-Fi network connection), a notifications selectable item 4358 for navigating to a sub-menu for specifying various notification policies, and a share item 4360 for navigating to a sub-menu for defining a whitelist of applications that are accessible in the secondary access mode. The second stage 4310 shows the user's touch selection of the share option 4360.

The third stage 4315 shows that this selection causes the device to display the secondary access sub-menu 4362, which in this example includes various controls related to the secondary access mode. One of these controls is an ON/OFF switch 4364 that can turn the secondary access mode feature on or off. When the device transitions to the third stage 4315 from the second stage 4310, the switch 4364 is off. While this switch is off, the device cannot be operated in the secondary access mode. When this switch is turned on, the secondary access mode feature is available. A user, however, still has to direct the device to operate in the secondary access mode, e.g., by selecting an affordance on the lock screen or the passcode page.

The third stage 4315 shows the user turning on the secondary access mode feature. In this example, the turning on of the secondary access mode feature makes the enabling switches for the applications selectable. The fourth and fifth stages 4320 and 4325 then illustrate the user toggling on the switch 4366 for a game and toggling on the switch 4368 for a phone application. The sixth stage 4330 then shows the resulting list of applications that are enabled and disabled for the secondary access mode. In this example, the sixth stage shows the social network and the email applications as being disabled (i.e., restricted) from the secondary access mode, while the game and the phone application are enabled for this mode.

Figure 44:
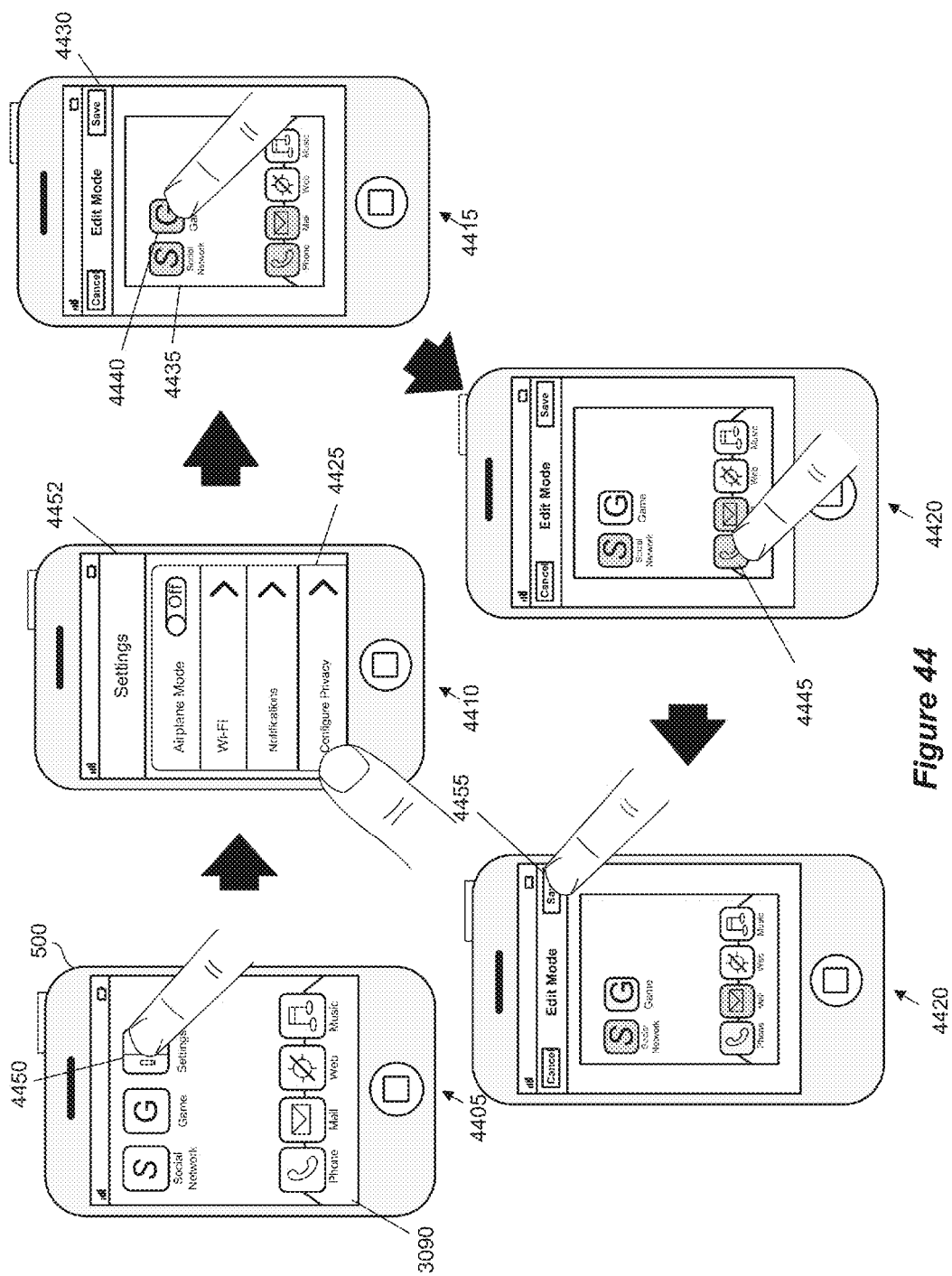
FIG. 44 illustrates an example of specifying applications that are available during the secondary access mode.

FIG. 44 illustrates another example of specifying applications that are available during the secondary access mode. Specifically, this figure illustrates in five operational stages 4405-4425 how a device's user can choose different application from an edit menu that mirrors each home screen page of the device's operating system. This edit may be provided in conjunction with any of the other different interfaces described herein, or may be provided instead of those interfaces.

The first stage 4405 illustrates the device 500 operating in its primary access mode and displaying a page that contains three application icons and an overlaid dock 3090 with four application icons. This stage also shows the user's touch selection of an icon 4450 to launch the settings menu of the device's operating system.

The second stage 4410 illustrates an example settings menu 4452 of the device 500. The settings menu 4452 includes several different menu items. In this example, the menu items include a configure privacy item 4425 for navigating to a sub-menu for specifying whether applications are accessible or not accessible in the secondary access mode. The second stage 4410 shows the user's touch selection of the privacy option 4425.

The third stage 4415 shows that this selection causes the device to display the edit mode sub-menu, which in this example mirrors the device's home screen page. Specifically, the edit mode sub menu shows the home screen page with the different icons. The icons of the applications that are accessible in the secondary access mode appear different from the icons of the applications that are not accessible in the secondary access mode. In the example of the third stage 4415, the edit mode shows that the social network application, the phone application, the email application, and the game application are not accessible in the secondary access mode, while the web browser and the music application are accessible in that mode.

The third and fourth stages 4415 and 4420 then illustrate the user selecting the icons 4440 and 4445 from the edit mode page to specify that the game and the phone application are accessible in the secondary access mode. The fifth stage 4425 then shows the resulting applications that are enabled and disabled for the secondary access mode. In this example, the fifth stage shows the social network and the email applications as being disabled (i.e., restricted) in the secondary access mode, while the game, phone, web, and music applications are enabled for this mode. To save the access mode setting, the user then selects the affordance 4455 (e.g., the save button).

In some embodiments, the device's operating system provides controls for enabling groups of applications (e.g., game applications, communication applications, social media applications, etc.) in the secondary access mode. The device's operating system in these or other embodiments further provides controls for enabling access to different pieces of content data (e.g., to different pictures, contacts, etc.) during the secondary access mode.

Figure 45:
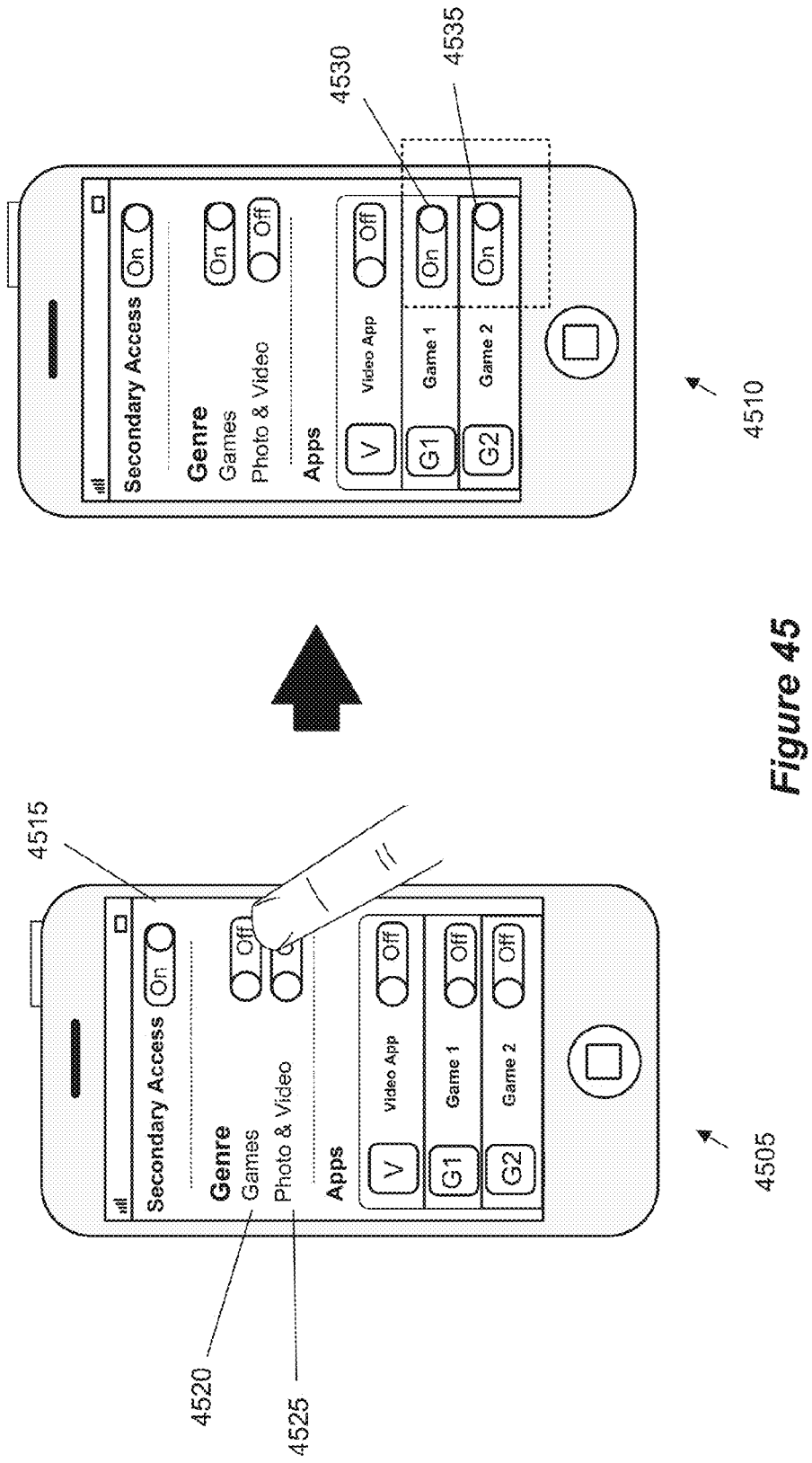
FIG. 45 provides an illustrative example of enabling in the secondary access mode several applications at once based on their classifications.

FIG. 45 provides an illustrative example of enabling in the secondary access mode several applications at once based on their classification. In this example, the different types of applications have been previously categorized into different categories or genres. Two operational stages 4505 and 4510 of the mobile device are shown in this figure.

The first stage 4505 shows the device displaying the secondary access sub-menu 4515, which is similar to the one described above by reference to FIG. 43. In this example, the sub-menu includes several affordances (e.g., switches). Each of these affordances can be selected to specify whether a group of applications, which are categorized under a same category, are accessible or not accessible in the secondary access mode. To simplify the discussion, only two affordances for two different genres are shown in FIG. 45. Specifically, the menu includes a first affordance 4520 for specifying whether games are accessible in the secondary access mode, and a second affordance 4525 for specifying whether photo and video applications are accessible in that same mode.

The first stage 4505 illustrates the user selecting the affordance 4520 to switch each game application from being inaccessible to being accessible in the secondary access mode. As shown in the second stage 4510, the selection of the affordance causes the affordances 4530 and 4535 associated with the game applications Game 1 and Game 2, to be set to the "On" position. This provides a visual indication to the user that these game applications will now be accessible in the secondary access mode.

One of ordinary skill in the art would realize that the categories listed in FIG. 45 are just example categories and that different embodiments might provide different categories. Examples of such categories include books, education, entertainment, finance, food & drink, games, health and fitness, news, and music. In some embodiments, the share menu might provide affordances for different sub-categories, such as action games, role-playing games, sports games, etc. In addition, the share menu of some embodiments provides one affordance for multiple different categories. For example, the menu might include one affordance that encompasses both the music category and the entertainment category.

In some embodiments, the categories are based on how the applications are categorized in a content distribution system (e.g., categorized for an online app store). For example, a developer of an application might submit the application to the content distribution system and specify that the application belong in a particular category. The content distribution system may then associate the category to the application as application metadata. The content distribution system may also verify the categorization and re-categorize the application if the categorization is incorrect. In some embodiments, the device's operating system has access to this application metadata to make the application accessible or not accessible based on user input.

Figure 46:
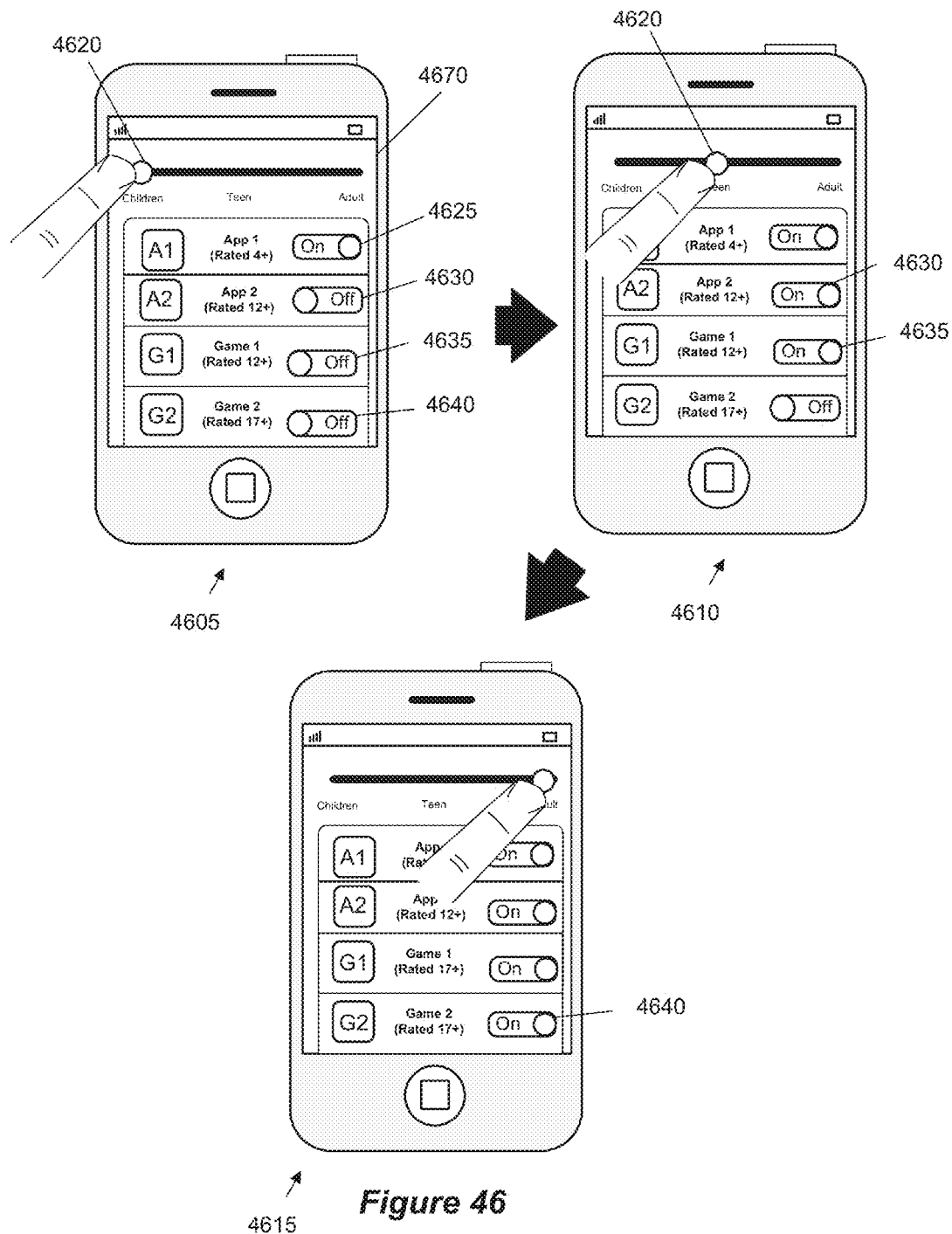
FIG. 46 illustrates an example of a slider affordance that is associated with different application ratings to uniformly adjust the access mode settings for multiple different applications.

In addition to category metadata, or instead of it, the device's operating system of some embodiments provides controls to uniformly select a group of applications based on different metadata. An example of such metadata includes application rating, application content, etc. FIG. 46 provides an illustrative example of a slider affordance 4620 that is associated with different application ratings to uniformly adjust the access mode settings for multiple different applications. Three operational stages 4605-4615 of the mobile device of some embodiments are shown in this figure. In this example, each application is associated with a particular rating based on the application's content. In some embodiments, this particular rating determines the age group for which the application is appropriate.

The first stage 4605 shows the device displaying the secondary access sub-menu 4670, which is similar to the one described above by reference to FIG. 43. In this example, the sub-menu includes a slider affordance to set different applications accessible based on an age group. In this example, the slider affordance is shown with different age groups (e.g., children, teen, and adults). However, the affordance may be labeled differently (e.g., with numbers that identifies different ages).

In the first stage 4605, the slider affordance is set to children. Accordingly, the application that is associated with a 4+ age rating is set to be accessible in the secondary access mode. In the second stage 4610, the slider affordance is set to teen. This in turn causes the application and the game that are associated with the age 12+ rating to be set as being accessible in the secondary access mode. Lastly, in the third stage 4615, the slider affordance is set to adult, which in turn causes the application and the games that are associated with a 17+ rating to be set as being accessible in the secondary access mode. That is, in this stage 4615, all applications are set to be accessible in the secondary access mode.

The previous example illustrated using content ratings to uniformly specify whether groups of different applications are accessible or not accessible in the secondary access mode. One of ordinary skill in the art will realized that the different age groups described in the above example are set forth as examples and the numbers for different age groups can be set differently in different embodiments.

Figure 47:
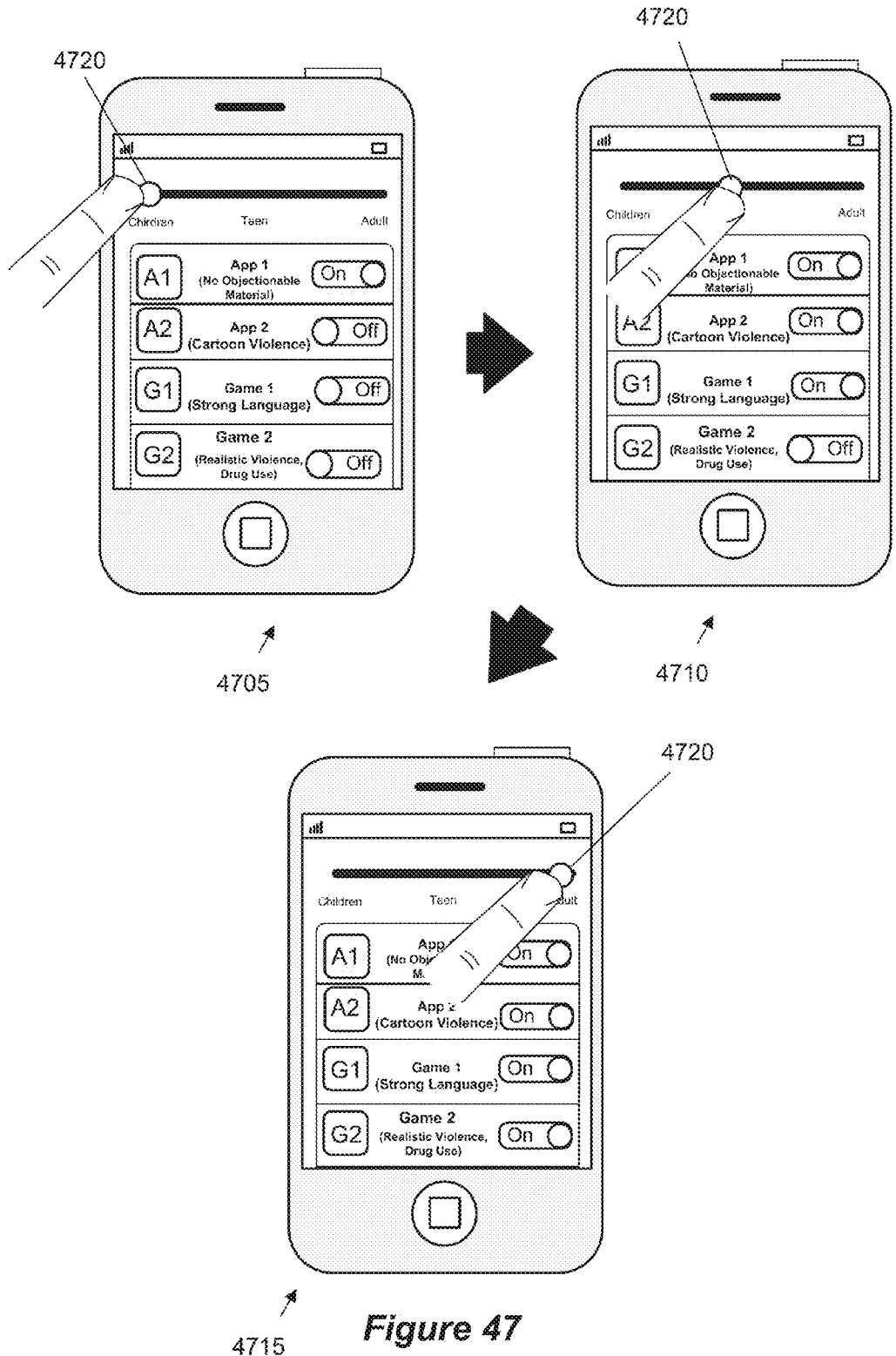
FIG. 47 provides another example of using application metadata to uniformly adjust the access mode settings for groups of different applications.

FIG. 47 provides yet another example of using application metadata to uniformly adjust the access mode settings for groups of different applications. This example is similar to the previous example. However, instead of the content rating, the menu includes a slider affordance that is associated with different content descriptions.

In the first stage 4705, the slider affordance is set to children. Accordingly, the application with the content description that is associated with no objectionable material is set to be accessible in the secondary access mode. In the second stage 4710, the slider affordance is set to teen. This in turn causes the application associated with the cartoon violence description and the game associated with the strong language description to be set as being accessible in the secondary access mode. Lastly, in the third stage, the slider affordance is set to adult, which in turn causes the games that are associated with the descriptions realistic violence and drug use to be set as being accessible in the secondary access mode.

In the previous two examples, the different slider affordances are designed based on age (e.g., age group). For instance, each different position along the slider affordance represents a particular age group, such as age 1 to 4, 13 to 18, etc. In some embodiments, the share menu provides an affordance that can uniformly set access settings for different applications based on a different criterion. One example of such a criterion is a relationship criterion or different groups of people. For example, a set of different applications may uniformly be set as being accessible if the person using the device in the secondary access mode is an acquaintance, a friend, or a family member.

Figure 48:
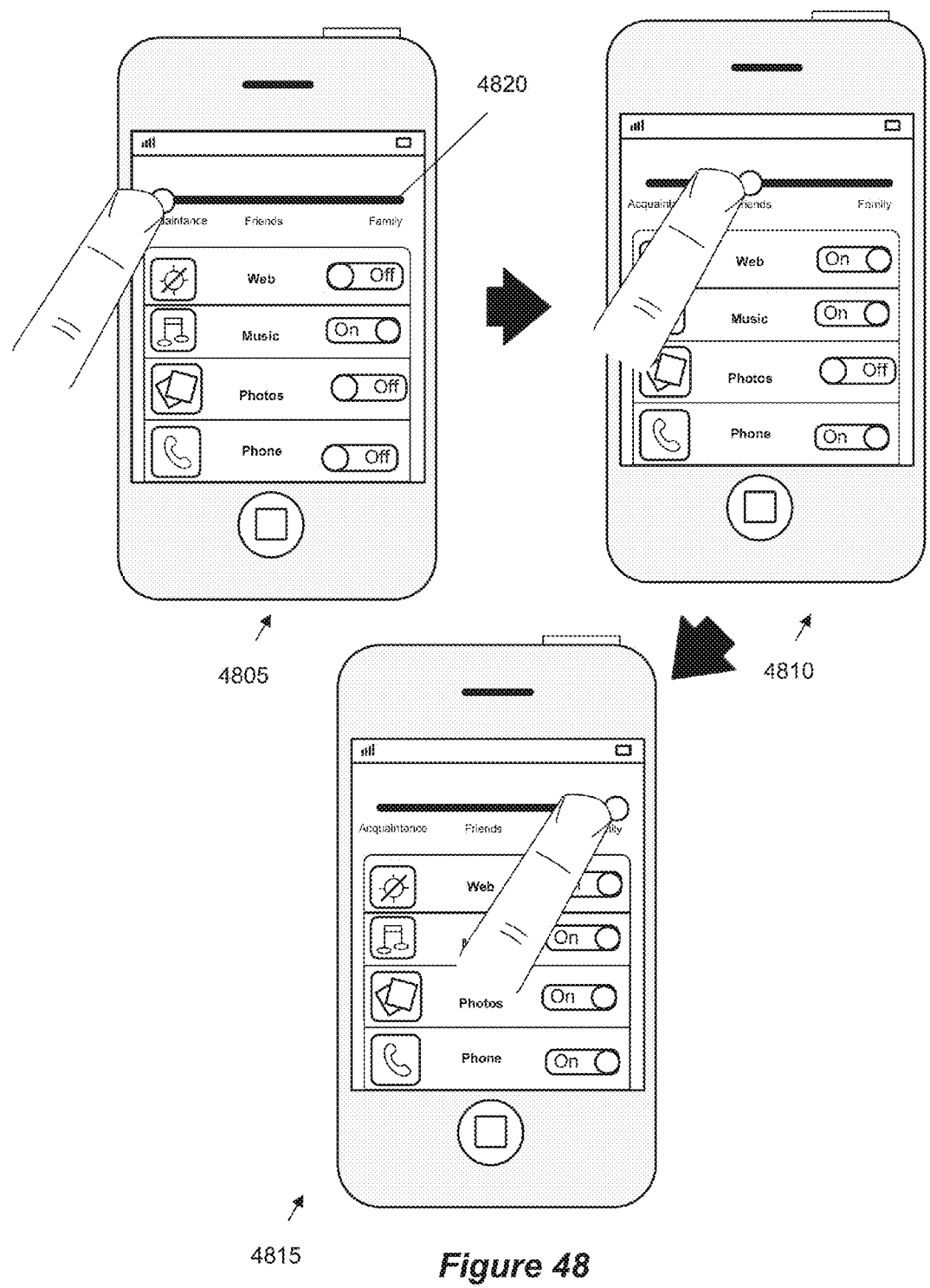
FIG. 48 provides an illustrative example of providing a slider affordance to adjust access mode settings based on different groups of people.

FIG. 48 provides an illustrative example of providing an affordance that is associated with different groups of people. Three operational stages 4805-4815 of the mobile device are shown in this figure. In these examples, each application may be associated with data (e.g., metadata) that indicates whether the application should be accessible to one group of people or another. An example of such data includes data that identifies whether the application is associated with a password, whether the application accesses a particular device or operating system service (e.g., voice over IP service), and/or whether the application uses encryption to store data.

In the first stage 4805, the slider affordance 4820 is set to acquaintance. Accordingly, the music application is set to be accessible in the secondary access mode. Here, the music application may be set to being accessible because it is an application that is least likely to be abused by an acquaintance. For example, if the phone application has been set to be accessible for an acquaintance, then the acquaintance might make different phone calls without the owner's permission.

In the second stage 4810, the slider affordance 4820 is set to friends. This in turn causes the web browser and the phone application to become accessible in the secondary access mode. Finally, in the third stage 4815, the slider affordance is set to family, which in turn causes the photo application to be set as being accessible in the secondary access mode.

Figure 49:
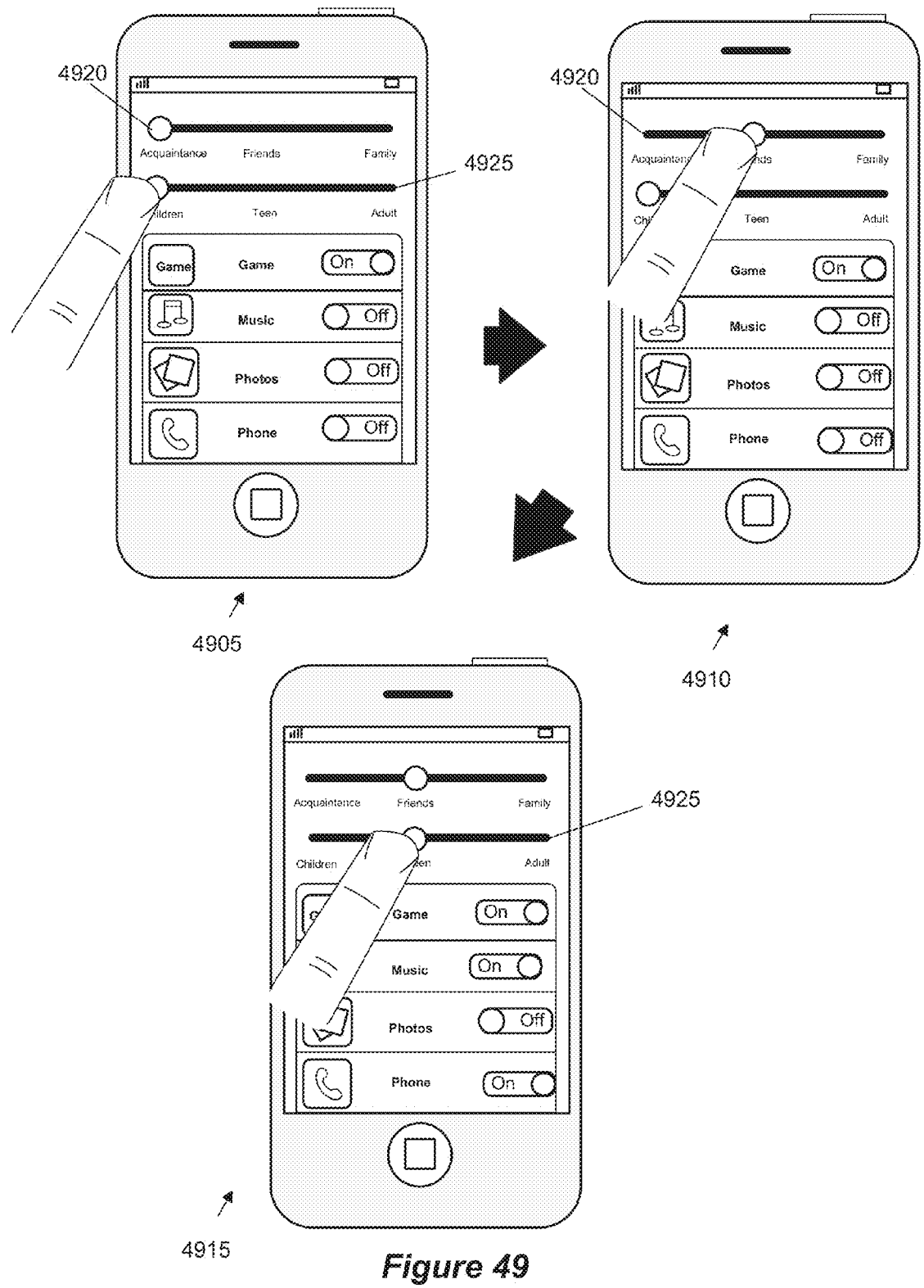
FIG. 49 provides an illustrative example of several affordances that allow the user to granularly set access level for different applications based on multiple different factors.

In several of the examples described above, a single affordance is used to set the access mode settings for different groups of applications. FIG. 49 provides an illustrative example of multiple affordances that can be used to granularly set access level for different applications based on multiple different factors. Three operational stages 4905-4915 of the mobile device are shown in this figure. In this example, each application may be associated with one or more pieces of data (e.g., metadata) that corresponds to a setting of an affordance (e.g., the slider affordance 4920 or 4925).

In the first stage 4905, the slider affordances 4920 and 4925 are set as acquaintance and children, respectively. Accordingly, the game is the only application that is set to be accessible in the secondary access mode. In the second stage 4910, the slider affordances 4920 and 4925 are set as friend and children. However, the access settings of the different applications have not changed. This is because none of the other applications that are set as private is appropriate for children based on the data associated with those applications. Finally, in the third stage 4915, the slider affordances 4920 and 4925 are set to friends and teen, which in turn causes the music application and the phone application to be accessible in the secondary access mode.

In some embodiments, the device allows a user to select one or more applications during a primary access mode session and then, based on the selection, immediately places the device in the secondary access mode. This feature is particularly useful because it allows the user to quickly select a few applications to share and immediately place the device in secondary access mode (e.g., without having to lock the device). Several such examples will now be described below by reference to FIGS. 50-55.

Figure 50:
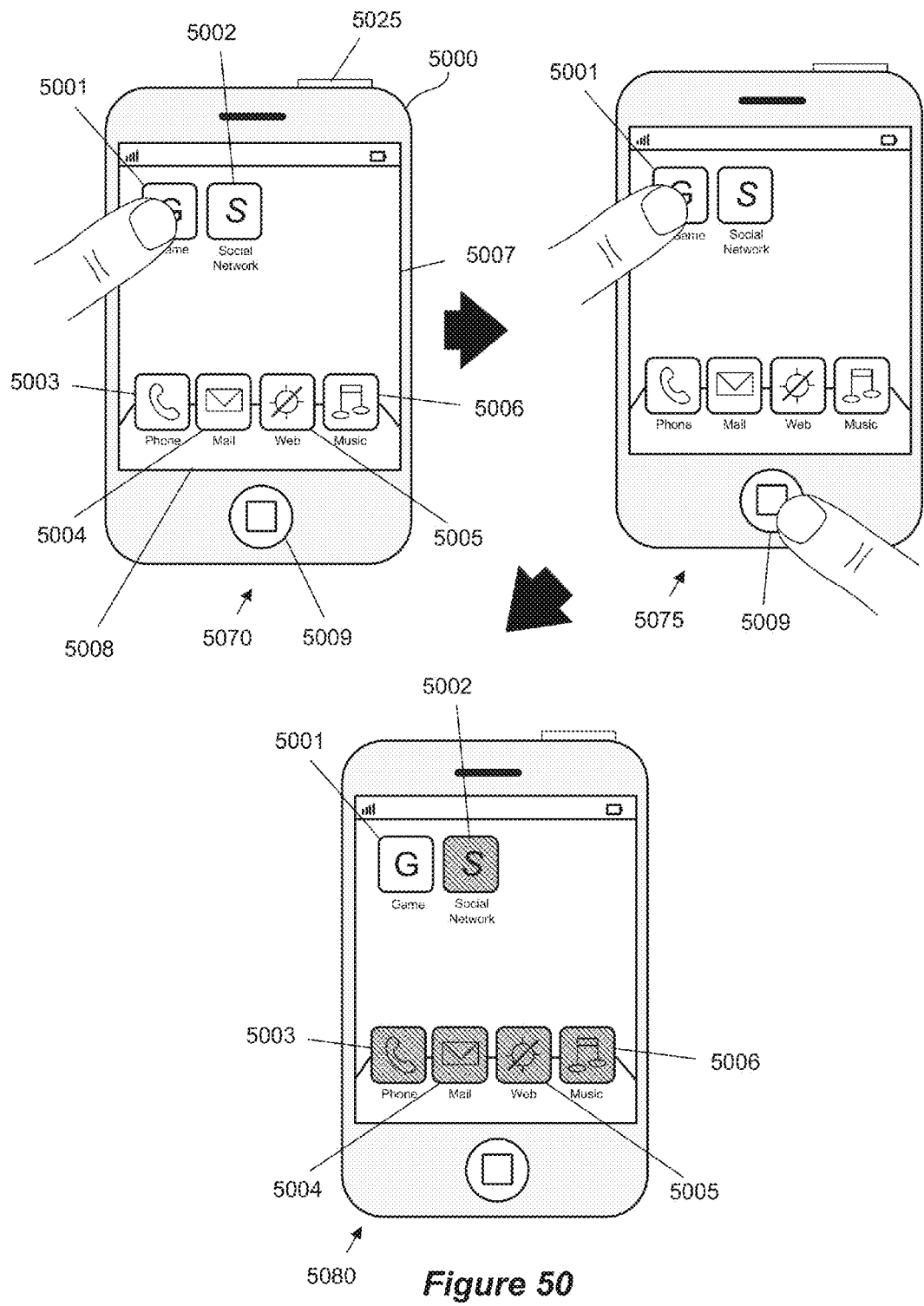
FIG. 50 provides an illustrative example of making application accessible in secondary access mode on a mobile device.

For some embodiments of the invention, FIG. 50 provides an illustrative example of making an application accessible in a secondary access mode on a mobile device 5000. Three operational stages 5070-5080 of the mobile device 5000 are illustrated in this figure. Specifically, the three stages show selecting an application and activating the secondary access mode in order to share only the selected application. Here, the mobile device 5000 is a smart phone. However, the mobile device can be any device (e.g., a tablet, a desktop computer, a laptop, a smart television, a digital media receiver) capable of executing different applications.

As shown in FIG. 50, the mobile device 5000 is displaying a home screen 5007 of its operating system ("OS"). Two icons 5001 and 5002 are shown on the screen 5007. These icons correspond to a game and a social network application, respectively. The screen 5007 is also displaying an overlaid dock 5008. Several other icons 5003-5006 are arranged along the dock. Specifically, the icons include (1) an icon 5003 for a phone application to make phone calls, (2) an icon 5004 for an email application to view and write emails, (3) an icon 5005 for a web browser to browse the Internet, and (4) an icon 5006 for a music player to play music. To simplify the description, only six icons 5001-5006 are shown in the figure. However, there may be many more representations of other programs (e.g., applications, folders, etc.) that execute on the mobile device 5000.

In addition to the icons, the mobile device 5000 includes several other selectable items. Namely, it includes a home button 5009 and a power button 5025. The home button 5009 can be used for several different purposes. For instance, when an application is open, a single selection of the home button causes the OS's home screen (also referred to as a desktop in some devices) to be displayed. The home button 5009 can also be used to quickly switch between different applications (e.g., through a double tap operation) and to open up a voice recognizing personal assistant application (e.g., through a tap and hold operation). Different from the home button, the power button 5025 can be used to lock the device and/or place it in a standby mode. If the power button 5025 is pressed for a set period of time, a user interface item (e.g., a slider) for turning off the device 5000 is shown on the screen, in some embodiments. In the example of FIG. 50, the home button 5009 and the power button 5025 are physical buttons. However, in some other embodiments, they are provided as selectable user-interface items or soft buttons.

Having described the elements of FIG. 50, the operations of making an application accessible in secondary access mode will be described by reference to the three operational stages 5070-5080 that are shown in the figure. These operational stages 5070-5080 will be described in conjunction with FIG. 51, which conceptually illustrates a process 5100 that some embodiments employ to make one or more applications accessible in the secondary access mode. In some embodiments, the process 5100 is performed by the privacy tools that are associated with the device's OS.

Figure 51:
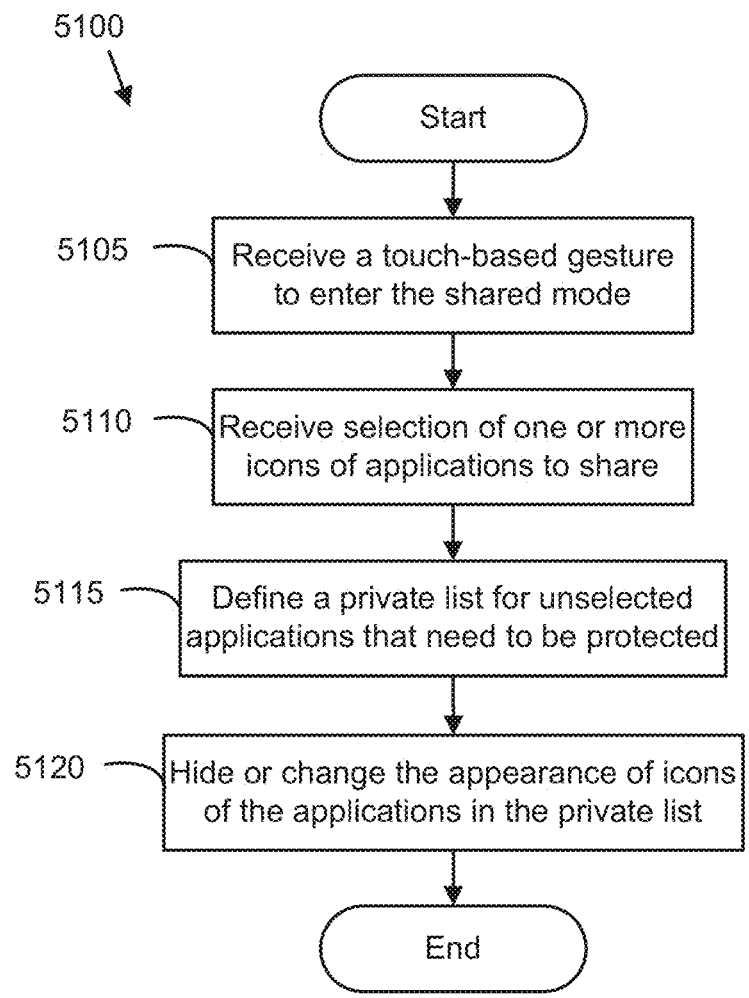
FIG. 51 illustrates a process that some embodiments employ to make one or more applications accessible in the secondary access mode.

The process 5100 of FIG. 51 begins when it receives (at 5105) a touch gesture to enter the secondary access mode. The process 5100 then receives (at 5110) a selection of one or more icons of applications to be available in secondary access mode. Referring back to the first stage 5070 of FIG. 50, the mobile device 5000 is displaying the game icon 5001, the social network icon 5002, the phone icon 5003, the email icon 5004, the web browser icon 5005, and the music player icon 5006.

The device's user can select any one of these icons to launch its corresponding application. To make the game accessible in secondary access mode, the user places and holds the user's finger (e.g., left thumb) on the game icon 5001. One of ordinary skill in the art would realize that the selection made with a particular finger (e.g., the left thumb, index finger, etc.) in this and other examples that are described above and below are just example selections and that the same selection can be made using any other fingers or some other selection tools (e.g., stylus, cursor controller, remote control).

The second stage 5075 illustrates completion of the touch gesture to enter the secondary access mode. In particular, the user taps, or taps and holds the home button 5009 with the user's right thumb while holding or maintaining selection of the icon 5001 with the left thumb. As illustrated in the third stage 5080, the touch gesture causes the device to immediately enter the secondary access mode.

The third stage 5080 illustrates the mobile device 5000 after it has been placed into the secondary access mode. The user has let go of the game icon 5001 and the home button 5009. In the secondary access mode, only the game is exposed and every other application has been made inaccessible. Any user can open the game application by selecting the game icon 5001 now in the secondary access mode. However, the remaining applications have been made private or inaccessible. For instance, a person can select the social network icon 5002 but its selection will not cause the social network application to open. Similarly, the person cannot launch the web browser by selecting the web browser icon 5005 from the dock 5008.

Returning to FIG. 51, the process 5100 creates (at 5115) a private list for unselected applications that need to be protected. This may entail identifying a list of applications that are installed on the mobile device 5000 and defining a redacted list that lists applications that should be protected. In some embodiments, the private list is automatically defined based on one or more applications that the device's user selects when activating the secondary access mode. For instance, the user might identify several applications to share by selecting their representations (e.g., application icons). The process 5100 then defines a private list that includes a group of other applications (e.g., all other remaining applications that are accessible on the device).

In some embodiments, the private list is defined according to the user input. That is, the user of the device can choose (e.g., from a list of applications) which applications to keep private. For example, the privacy tools of some embodiments provide a privacy settings menu that lists different applications to manually choose any number of different applications to keep private. Examples of manually defining a private list using such a privacy settings menu was described above in details by reference to FIG. 2. Instead of or in conjunction with the user input, the private list may be a pre-defined list that includes several different applications that are likely to contain private information. As an example, the privacy tools of some embodiments may always retain an email application, the settings menu, or some other application in that private list.

After creating the private list, the process 5100 hides or changes (at 5120) the appearance of icons of the applications in that private list. The process 5100 then ends. In the example illustrated in the third stage 5080 of FIG. 50, the icons 5002-5006 of the private applications are not hidden. Instead, the icons 5002-5006 are displayed differently from the icon 5001 of the shared game application. The icons 5002-5006 are grayed out while the icon 5001 remains the same. The grayed out icons provide a visual indication to a person that the corresponding applications are inaccessible.

In the example described above, the user activates a secondary access mode through a touch gesture. The secondary access mode allows access to the shared game but prevents access to several other applications. In some embodiments, the privacy tools provide a list of applications based on a different touch gesture (e.g., double tapping on the selectable item while holding the application icon). The user can then use the list of applications to choose one application or multiple different applications to share. In some embodiments, the user can manually create a private list that lists different applications that should be protected, and then turn-on the secondary access mode at any time to prevent access to the applications listed in that private list.

Also, in the example described above, the device on which the operating system executes has a touch screen through which a user can interact in order to make one or more applications accessible in secondary access mode. However, one of ordinary skill in the art will realize that cursor controllers or some other input mechanisms can be used to make these applications accessible in secondary access mode on devices (e.g., desktop computer, laptop) with cursors and cursor controllers or other input mechanisms (e.g., remote control, motion sensor).

Figure 52:
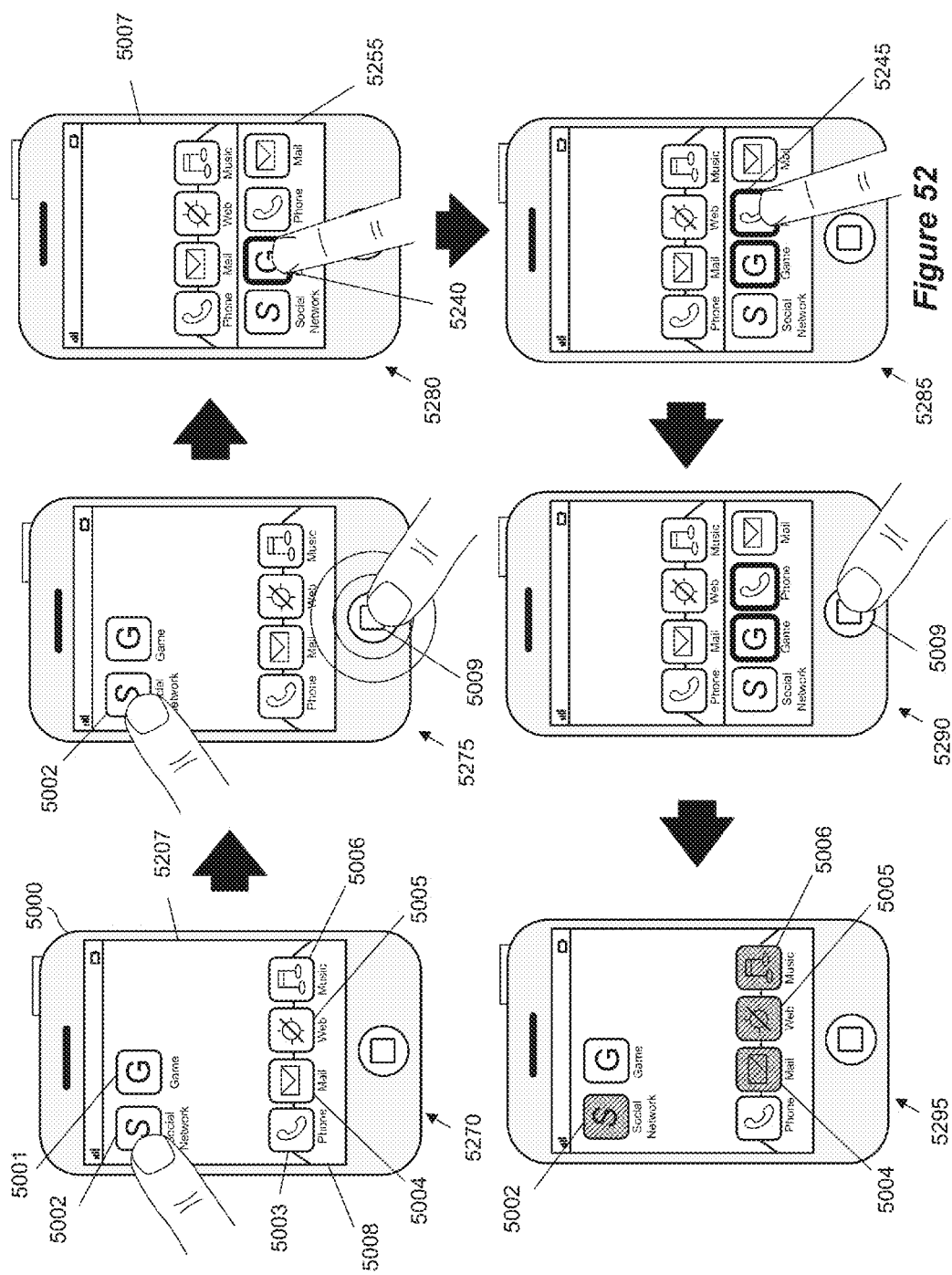
FIG. 52 provides an illustrative example of sharing multiple different applications.
Figure 53:
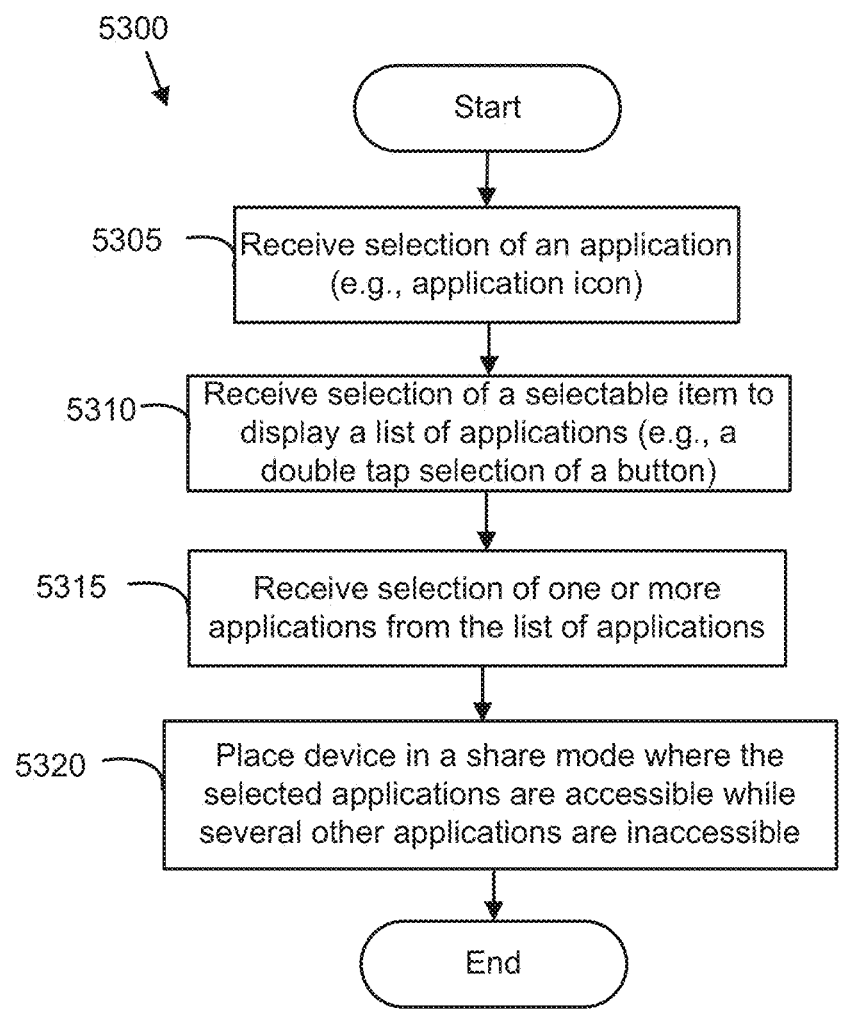
FIG. 53 conceptually illustrates a process that some embodiments use to display the list, receive selection of applications to share from the list, and place the mobile device in secondary access mode after receiving the selection.
Figure 54:
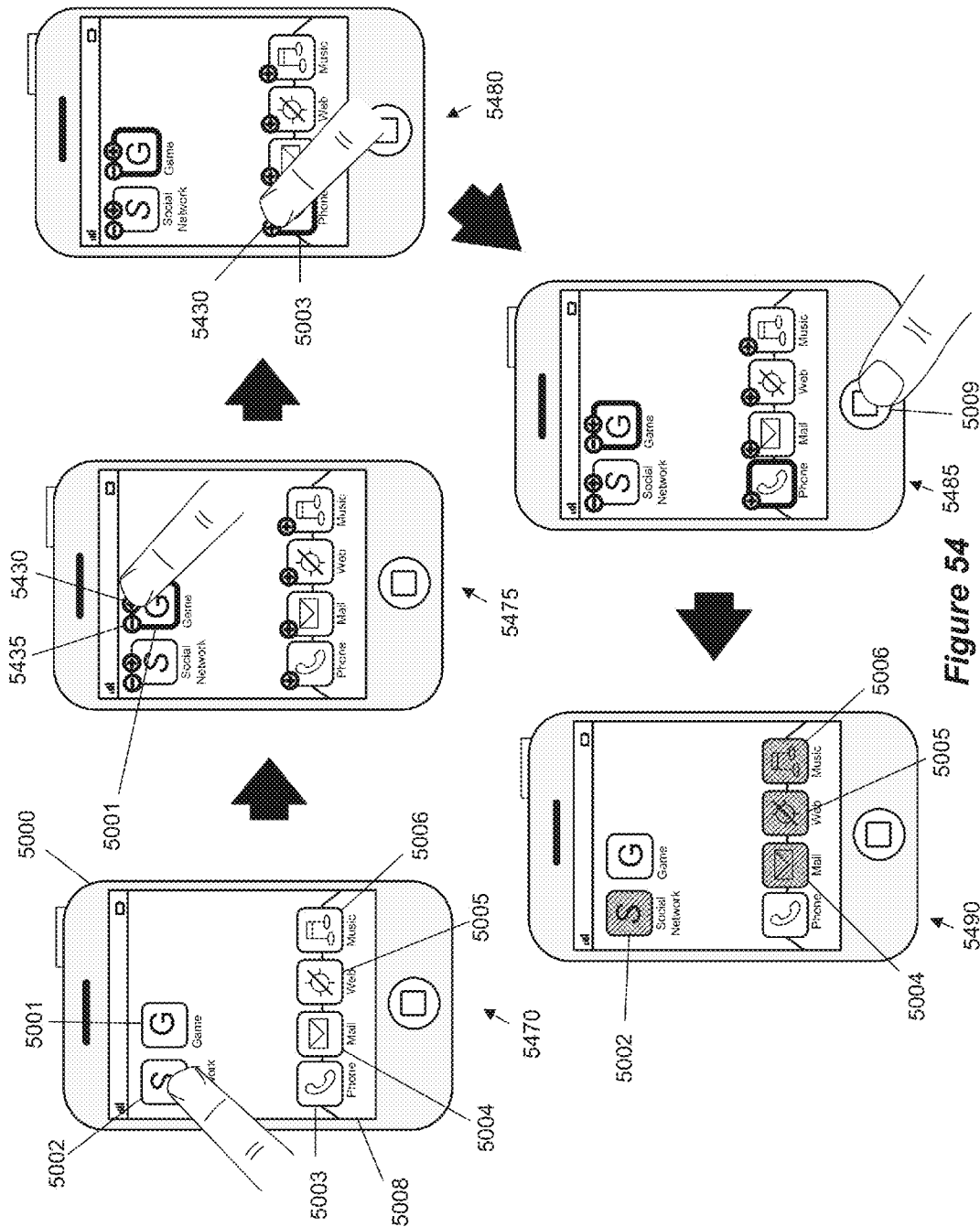
FIG. 54 provides an illustrative example of selecting multiple different applications to share in a secondary access mode.
Figure 55:
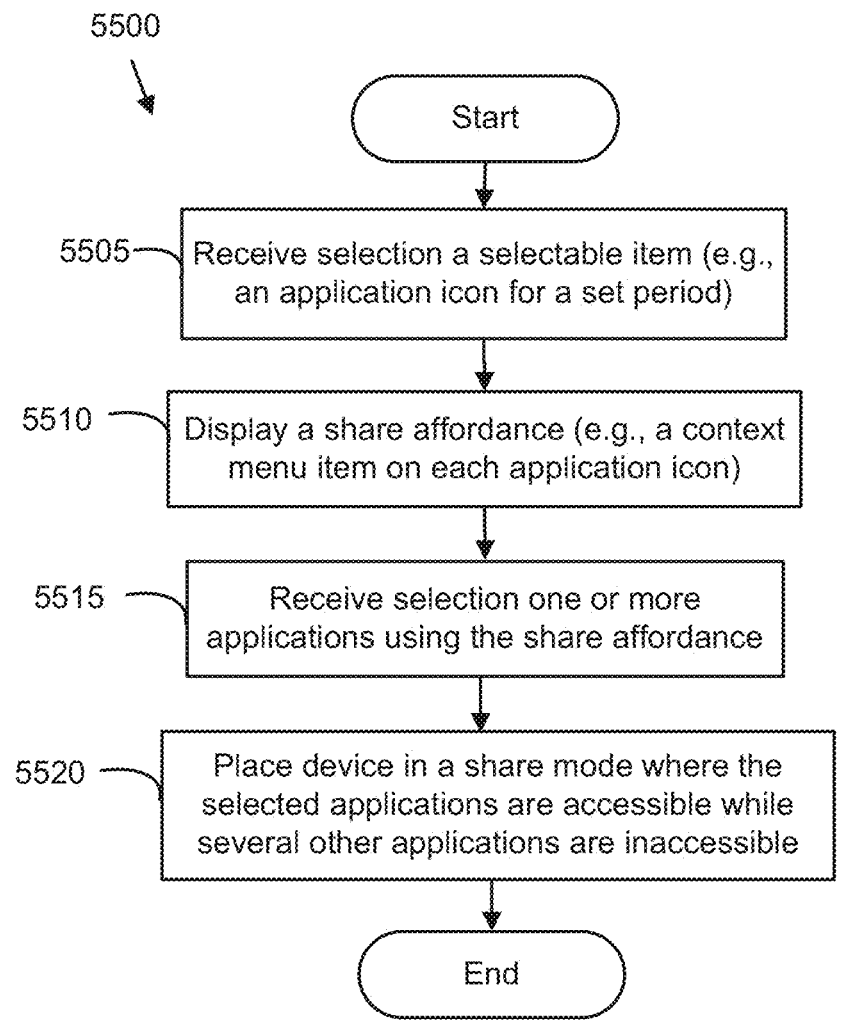
FIG. 55 conceptually illustrates a process that some embodiments employ to display affordances, receive selection of different applications using the affordances, and place a device in secondary access mode after receiving the selection.

As mentioned above, the privacy tools of some embodiments allow a user of a mobile device to select one or more applications and then place the device in a secondary access mode. Several more examples of sharing applications will now be described by reference to FIGS. 52-55. In particular, FIGS. 52 and 53 show examples of selecting one or more applications to share using a list of applications. FIGS. 54 and 55 show examples of selecting applications to share using an affordance such as a selectable item that is displayed at least partially over each application representation.

FIG. 52 provides an illustrative example of sharing multiple different applications. Specifically, it illustrates in six operational stages 5270-5295 how a user can use the mobile device 5000 to display a list of applications and then choose one or more applications to share. In some embodiments, the list of applications is shown when the user performs a touch gesture, such as double tapping a selectable item (e.g., the home button 5009) while pressing any application icon. In some embodiments, this feature of selecting multiple different applications to be shared is provided in conjunction with the feature of selecting a single application to share that is described above by reference to FIG. 50. In this manner, the device's user has the option of quickly selecting a single application to share or quickly selecting multiple different applications to share.

The first stage 5270 illustrates the mobile device 5000 displaying the device's home screen page 5207. The mobile device is the same as the one described above by reference to FIG. 50. The screen 5207 includes the social network icon 5002 and game icon 5001. The screen is also overlaid by the dock 5008. Several other icons 5003-5006 are arranged along the dock. Specifically, the icons include the phone icon 5003, the email icon 5004, the web browser icon 5005, and the music player icon 5006.

As shown in the first stage 5270, the device's user places and holds the user's finger (e.g., left thumb) on the social network icon 5002. The second stage 5275 illustrates selection of a selectable item to display the list of applications. In particular, the user double taps on the home button 5009 with the user's right thumb while holding the icon 5002 with the left thumb.

The third stage 5280 illustrates the mobile device 5000 after inputting the touch gesture. The touch gesture causes the device to display the list of applications 5255. Specifically, the selection of the icon 5002 and the home button 5009 causes the screen 5007 to slide up towards the top of the screen. A representation of the list of applications 5255 then slides up into view along the bottom of the screen. In the example illustrated in FIG. 52, the list 5255 presents each application with its application name and icon. The different applications are also presented side-to-side. The user can perform a touch gesture (e.g., swipe the user's finger across the bottom of the screen along the area showing the list 5255) to scroll through different applications. The user can also select one or more of applications to share by tapping the user's finger on the application icons.

The third and fourth stages 5280 and 5285 illustrate selections of several applications from the list of applications 5255. In the third stage 5280, the user taps the user's finger (e.g., right index finger) on the game icon 5240 to share the game application. To provide a visual indication of the selection, the game icon 5240 is highlighted in the list. As shown in the fourth stage 5285, the user then taps the same finger on the phone icon 5245 to share the phone application. This causes the phone icon 5245 to be highlighted in the list. At any time, the user can deselect the game or the phone applications by tapping the user's finger on the corresponding icon (5240 or 5245).

The fifth stage 5290 illustrates the mobile device 5000 after the user has selected the applications that the user would like to share. The icons 5240 and 5245 of the selected applications are highlighted in the list of applications 5255. To place the device in the secondary access mode, the user then taps the home button 5009 with the user's finger (e.g., right thumb).

The sixth stage 5295 illustrates the mobile device 5000 in the secondary access mode. Here, the game and the phone applications are accessible, while the social network application, the email application, the web browser, and the music player are inaccessible. The OS provides a visual indication that the private applications are inaccessible by graying out the corresponding icons 5002, 5004, 5005, and 5006. Instead of changing the icons' appearance, the privacy tools of some embodiments hide these icons.

In the example described above, the list of applications 5255 is shown along the bottom of the device's screen. One of ordinary skill in the art would understand that this is just an example representation that can be presented in any number of different ways. For instance, the list can be shown anywhere on the screen or even in its own window. The list can also be presented with or without the application icons. The list may also include different affordances (e.g., user interface items such as check boxes, buttons, switches) to select different applications.

In the example described above, the privacy tools provide a list of applications. The user then chooses several applications to share using that list. FIG. 53 conceptually illustrates a process 5300 that some embodiments use to display the list, receive selection of applications to share from the list, and place the mobile device in secondary access mode after receiving the selection. In some embodiments, the process 5300 is performed by the privacy tools that are associated with the device's OS. The process 5300 starts when it receives (at 5305) selection of an application. The process 5300 then receives (at 5310) selection of a selectable item to display the list of applications. In the example described above by reference to FIG. 52, the user first taps and holds any application icon. The user then taps the home button while holding the application icon. This causes the device's OS to generate a display of the list of applications.

As shown in FIG. 53, the process 5300 receives (at 5315) selection of one or more applications from the list of applications. The process 5300 then places (at 5320) the mobile device in a secondary access mode. In this mode, the selected applications remain accessible while several other applications are made inaccessible (e.g., the remaining unselected applications in that list of applications). In the example described above by reference to FIG. 52, the secondary access mode is started immediately after closing the list of applications.

Some embodiments perform variations of the process 5300. The specific operations of the process 5300 may not be performed in the exact order shown and described. The specific operations may not be performed in one continuous series of operations, and different specific operations may be performed in different embodiments. Furthermore, the process 5300 could be implemented using several sub-processes, or as part of a larger macro process.

Also, in the example described above, the device on which the operating system executes has a touch screen through which a user can interact with to share one or more applications. However, one of ordinary skill in the art will realize that cursor controllers or some other input mechanisms can be used share applications on devices (e.g., desktop computer, laptop) with cursors and cursor controllers or other input mechanisms (e.g., remote control, motion sensor). In other words, while the example of FIG. 52 shows touch input through a touch-sensitive screen, the same or similar sharing functionality can be extended beyond a mobile device with the touch-sensitive screen. For example, instead of receiving selection of an application icon, the process 5300 might simply receive selection (e.g., a cursor click) of an item (e.g., a share button) to display the list of applications. The user can then select applications from that list and close the list to activate the secondary access mode.

In the previous example, the device's user selects multiple applications to share using a list of applications. The privacy tools of some embodiments provide affordances that can be used to choose one or more applications. FIG. 54 provides an illustrative example of selecting multiple applications using such affordances. In this example, the affordances (e.g., context menu items) are shown through a touch gesture (e.g., when a device's user taps and holds any application icon for a set period). Five operational stages 5470-5490 of the mobile device 5000 are illustrated in this figure. The mobile device 5000 is the same as the one described above by reference to FIG. 50.

The first stage 5470 illustrates the mobile device 5000 displaying the home screen 5007. The screen 5007 includes the social network icon 5002 and game icon 5001. The screen is also overlaid by the dock 5008. Several other icons 5003-5006 are arranged along the dock. Specifically, the icons include the phone icon 5003, the email icon 5004, the web browser icon 5005, and the music player icon 5006.

As illustrated in the first stage 5470, the user taps and holds the user's finger (e.g., left index finger) on the social network icon 5002. The second stage 5475 shows the device 5000 after the user has held the icon 5002 for a set period of time. The touch gesture causes one or more affordances (e.g., selectable items) to appear near or at least partially over each application icon. For instance, the game icon 5001 is displayed with a delete affordance 5435 (e.g., delete button) for deleting the game application and a share affordance 5430 (e.g., share button) for sharing the game application. In the example of FIG. 54, the phone icon 5003, the email icon 5004, the web browser icon 5005, and the music player icon 5006 are each shown with only the share affordance 5430 and not the delete affordance 5435. This is because these applications are pre-installed applications that come with the device's OS. That is, they are not applications installed by an end-user of the mobile device.

The second and third stages 5475 and 5480 illustrate selections of several applications to share. In the second stage 5475, the user taps the user's finger (e.g., right index finger) on the share affordance 5430 that is associated with game icon 5001. To provide a visual indication of the selection, the game icon 5001 is shown as being highlighted on the screen. As shown in the third stage 5480, the user then taps the same finger on the share affordance 5440 that is associated with phone icon 5003. This causes the phone icon 5003 to be highlighted. At any time, the user can deselect the game or the phone application by tapping the user's finger on the corresponding share affordances 5430 once again.

The fourth stage 5485 illustrates the mobile device 5000 after the user has selected the applications that the user would like to share. The icons 5001 and 5003 of the selected applications are highlighted. To place the device in the secondary access mode, the user then taps the home button 5009 with the user's finger (e.g., right thumb).

The fifth stage 5490 illustrates the mobile device 5000 in the secondary access mode. Here, the game and the phone applications are accessible, while the social network application, the email application, the web browser, and the music player are inaccessible. The OS provides a visual indication that the private applications are inaccessible by greying out the corresponding icons 5002, 5004, 5005, and 5006. Instead of changing the icons' appearance, the privacy tools of some embodiments hide these icons.

In the example described above, the affordances (e.g., context menu items) are shown when a device's user presses any application icon for a set period of time. One of ordinary skill in the art would realize that such selectable items might be shown using other gestures or other means. For example, a context menu item for an application may be displayed with a single selection (e.g., right cursor click in a cursor-based system) of the application's icon. The share affordance (e.g., share buttons) may be shown through a toolbar button, through a menu bar item, and/or through a shortcut key or hotkey.

In some embodiments, this method of selecting multiple different applications to share using different affordances is provided in conjunction with the feature of selecting a single application to share that is describe above by references to FIG. 50. That is, the privacy tools of some embodiments combine these two features to provide the device's user with an option to quickly activate the secondary access mode by selecting one application or multiple different applications. In conjunction with the single application selection feature or instead of it, the privacy tools of some embodiments provide different options for the user to choose multiple different applications. This provides the user with a choice in selecting multiple different applications.

The preceding example described how the privacy tools of some embodiments provide affordances that can be used to choose applications to share. FIG. 55 conceptually illustrates a process 5500 that some embodiments employ to display such affordances (e.g., context menu items), receive selection of different applications using the affordances, and place a device in secondary access mode after receiving the selection. In some embodiments, the process 5500 is performed by the privacy tools that are associated with the device's OS.

The process 5500 begins when it receives (at 5505) selection of a selectable item to display the share affordance. The process 5500 then displays (at 5510) the share affordance or share tool. In the example described above by reference to FIG. 54, the share affordance is a context menu item that is shown at least partially over each application icon. The context menu item appears over each application icon when the user taps and holds any application icon for a set period of time.

As shown in FIG. 55, the process 5500 receives (at 5515) selection of one or more applications to share using the secondary access tool. The process 5500 then places (at 5520) the mobile device in the share mode. In this mode, the selected applications remain accessible while several other applications are made inaccessible (e.g., the remaining unselected applications in that list of applications). In the example described above by reference to FIG. 54, the secondary access mode is started immediately after the device's user selects a selectable item (e.g., the home button).

Some embodiments perform variations of the process 5500. The specific operations of the processes 5500 may not be performed in the exact order shown and described. The specific operations may not be performed in one continuous series of operations, and different specific operations may be performed in different embodiments. Furthermore, the process 5500 could be implemented using several sub-processes, or as part of a larger macro process.

In the preceding examples and embodiments, various methods that a user can select to make an application or a set of applications accessible in secondary access mode were described. Alternatively, the privacy tools of some embodiments make applications available only in secondary access mode by moving the application icons to a particular folder (e.g., "Shared" folder) on the screen and only make those applications available via the particular folder.

Figure 56:
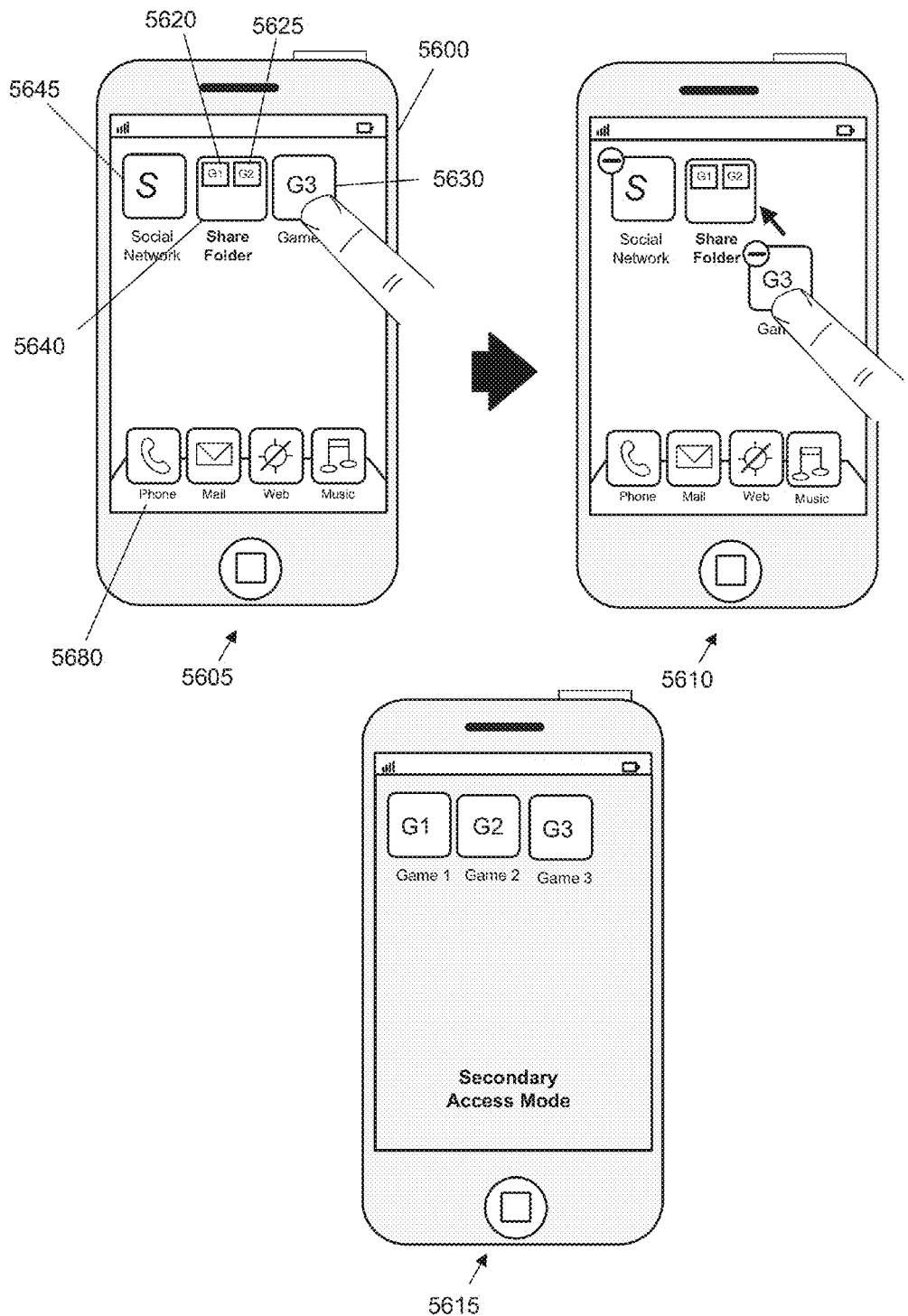
FIG. 56 provides an illustrative example of a share folder, which includes applications that are accessible in the secondary access mode.

FIG. 56 provides, in some embodiments, an illustrative example of making applications available in a secondary access mode of a mobile device by placing the applications' icons in a particular folder (e.g., "Shared" folder) while the device is in its primary access mode. Mobile device 5600 in FIG. 56 includes, in its home screen page, a Social Network application 5645, a Game application 5630, a Shared folder 5640, and four other applications in the dock 5680. Shared folder 5640 includes game application icons 5620 and 5625.

Three operational stages 5605-5615 of the mobile device 5600 are illustrated in this figure. The first stage 5605 presents the device 5600 while it is operating in its primary access mode. The first stage illustrates that a user has selected application icon 5630 and made it moveable. In order to make an application icon moveable in some embodiments, a user places and holds the user's finger on the application icon for a set period of time. Here, in the first stage 5605, the user has placed and held the user's finger, in the home screen page, on the application icon 5630 for a set period of time.

The second stage 5610 illustrates that the application icon 5630 has become moveable by indicating a delete sign on the top left corner of the icon. This second stage also illustrates that the user is dragging the application icon 5630 into the Shared folder 5640 in order to make the application accessible in the device's secondary access mode.

The third stage 5615 shows the mobile device 5600 operating in its secondary access mode. As shown in this stage, the selection and placement of the application icon 5630 in the Shared folder 5640 has made this application along with the other two applications 5620 and 5625 accessible in the device's secondary mode.

As described above, the mobile device of some embodiments allows a user of the mobile device to specify the applications that the user wants to share and the applications that the user wants to keep private when the mobile device is operating in a secondary access mode. Users often install many applications on a mobile device and, thus, the users are overwhelmed with iterating through each application and deciding whether to share or keep private the application for the secondary access mode. In some embodiments, the mobile device automatically determines the applications to share and the applications to keep private in the secondary access mode by analyzing the applications, information related to the applications, and/or a setting of a parameter specified by the user.

In some embodiments, the secondary access mode is only accessible after the main user (e.g., the owner of the device) has been authenticated. Thereafter, the secondary access mode can be accessed until the mode becomes inaccessible. The secondary access mode of some embodiments becomes inaccessible based on any one or more of the following: the device is explicitly turned off, the device is re-authenticated, the device is locked, and the device is locked and a timeout has passed.

Figure 57:
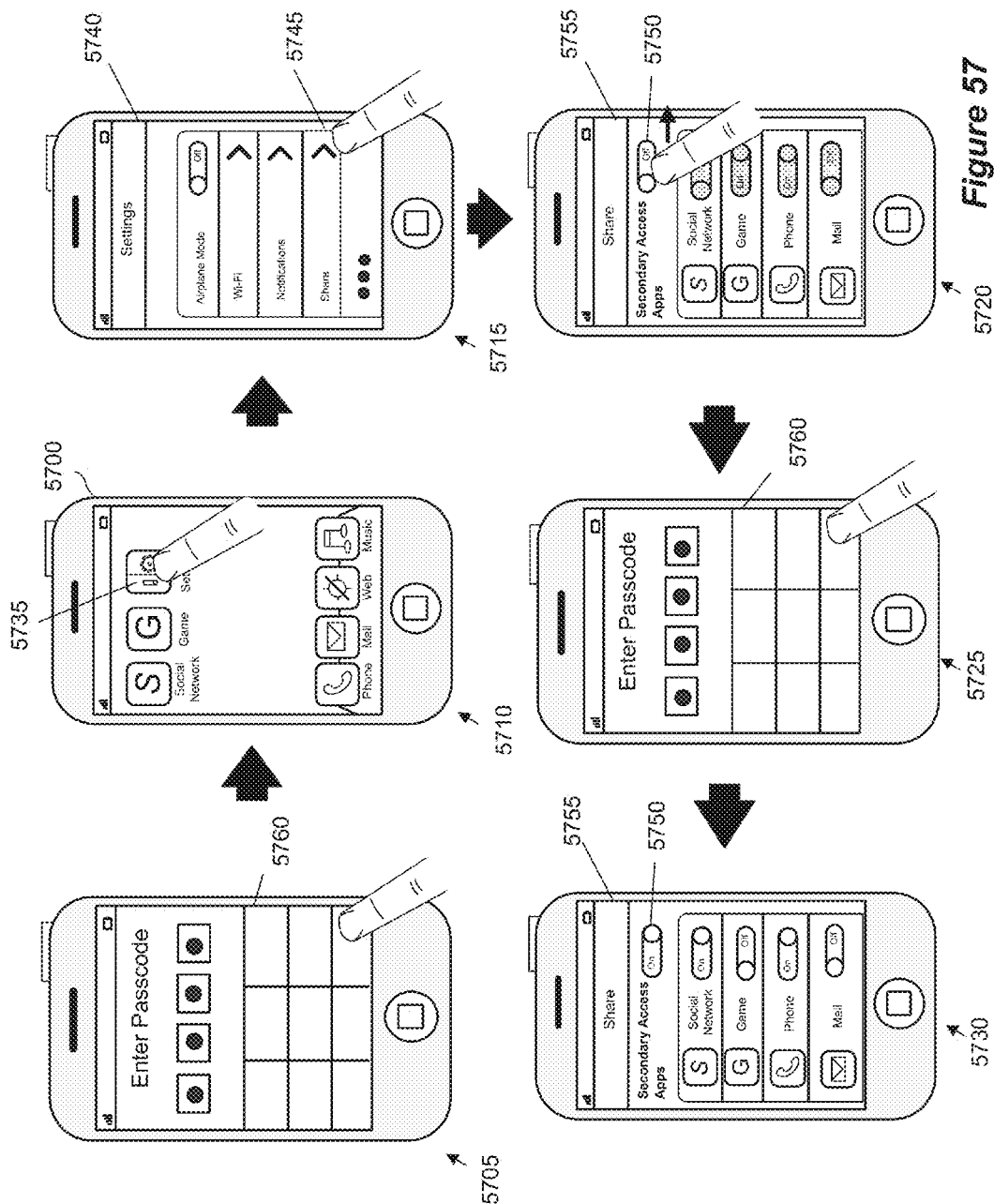
FIG. 57 conceptually illustrates an example of performing authentication on a mobile device to gain access to the secondary access mode.

FIG. 57 conceptually illustrates an example of performing authentication on a mobile device 5700 to gain access to the secondary access mode. Six operational stages 5705-5730 of the mobile device 5700 are shown in this figure. The first stage 5705 illustrates a user of the device inputting a passcode to authenticate the user. Specially, the device 5700 has been locked and is displaying a passcode page 5760. The user might have made a touch input on a lock screen page (not shown) to display this page 5760. To authenticate the user, the user has inputted a passcode with the passcode page 5760.

The second stage 5710 shows the device 5700 after the user has been authenticated. The device 5700 is displaying a home screen page on the device's touch screen display. The home page screen includes a number of icons to open different applications. The home screen page also includes an icon 5735 to open a settings menu. In the second stage 5710, the user performs a tap gesture with the user's finger on the touch screen display over the icon 5735. The tap gesture causes the settings menu to be opened, as illustrated in the third stage 5715.

The third stage 5715 shows the device 5700 displaying a main page 5740 of the settings menu. The page 5740 includes a number of affordances to navigate to different pages (e.g., sub-menus). In the example of the third stage 5715, the user selects a share tab 5745 to navigate to a page 5755 with several share mode options. The fourth stage 5720 shows the page 5755 with the shared mode options. Particularly, the page 5755 includes an affordance 5750 to turn on the secondary access mode. The page 5755 also includes several affordances to choose different applications to share when the secondary access mode has been turned on.

In the fourth stage 5720, the user turns on the shared mode by tapping or swiping the user's finger on or across the device's touch screen display over the affordance 5750. As shown in the fifth stage 5725, the touch gesture causes the device 5700 to display the passcode page 5760. The user then inputs the passcode to authenticate the user and turn on the second access mode feature. The sixth stage 5730 illustrates the device after the user has inputted the correct passcode. Specifically, the affordance 5750 on the menu page 5755 shows that the secondary access mode has been turned on. The user can now select one or more of the other affordances to choose different application to share in the secondary access mode.

In the example described above, the user is authenticated using a passcode. The device of some embodiments authenticates the user through any one or more of the following: username and password, a touch code, a pattern code, voice recognition, and fingerprint recognition. Also, in the example described above, the authentication occurs both when the user unlocks the device and when the user turns on the secondary access mode feature. In some embodiments, the authentication only occurs once (e.g., when the device is unlocked or when the secondary access mode feature is turned). Thereafter, the device can be used to access shared mode until the device is explicitly turned off, the device is re-authenticated, the device is locked, and/or the device is locked and a timeout (e.g., a passcode timeout) has passed.

Figure 58:
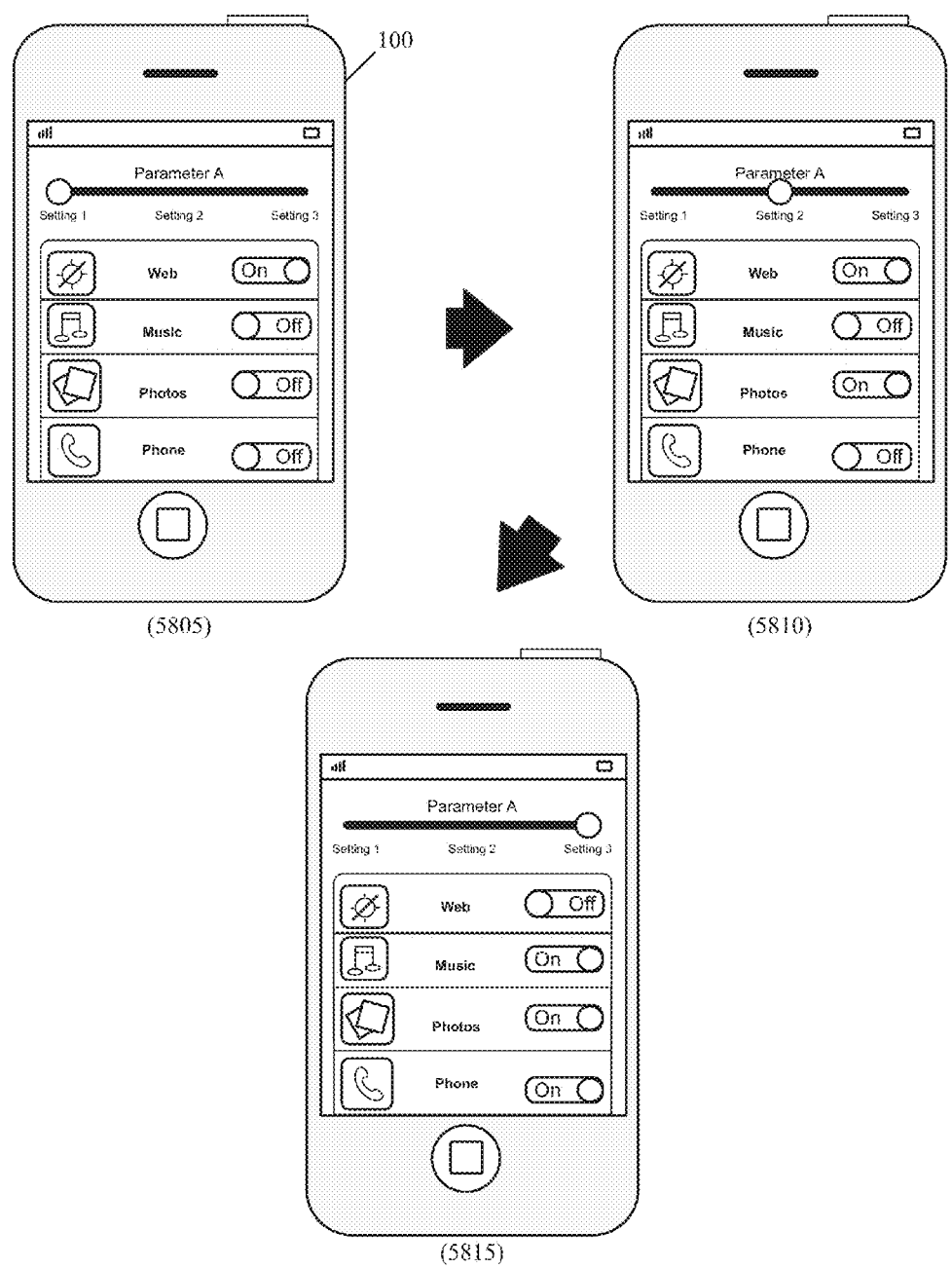
FIG. 58 conceptually illustrates an example of sharing different applications based on different parameter settings of a parameter according to some embodiments of the invention.

FIG. 58 conceptually illustrates an example of sharing different applications based on different parameter settings of a parameter according to some embodiments of the invention. Specifically, the example shown in FIG. 58 is illustrated in terms of three stages 5805-5815 of the operating of the device 100.

The first stage 5805 is similar to the first stage described above by reference to FIG. 48 except the first stage 5805 shows a slider affordance for controlling a parameter that is used to determine the applications to share and the applications to keep private when the device 100 is operating in a secondary access mode.

As shown, the first stage 5805 illustrates an example of sharing a set of applications based on a parameter setting of parameter A. For this example, setting 1 is used as a default setting for parameter A. In some embodiments, the device 100 analyzes the applications and the applications' metadata based on the default setting of parameter A in order to determine (1) the applications to share and (2) the applications to keep private for a secondary access mode of the device 100. Different embodiments use any number of different techniques to determine the applications to share and the applications to keep private for the secondary access mode of the device 100. For example, some embodiments employ a heuristic analysis technique to determine the applications to share and the applications to keep private. An example of such a technique will be described below by reference to FIGS. 62 and 63. As shown in the first stage 5805, the device 100 has determined to keep the music application, the photos application, and the phone application private and to share the web application when parameter A is set at setting 1.

The second stage 5810 illustrates an example of sharing a different set of applications based on a different parameter setting of parameter A. In this example, the user has selected and moved the slider affordance (e.g., by touching and dragging the slider affordance) in order to modify the setting for parameter A. As shown at this stage 5810, the user has adjusted the setting for parameter A from setting 1 to setting 2.

When the device 100 receives the modification of the setting for parameter A, the device 100 analyzes the applications and the applications' metadata based on the setting of parameter A in order to determine (1) the applications to share and (2) the applications to keep private for a secondary access mode of the device 100. In some embodiments, the same or similar techniques described above by reference to the first stage 5805 are used to make such a determination. As illustrated in the second stage 5810, the device 100 has determined to keep the music application and the phone application private and to share the web application and the photos application when parameter A is set at setting 2.

The third stage 5815 shows another example of sharing a different set of applications based on a different parameter setting of parameter A. For this example, the user has selected and moved the slider affordance (e.g., by touching and dragging the slider affordance) in order to modify the setting for parameter A. As illustrated at the third stage 5815, the user has adjusted the setting for parameter A from setting 2 to setting 3.

When the device 100 receives the modification of the setting for parameter A, the device 100 analyzes the applications and the applications' metadata based on the setting of parameter A in order to determine (1) the applications to share and (2) the applications to keep private for a secondary access mode of the device 100. In some embodiments, the same or similar techniques described above by reference to the first stage 5805 are used to make such a determination. As shown in the third stage 5815, the device 100 has determined to keep the web application private and to share the music application, the photos application, and the phone application when parameter A is set at setting 3.

FIG. 58 illustrates a device of some embodiments that provides an adjustable parameter and that determines applications to share or keep private based on the setting of the parameter. However, in some embodiments, the device does not provide any adjustable parameters. The device of some such embodiments provides a switch for each application that allows the user to select between sharing the application and keeping the application private for a secondary access mode of the device. In some such embodiments, the device automatically determines a default selection for each application (i.e., whether to share the application or keep the application private) using the heuristic analysis technique described below by reference to FIGS. 62 and 63.

Figure 59:
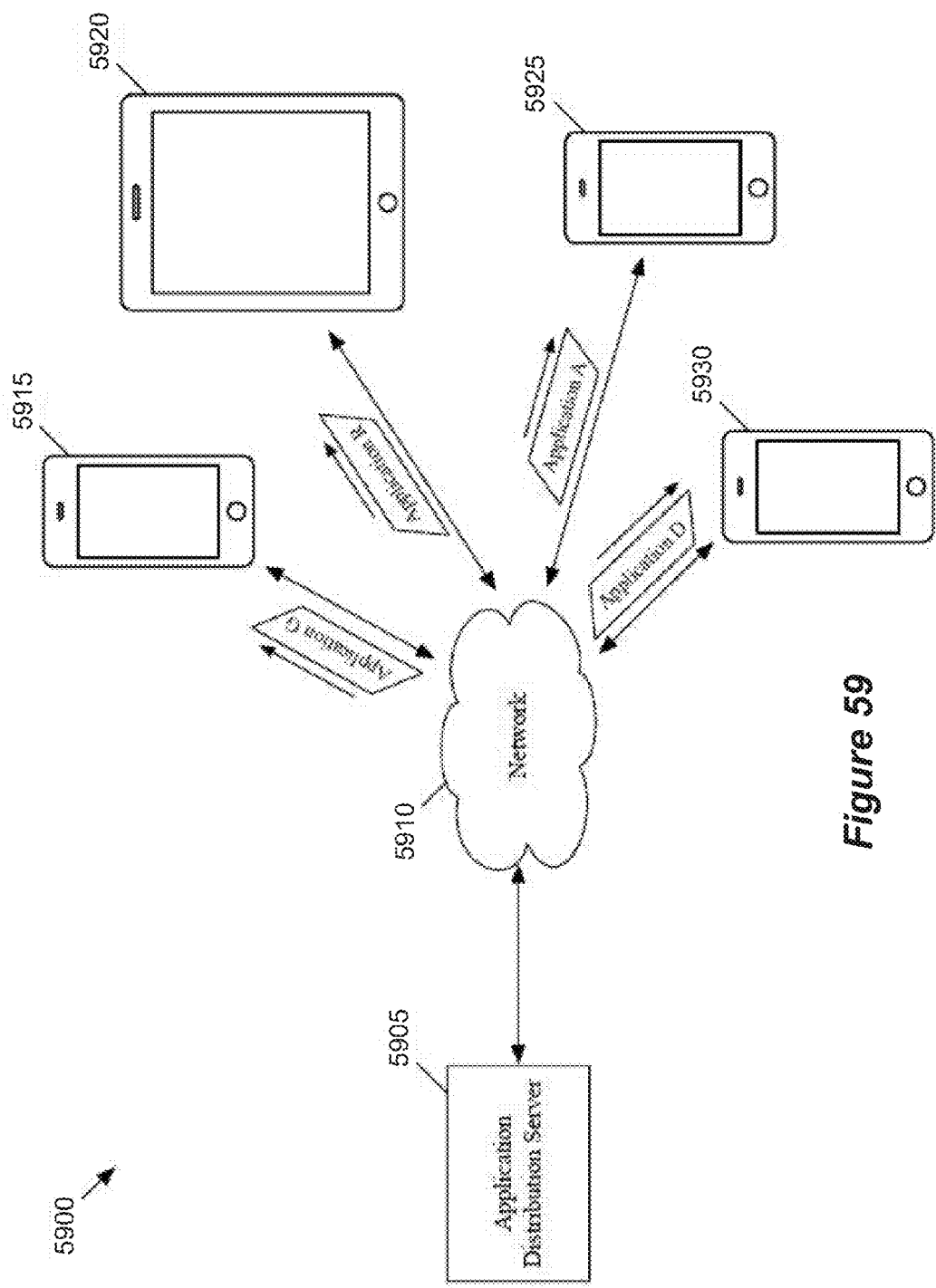
FIG. 59 conceptually illustrates an application distribution system of some embodiments.

FIG. 59 conceptually illustrates an application distribution system 5900 of some embodiments. In some embodiments, the application distribution system 5900 provides a mechanism for distributing applications to devices. As shown, the application distribution system 5900 includes an application distribution server 5905 and several client devices 5915-5930. In this example, the client devices 5915-5930 communicate with the application distribution server 5905 through a network 5910. In some embodiments, the network 5910 is a local area network (LAN), a wide area network (WAN), an Intranet, a network of networks (e.g., the Internet), or any other type of network.

The application distribution server 5905 is responsible for distributing applications to the client devices 5915-5930. The application distribution server 5905 of some embodiments is a component that is integrated with other servers that provide other functions and/or services. For instance, the application distribution server 5905 is integrated, in some embodiments, with an online digital media store (e.g., iTunes® provided by Apple Inc.). In some embodiments, the application distribution server 5905 is implemented on a single computing device while, in other embodiments, the application distribution server 5905 is implemented across multiple computing devices (e.g., several servers).

In some embodiments, the application distribution server 5905 hosts applications that are installable on the client devices 5950-5930. In some embodiments, the applications that the application distribution server 5905 hosts include first party applications, second party applications, third party applications, etc. The application distribution server 5905 in some embodiments provides a service that allows users of the client devices 5915-5930 to browse, search and download applications hosted on the application distribution server 5905.

In addition, FIG. 59 conceptually illustrates different client devices 5915-5930 downloading different applications from the application distribution server 5905 through the network 5910. As shown, the client device 5915 is downloading Application G, client device 5920 is downloading Application R, client device 5925 is downloading Application A, and client device 5930 is downloading Application D. Although FIG. 59 shows the client devices 5915-5930 downloading the respective Applications A, D, G, and R, one of ordinary skill in the art will recognize that the client devices 5915-5930 may download the respective applications at the same, overlapping, or different times.

While FIG. 59 shows mobile devices and tablet computing devices as client devices in an application distribution system, one of ordinary skill in the art will realize that the application distribution system is not limited to such devices. For instance, in some embodiments, the application distribution system 5900 facilitates the distribution of applications to any number of additional and/or different types of computing devices (e.g., desktop computers, notebook computers, server computers, etc.).

In addition to applications that are downloaded to the mobile device through an application distribution system, the mobile device of some embodiments have applications that are pre-loaded on the mobile device as part of an initial configuration of the mobile device (e.g., installation of an operating system on the mobile device). In some embodiments, the mobile device analyzes these applications and the applications' metadata to generate additional metadata, which is used for determining the applications to share and the applications to keep private for a secondary access mode of the mobile device.

Figure 60:
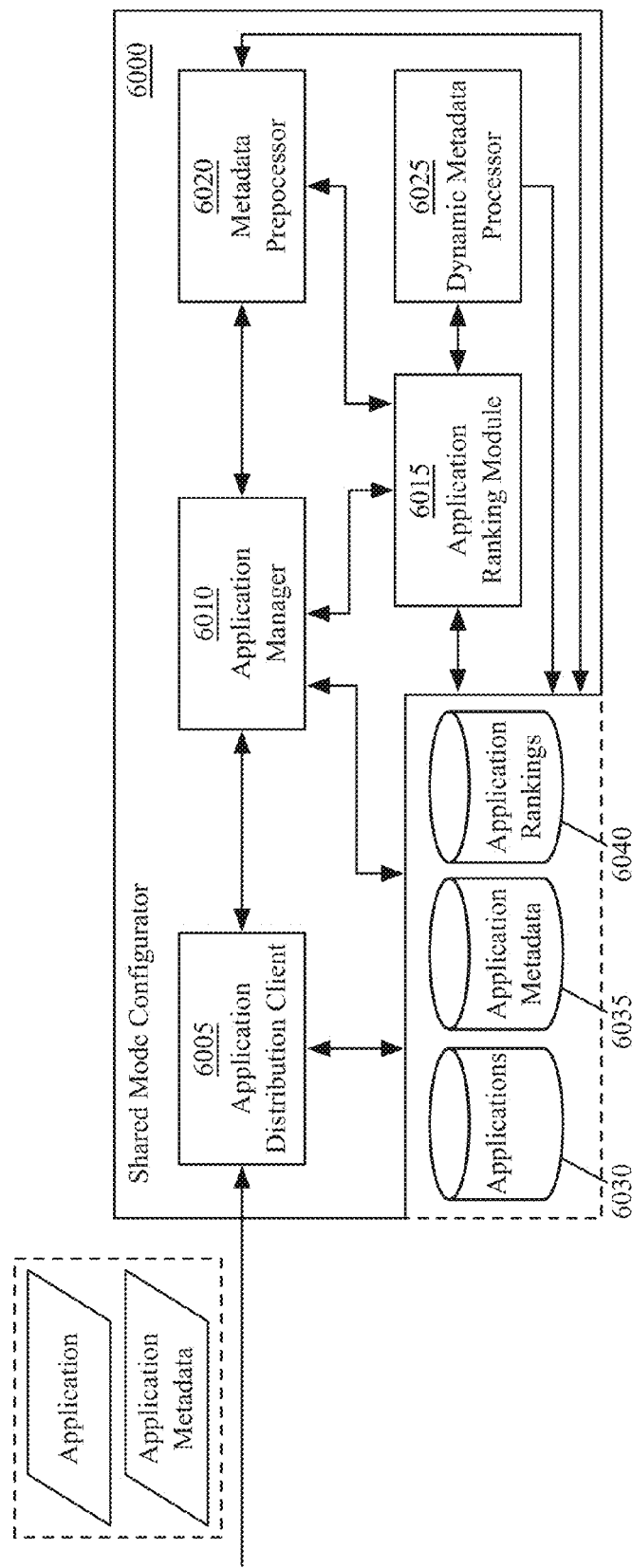
FIG. 60 conceptually illustrates a software architecture of a multiple-access mode application of some embodiments.

FIG. 60 conceptually illustrates a software architecture of a shared mode configurator 6000 of some embodiments. The shared mode configurator 6000 of some embodiments runs on a mobile device that is operable in multiple access modes, including the secondary access mode described in this application. The shared mode configurator 6000 of different embodiments is implemented differently. For instance, in some embodiments, the shared mode configurator 6000 is implemented as a stand-alone application. The shared mode configurator 6000 of some embodiments is integrated into another application while the shared mode configurator 6000 of other embodiments might be implemented within an operating system (e.g., iOS®, provided by Apple Inc.).

In some embodiments, the shared mode configurator 6000 is provided as part of a server-based solution. In some such embodiments, the shared mode configurator 6000 is provided via a thin client. That is, the shared mode configurator 6000 runs on a server while a user interacts with the shared mode configurator 6000 via a separate machine remote from the server. In other such embodiments, the shared mode configurator 6000 is provided as a thick client. That is, the shared mode configurator 6000 is distributed from the server to the client machine and runs on the client machine.

As illustrated in FIG. 60, the shared mode configurator 6000 includes an application distribution client 6005, an application manager 6010, an application ranking module 6015, a metadata preprocessor 6020, and a dynamic metadata processor 6025. The shared mode configurator 6000 also includes applications storage 6030, application metadata storage 6035, and application rankings storage 6040.

The applications storage 6030 stores applications that are operable on the mobile device and may be shared or kept private for a secondary access mode of the mobile device. The application metadata storage 6035 stores metadata (e.g., genres to which applications are classified, age restrictions for the applications, rating, operating requirements, version information, file size of the application, reviews, entitlements that the applications utilizes, etc.) that describes the applications stored in the storage 6030. In some embodiments, the application's metadata includes metadata specified by a developer of the application. The application rankings storage 6040 stores rankings for the applications that is used by the shared mode configurator 6000 in determining the applications to share and the applications to keep private for the secondary access mode of the mobile device.

In some embodiments, the storages 6030-6040 are implemented in one physical storage while, in other embodiments, the storages 6030-6040 are implemented on separate physical storages. Still, in some embodiments, some or all of the storages 6030-6040 are implemented across several physical storages.

The application distribution client 6005 handles applications that the user of the mobile device downloads to and installs on the mobile device. In some embodiments, the application distribution client 6005 interfaces with an application distribution server (e.g., the application distribution server described above and below by reference to FIGS. 59 and 64) and receives the applications that the user specifies to be downloaded to and installed on the mobile device.

The application manager 6010 is responsible for managing applications for the shared mode (e.g., a secondary access mode) of the mobile device. In some embodiments, the applications that the application manager 6010 manages include applications that are downloaded to and installed on the mobile device, which the application manager 6010 receives from the application distribution client 6005, as well as applications that are pre-loaded on the mobile device as part of an initial configuration of the mobile device (e.g., installation of an operating system on the mobile device).

To manage applications for the shared mode of the mobile device, the application manager 6010 of some embodiments uses the metadata preprocessor 6020, the application ranking module 6015, and the dynamic metadata processor 6025 to facilitate in initial processing of application metadata, dynamic processing of application metadata, and ranking of applications. Such processing of the applications and the application metadata allow the shared mode configurator 6000 to determine the applications to share and the applications to keep private for the shared mode of the mobile device.

The metadata preprocessor 6020 processes the applications' metadata. In some embodiments, the metadata preprocessor 6020 is directed by the application manager 6010 to perform an initial processing of the applications' metadata when the application manager 6010 receives the applications (which the application manager 6010 receives from the application distribution client 6005). The initial preprocessing of some embodiments for a particular application includes identifying metadata from the application metadata of the particular application, analyzing the metadata and/or the particular application itself to generate additional metadata for the particular application, and storing in the application metadata storage 6035 the identified metadata and any additional metadata generated for the application. In some embodiments, the metadata preprocessor 6020 analyzes a subset of the particular application's metadata while, in other embodiments, the metadata preprocessor 6020 analyzes all of the particular application's metadata, in order to generate additional metadata for the particular application.

Different embodiments of the metadata preprocessor 6020 use any number of different techniques to generate additional metadata for applications that the shared mode configurator 6000 uses to determine which applications to share and which applications to keep private for the secondary access mode of the mobile device. For instance, in some embodiments, the metadata preprocessor 6020 generates additional metadata for an application by (1) analyzing the application to identify defined linked libraries (e.g., libraries associated with key chains, data encryption, or any other type of security features) that the application uses and (2) generating metadata for the application indicating that the application uses such linked libraries. Another technique that the metadata preprocessor 6020 of some embodiments uses to generate additional metadata involves (1) analyzing the application to identify defined classes of data encryption and/or encryption levels that the application uses for managing data and (2) generating metadata for the application indicating that the application uses such classes of data encryption and/or encryption levels. Additional and/or different techniques are used in some embodiments.

The dynamic metadata processor 6025 handles the processing of application metadata for applications after the metadata preprocessor 6020 performs an initial processing of the applications' metadata. In some embodiments, the application manager 6010 directs the dynamic metadata processor 6025 to processing applications' metadata at defined interval (e.g., once every hour, day, week, month, etc.). Alternatively or in conjunction with processing application's metadata at defined intervals, the application manager 6010 of some embodiments directs the dynamic metadata processor 6025 to processing applications' metadata based on defined events and/or conditions. Examples of events and/or conditionals include when applications are updated, modifications or changes to certain metadata of applications, etc.

In some embodiments, the dynamic metadata processor 6025 processes metadata of a particular application by analyzing the existing metadata of the particular application, generating additional metadata for the particular application based on the analysis, and storing with the existing metadata of the particular application in the application metadata storage 6035 any additional metadata generated for the application.

The dynamic metadata processor 6025 of different embodiments uses any number of different techniques to generate additional metadata for applications that the shared mode configurator 6000 uses to determine which applications to share and which applications to keep private for the secondary access mode of the mobile device. In some embodiments, the dynamic metadata processor 6025 uses the techniques described above by reference to the metadata preprocessor 6020 to generate additional metadata for an application. That is, the dynamic metadata processor 6025 of some embodiments generates additional metadata for an application by (1) analyzing the application to identify defined linked libraries (e.g., libraries associated with key chains, data encryption, or any other type of security features) that the application uses and (2) generating metadata for the application indicating that the application uses such linked libraries and/or by (1) analyzing the application to identify defined classes of data encryption and/or encryption levels that the application uses for managing data and (2) generating metadata for the application indicating that the application uses such classes of data encryption and/or encryption levels. Additional and/or different techniques are used in some embodiments.

The application ranking module 6015 ranks the applications in order to assist the shared mode configurator 6000 in determining the applications to share and the applications to keep private in the shared mode of the mobile device. In some embodiments, the application ranking module 6015 ranks the applications based on the applications' metadata and analysis of the applications. An example technique for ranking applications is described below by reference to FIGS. 62 and 63. Once the application ranking module 6015 ranks the applications, the application ranking module 6015 stores the rankings in the application rankings storage 6040.

Figure 61:
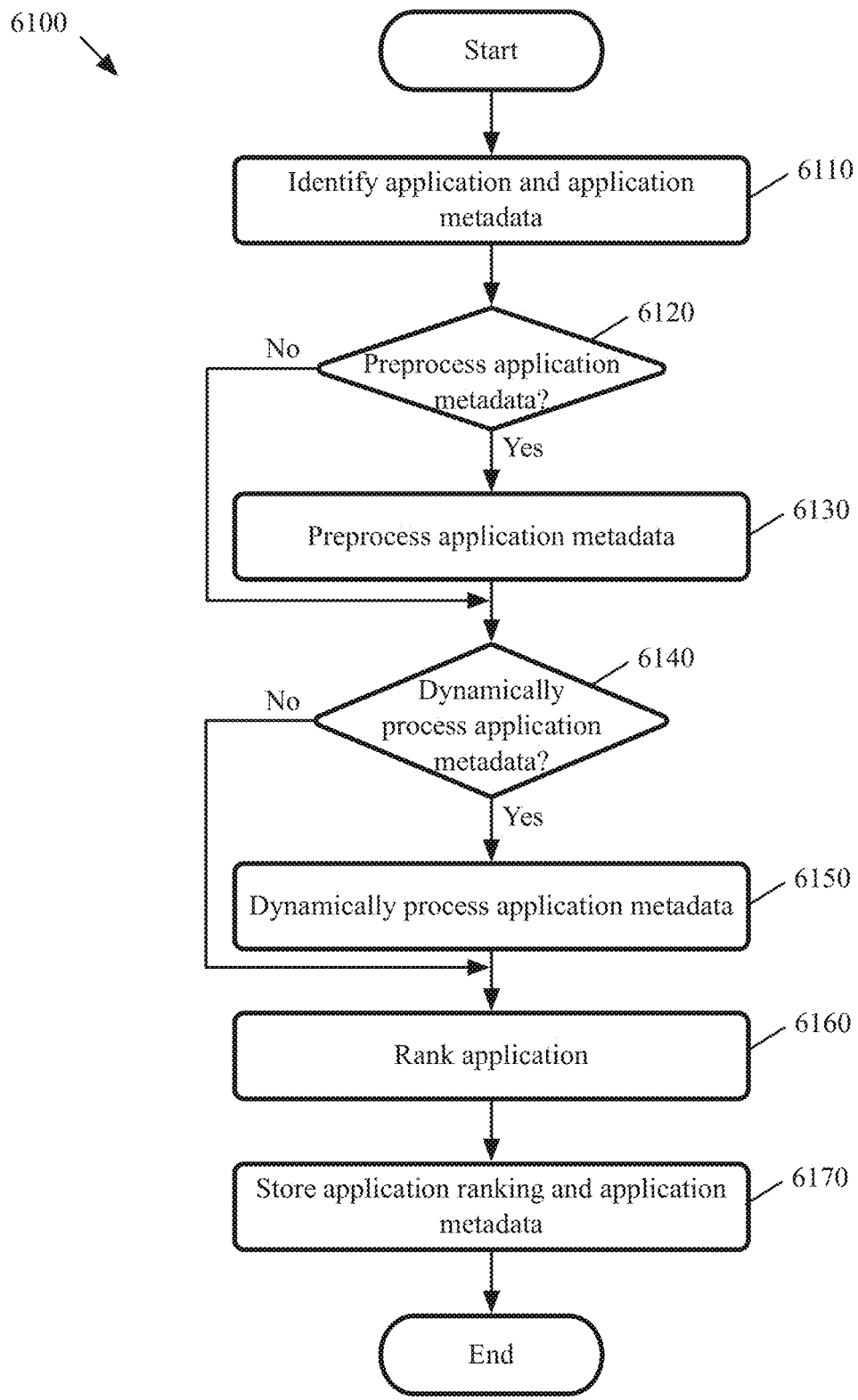
FIG. 61 conceptually illustrates a process of some embodiments for processing applications for a shared mode.

An example operation of the shared mode configurator 6000 will now be described by reference to FIG. 61, which conceptually illustrates a process 6100 of some embodiments for processing applications for a shared mode. In some embodiments, the shared mode configurator 6000 performs the process 6100 when the shared mode configurator 6000 performs processing of metadata for an application (e.g., when the application distribution client 6005 receives an application, when the application manager 6010 determines to process metadata for an application at a defined interval or upon defined events and/or conditions, etc.).

The process 6100 begins when the application manager 6010 identifies (at 6110) an application and the application metadata. In some embodiments, the application manager 6010 identifies the application when the application manager 6010 receives the application from the application distribution client 6005 (e.g., due to the user of the mobile device specifying the application to download to and install on the mobile device) or when the application manager 6010 determines to process metadata for an application at a defined interval or upon defined events and/or conditions.

Next, the application manager 6010 determines (at 6120) whether to preprocess the application metadata of the application. In some embodiments, the application manager 6010 determines to preprocess the application's metadata when the application is received at the shared mode configurator 6000 and the application has not been processed by the shared mode configurator 6000 (e.g., the application manager 6010 receives the application from the application distribution client 6005).

When the application manager 6010 determines to preprocess the application's metadata, the application manager 6010 directs the metadata preprocessor 6020 to preprocess (at 6130) the application's metadata. Otherwise, the application manager 6010 determines (at 6140) whether to dynamically process the application metadata of the application. In some embodiments, the application manager 6010 determines to dynamically process the application's metadata based on a defined interval or upon defined events and/or conditions, as described above.

When the application manager 6010 determines to dynamically process the application's metadata, the application manager 6010 directs the dynamic metadata processor 6025 to process (at 6150) the application's metadata and then proceeds to 6160. Otherwise, the application manager 6010 proceeds to 6160.

At 6160, the application manager 6010 instructs the application ranking module 6015 to rank the application. In some embodiments, the application ranking module 6015 ranks the applications based on the application's metadata and analysis of the application. An example technique for ranking applications is described below by reference to FIGS. 62 and 63.

Finally, the application ranking module 6015 stores (at 6170) the rankings in the application rankings storage 6040 and the metadata preprocessor 6020 and/or the dynamic metadata processor 6025 stores the application's metadata in the application metadata storage 6035.

While many of the features in this example have been described as being performed by one module (e.g., the application manager 6010, the application ranking module 6015, etc.), one of ordinary skill in the art would recognize that the functions might be split up into multiple modules. Similarly, the functions described as being performed by multiple different modules in this example might be performed by a single module in some embodiments (e.g., the metadata preprocessor 6020 might be part of the dynamic metadata processor 6025).

Figure 62:
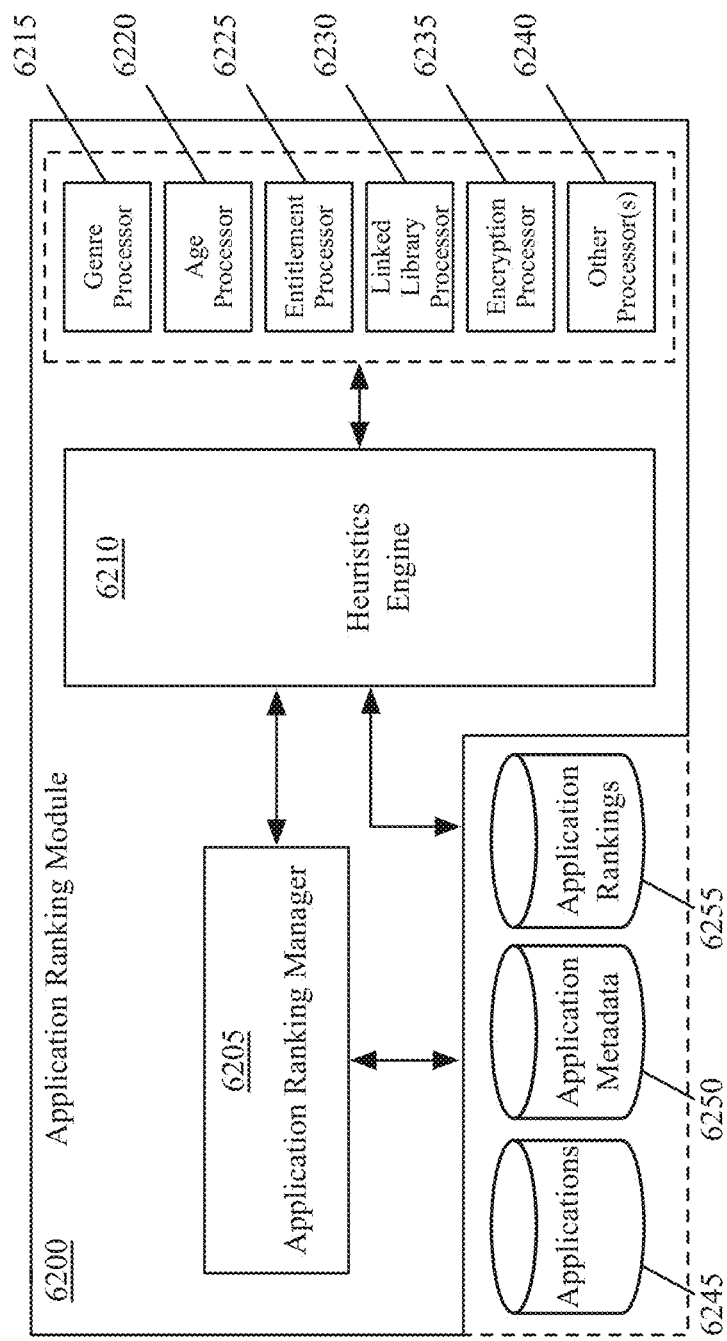
FIG. 62 conceptually illustrates a software architecture of an application ranking module of some embodiments.

FIG. 62 conceptually illustrates a software architecture of an application ranking module 6200 of some embodiments. In some embodiments, the application ranking module 6200 implements the application ranking module described above by reference to FIG. 60 in order to rank applications for assisting the shared mode configurator 6000 in determining the applications to share and the applications to keep private in the shared mode of the mobile device Different embodiments of the application ranking module 6200 are implemented differently. For instance, the application ranking module 6200 of some embodiments is implemented as a stand-alone application. In some embodiments, the application ranking module 6200 is integrated into another application (e.g., the shared mode configurator 6000 described above by reference to FIG. 60) while, in other embodiments, the application ranking module 6200 might be implemented within an operating system (e.g., iOS®, provided by Apple Inc.).

In some embodiments, the application ranking module 6200 is provided as part of a server-based solution. The application ranking module 6200 of some such embodiments is provided via a thin client. That is, the application ranking module 6200 runs on a server while a user interacts with the application ranking module 6200 via a separate machine remote from the server. In other such embodiments, the application ranking module 6200 is provided as a thick client. That is, the application ranking module 6200 is distributed from the server to the client machine and runs on the client machine.

As shown in FIG. 62, the application ranking module 6200 includes an application ranking manager 6205, a heuristics engine 6210, and application attribute processors 6215-6240. The application ranking module 6200 also includes applications storage 6245, application metadata storage 6250, and application rankings storage 6255. In some embodiments, the storages 6245-6255 are similar to the corresponding storages 6030-6040 described above by reference to FIG. 60. In other words, the applications storage 6245 stores applications that are operable on the mobile device and may be shared or kept private for a secondary access mode of the mobile device, the application metadata storage 6250 stores metadata (e.g., genres to which applications are classified, age restrictions for the applications, entitlements that the applications utilize, etc.) that describes the applications stored in the storage 6245, and the application rankings storage 6255 stores rankings for the applications that is used (e.g., by the shared mode configurator 6000 described above by reference to FIG. 60) to determine the applications to share and the applications to keep private for the secondary access mode of the mobile device.

Similarly, the storages 6245-6255 of some embodiments are implemented in one physical storage while the storages 6245-6255 of other embodiments are implemented on separate physical storages. Still, in some embodiments, some or all of the storages 6245-6255 are implemented across several physical storages.

In some embodiments, the application ranking manager 6205 is responsible for managing the rankings of applications, which are used for determining the applications to share and the applications to keep private for the secondary access mode of the mobile device. The applications of which the application ranking manager 6205 manages the ranking include the applications that are managed by the application manager 6010 described above by reference to FIG. 60. That is, these applications include applications that are downloaded to and installed on the mobile device and applications that are pre-loaded on the mobile device as part of an initial configuration of the mobile device (e.g., installation of an operating system on the mobile device).

The application ranking manager 6205 of some embodiments employs the heuristics engine 6210 in ranking the applications. In some embodiments, the application ranking manager 6205 (1) receives heuristic measures from the heuristics engine 6210 for a particular application for which the application ranking manager 6205 is determining a ranking and (2) uses the heuristic measures to determine a ranking for the application. In some embodiments, a ranking (e.g., a score or value) for an application represents a likelihood that the application is shared or kept private. For instance, applications that have high rankings are more likely to be shared compared to applications that have low rankings A ranking for an application, in some embodiments, represents a likelihood that the application is shared or kept private relative to other applications based on the rankings of the other applications. For example, if all the applications have high rankings, the applications that have higher rankings among those high ranking applications are more likely to be shared compared to the applications that have lower rankings among those high ranking applications.

In some embodiments, the application ranking manager 6205 determines different rankings for each application to use for different approaches (e.g., the approaches described above by reference to FIGS. 43-49) of specifying and/or determining applications to share and applications to keep private for a secondary access mode. For instance, in some embodiments, the application ranking manager 6205 determines for each application a general ranking (e.g., used for the approaches described above by reference to FIGS. 43 and 44), a ranking based on an age group parameter (e.g., used for the approaches described above by reference to FIGS. 46 and 47), and a ranking based on a relationship closeness parameter (e.g., used for the approaches described above by reference to FIG. 48).

The heuristics engine 6210 determines heuristic measures for applications when the heuristics engine 6210 receives requests from the application ranking manager 6205 to provide heuristics measures to the application ranking manager 6205. In some embodiments, the heuristics engine 6210 receives a request from the application ranking manager 6205 that specifies an application for which to determine heuristic measures and, in some cases, a setting for a parameter on which to determine the heuristic measures for the application.

Based on the specified application, the heuristics engine 6210 accesses the application in the applications storage 6245 and the application's metadata in the application metadata storage 6250. The heuristics engine 6210 then uses some or all the application attribute processors 6215-6240 to (1) process metadata related to different attributes of the application and/or the application itself and (2) provide attribute information for the heuristics engine 6210. When the heuristics engine 6210 receives attribute information back from the application attribute processors 6215-6140, the heuristics engine 6210 determines heuristic measures for the application based on the processing information and passes the heuristic measures for the application to the application ranking manager 6205.

The application attribute processors 6215-6240 generate attribute information based on attributes of an application. In some embodiments, the attribute information includes a heuristic measure (e.g., a set of scores or values) that represents the likelihood that users might want to share the application based on the attribute of the application for which the application attribute processor is generating information.

In this example, the application attribute processor 6215 generates attribute information based on genres to which the application is classified, the application attribute processor 6220 generates attribute information based on age restrictions for the application, the application attribute processor 6225 generates attribute information based on entitlements that the applications utilizes, the application attribute processor 6230 generates attribute information based on linked libraries that the application uses, the application attribute processor 6235 generates attribute information based on classes of data encryption and/or encryption levels that the application uses to manage data, and the application attribute processor 6240 generates attribute information based on other attribute(s) of the application.

In some embodiments, each of the application attribute processors 6215-6240 generates corresponding attribute information based on the application's metadata that is related to the attribute, other metadata of the application, and/or the application itself. For instance, the genre processor 6215 of some embodiments generates genre information related to an application based on metadata specifying the genre to which the application belongs, and metadata specifying the age restriction of the application since users might want to share some genres of applications and keep other genres of applications private (e.g., share games and keep private finance applications) and share some applications within a genre restricted for one age group and keep private some applications within the genre for another age group (e.g., share games for ages 5 and up and keep private games for ages 21 and up).

Figure 63:
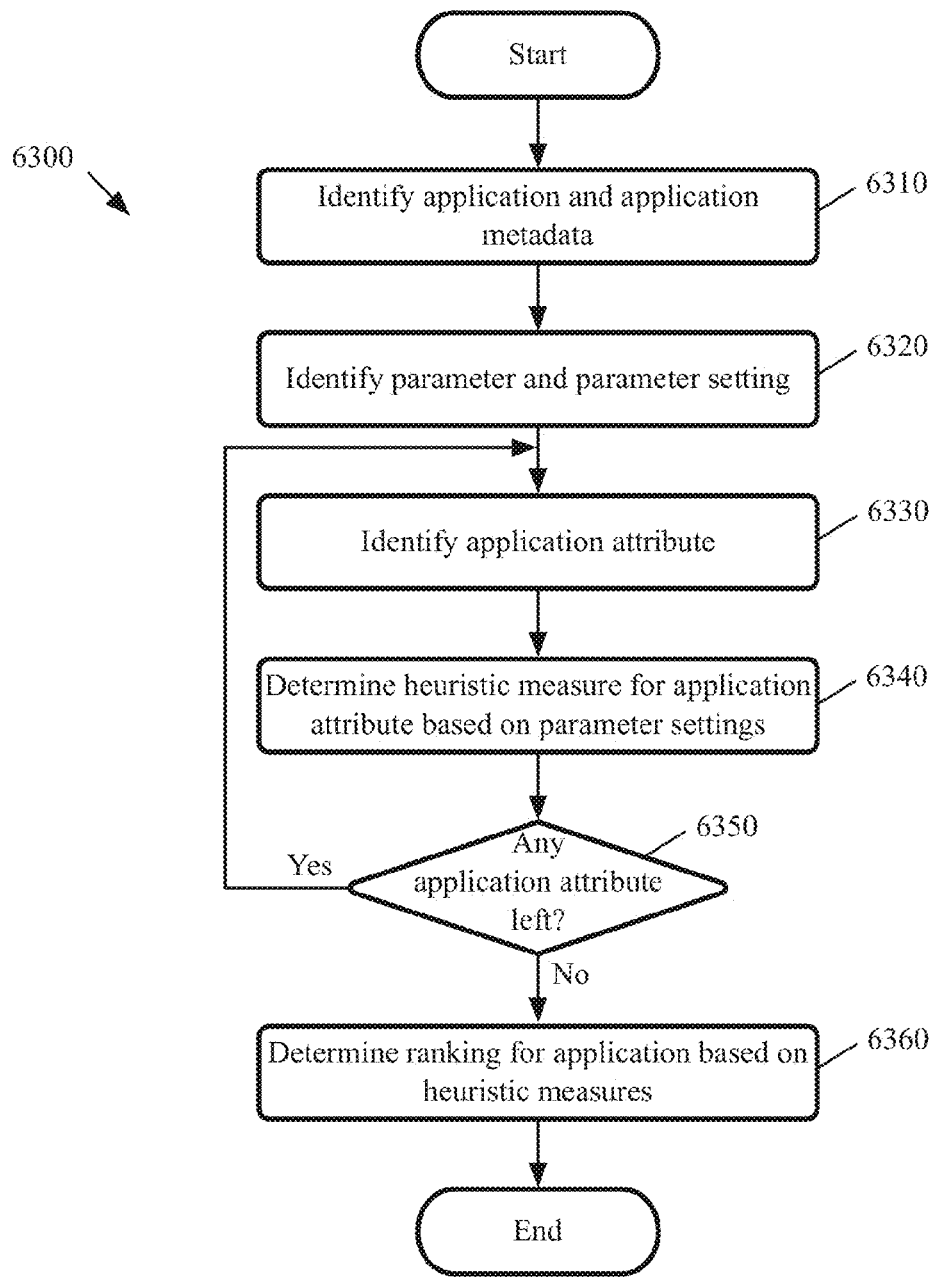
FIG. 63 conceptually illustrates a process of some embodiments for ranking an application based on heuristics.

An example operation of the application ranking module 6200 will now be described by reference to FIG. 63, which conceptually illustrates a process 6300 of some embodiments for ranking an application based on heuristics. In some embodiments, the application ranking module 6200 performs the process 6300 when the application ranking module 6200 determines a ranking for an application.

The process 6300 starts when the application ranking manager 6205 determines a ranking for an application by identifying (at 6310) (1) the application for which the application ranking manager 6205 is determining a ranking and (2) the application's metadata. As explained above, when the application ranking manager 6205 determines a ranking for an application, the application ranking manager 6205 of some embodiments sends a request to the heuristics engine 6210 that specifies the application for which to determine heuristic measures and, in some cases, a setting for a parameter on which to determine the heuristic measures for the application.

When the heuristics engine 6210 receives the request from the application ranking manager 6205, the heuristics engine 6210 identifies (at 6320) the parameter setting for the parameter specified in the request. In cases where the request does not specify a setting for a parameter, the process 6300 proceeds to 6330.

Next, the heuristics engine 6210 identifies (at 6330) an application attribute to process. In some embodiments, the heuristics engine 6210 selects an attribute for which one of the application attribute processors 6215-6240 is generating information and passes the application's metadata that is related to the attribute, other metadata of the application, and/or the application itself to the application attribute processor that is responsible for generating information for the application attribute.

The application attribute processor then determines (at 6340) a heuristic measure for the application attribute based on the information received from the heuristics engine 6210 (e.g., the application's metadata, other metadata of the application, and/or the application itself) and the parameter settings in cases where a parameter setting is specified in the request. The application attribute processor generates the heuristic measure using any number of the techniques described above and returns the heuristic measure to the heuristics engine 6210.

Next, the heuristics engine 6210 determines (at 6350) whether any application attribute is left to process. When the heuristics engine 6210 determines that an application attribute is left to process, the heuristics engine 6210 returns to 6330 to continue processing any remaining application attributes. Otherwise, the heuristics engine 6210 returns the heuristic measures to the application ranking manager 6205.

Finally, the application ranking manager 6205 determines a ranking for the application based on the heuristic measures that the application ranking manager 6205 received from the heuristics engine 6210. Different embodiments of the application ranking manager 6205 use any number of different methods to determine a ranking for the application based on the heuristic measures. For instance, in some embodiments, the application ranking manager 6205 uses an average of the heuristic measures, a weighted average of the heuristic measures, etc.

While many of the features in this example have been described as being performed by one module (e.g., the application ranking manager 6205), one of ordinary skill in the art would recognize that the functions might be split up into multiple modules. Similarly, the functions described as being performed by multiple different modules in this example might be performed by a single module in some embodiments (e.g., the application attribute processors 6215-6240 might be part of the heuristics engine 6210).

Figure 64:
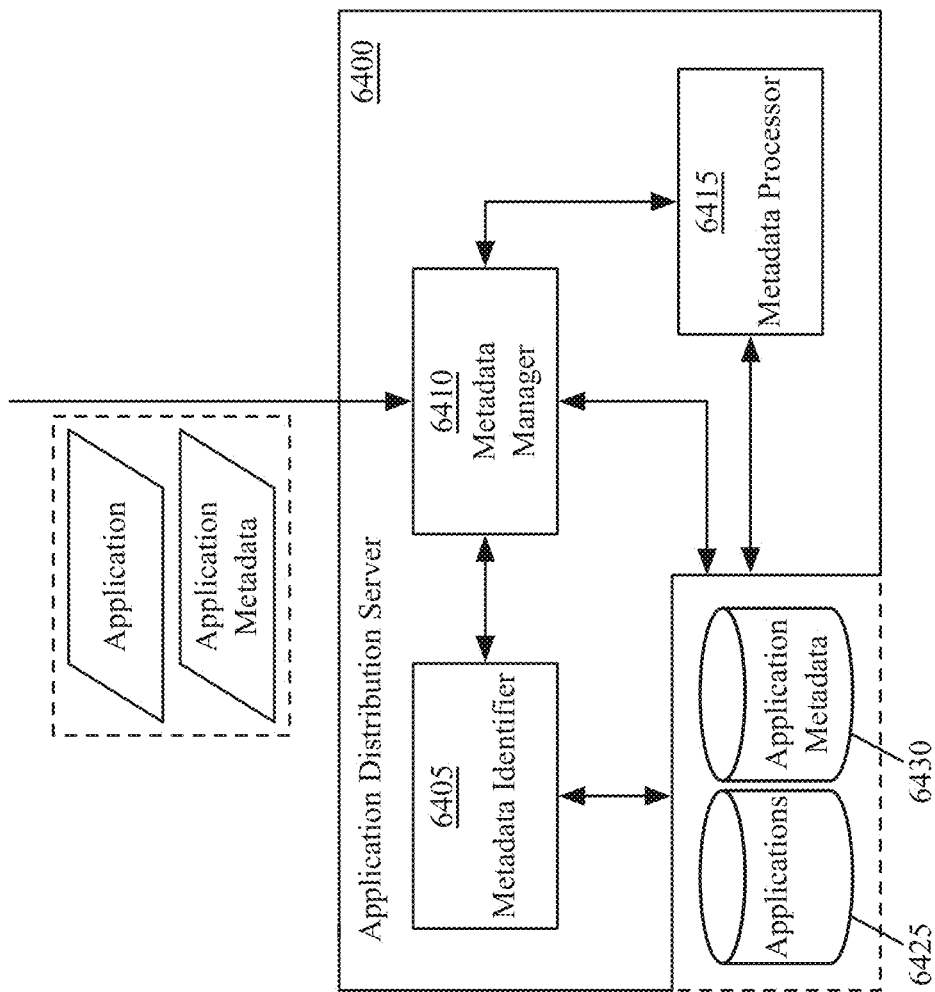
FIG. 64 conceptually illustrates a software architecture of an application distribution server of some embodiments.

FIG. 64 conceptually illustrates a software architecture of an application distribution server 6400 of some embodiments. In some embodiments, the application distribution server 6400 processes applications' metadata in order to generate additional metadata for the applications that is used for determining the applications to share and the applications to keep private for the secondary access mode of a mobile device. In some embodiments, the application distribution server 6400 implements the application distribution server described above by reference to FIG. 59.

Different embodiments of the application distribution server 6400 are implemented differently. For instance, in some embodiments, the application distribution server 6400 is implemented as a stand-alone application. The application distribution server 6400 of some embodiments is integrated into another application while the application distribution server 6400 of other embodiments might be implemented within an operating system. In addition, the application distribution server 6400 of some embodiments is implemented on a single computing device while the application distribution server 6400 of other embodiments is implemented across several computing devices (e.g., several servers).

In some embodiments, the application distribution server 6400 is provided as part of a server-based solution. In some such embodiments, the application distribution server 6400 is provided via a thin client. That is, the application distribution server 6400 runs on a server while a user interacts with the application distribution server 6400 via a separate machine remote from the server. In other such embodiments, the application distribution server 6400 is provided as a thick client. That is, the application distribution server 6400 is distributed from the server to the client machine and runs on the client machine.

As illustrated in FIG. 64, the application distribution server 6400 includes a metadata identifier 6405, a metadata manager 6410, and a metadata processor 6415. The application distribution server 6400 also includes applications storage 6425 and application metadata storage 6430.

The applications storage 6425 stores applications that the application distribution server 6400 hosts and distributes to client devices The application metadata storage 6430 stores metadata (e.g., genres to which applications are classified, age restrictions for the applications, rating, operating requirements, version information, file size of the application, reviews, entitlements that the applications utilizes, etc.) that describes the applications stored in the storage 6425. In some embodiments, the application's metadata includes metadata specified by a developer of the application. In some embodiments, the storages 6425 and 6430 are implemented in one physical storage while, in other embodiments, the storages 6425 and 6430 are implemented on separate physical storages. Still, in some embodiments, some or all of the storages 6425 and 6430 are implemented across several physical storages.

The metadata manager 6410 handles the management of metadata for applications stored in the applications storage 6425. In some embodiments, the applications for which the metadata manager 6410 manages metadata include applications developed by first party developers, second party developers, and third party developers. To manage metadata for applications, the metadata manager 6410 of some embodiments uses the metadata identifier 6405 and the metadata processor 6415 to facilitate in identifying metadata for applications and processing the applications' metadata.

The metadata identifier 6405 is responsible for identifying metadata associated with an application. In some embodiments, when the metadata identifier 6405 receives the application and the application's metadata from the metadata manager 6410, the metadata identifier 6405 examines the application's metadata, identifies all or a subset of the metadata in the application's metadata and stores the identified metadata in the application metadata storage 6430.

The metadata processor 6415 processes applications' metadata. In some embodiments, when the metadata processor 6415 receives a request to process metadata for an application from the metadata manager 6410, the metadata processor 6415 analyzes the application's metadata and/or the application itself to generate additional metadata for the application and stores in the application metadata storage

6430 any additional metadata generated for the application. In some embodiments, the metadata processor 6415 analyzes a subset of the application's metadata while, in other embodiments, the metadata processor 6415 analyzes all of the application's metadata, in order to generate additional metadata for the application.

Figure 65:
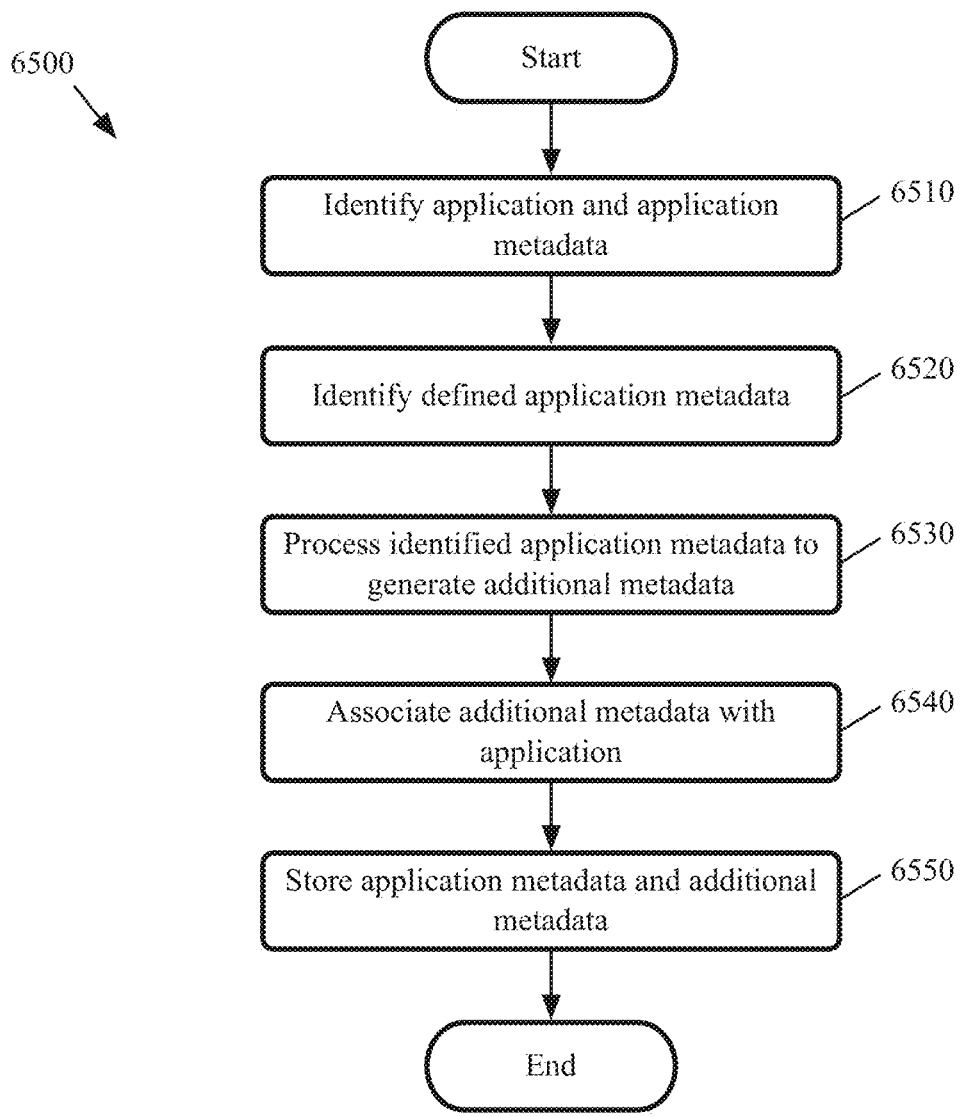
FIG. 65 conceptually illustrates a process of some embodiments for processing applications and application metadata.

An example operation of the application distribution server 6400 will now be described by reference to FIG. 65, which conceptually illustrates a process 6500 of some embodiments for processing applications and application metadata. In some embodiments, the application distribution server 6400 performs the process 6500 when the application distribution server 6400 receives an application and the application's metadata.

The process 6500 starts when the metadata manager 6410 receives an application and the application's metadata by identifying (at 6510) (1) the application for which the metadata manager 6410 is processing metadata and (2) the application's metadata. The metadata manager 6410 passes the application's metadata to the metadata identifier 6405.

Next, the metadata identifier 6405 identifies (at 6520) defined metadata from the application's metadata. As mentioned above, the metadata identifier 6405 of some embodiments identifies all or a subset of the metadata from the application's metadata. The metadata identifier 6405 then passes the identified metadata to the metadata manager 6410, which in turn passes the identified metadata to the metadata processor 6415.

The metadata processor 6415 then processes (at 6530) the identified metadata in order to generate additional metadata for the application. In some embodiments, the metadata processor 6415 processes the identified metadata by analyzing the identified metadata and/or the application itself to generate additional metadata for the application. Once the metadata processor 6415 processes the application's metadata, the metadata processor 6415 sends to the metadata manager 6410 the application's metadata and any additional metadata generated for the application.

Next, the metadata manager 6410 associates (at 6540) the additional metadata with the application and then stores (at 6550) the application's metadata and the additional metadata in the application metadata storage 6430. The process 6500 then ends.

While many of the features in this example have been described as being performed by one module (e.g., the metadata manager 6410), one of ordinary skill in the art would recognize that the functions might be split up into multiple modules. Similarly, the functions described as being performed by multiple different modules in this example might be performed by a single module in some embodiments (e.g., the metadata identifier 6405 might be part of the metadata processor 6415).

Figure 66:
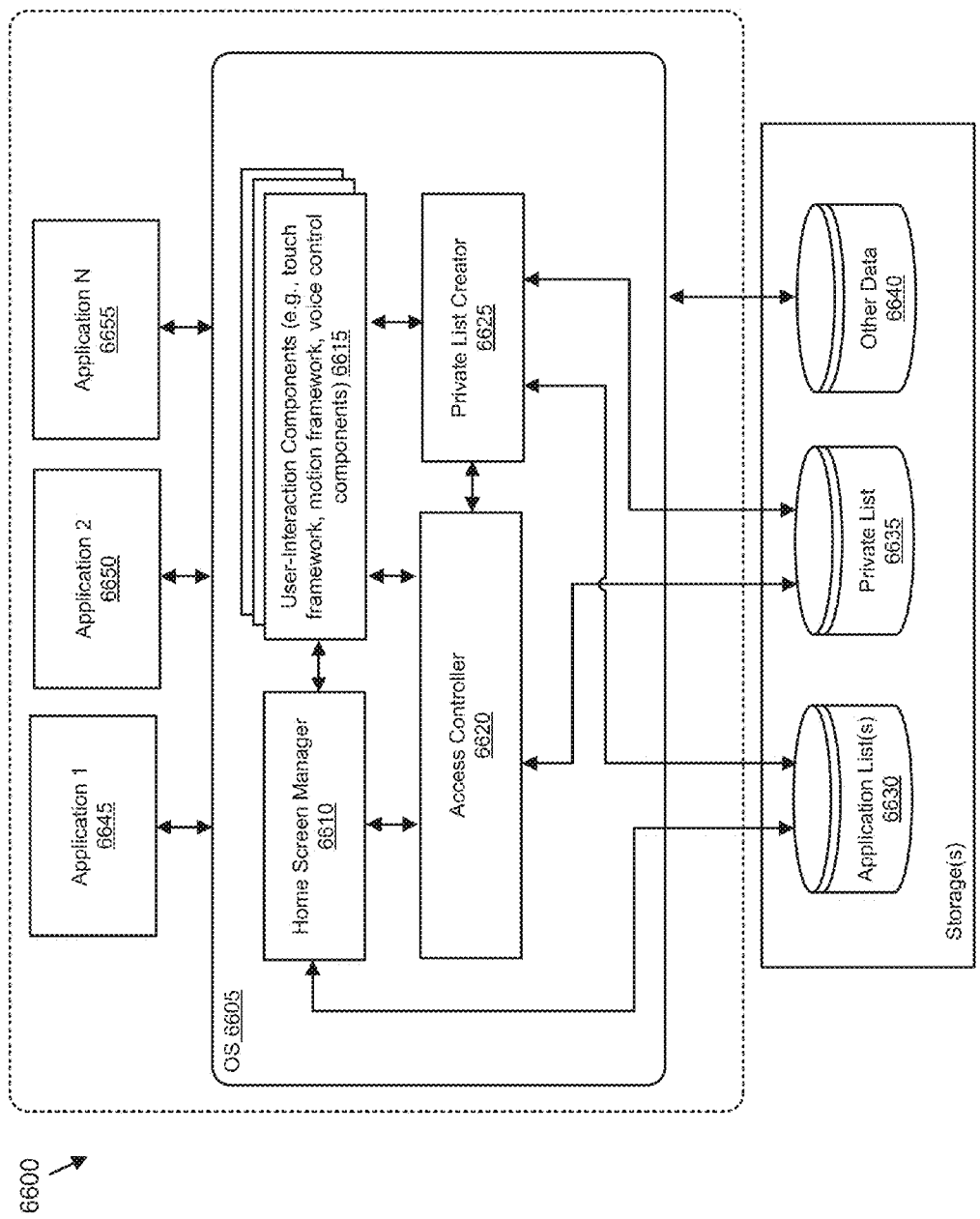
FIG. 66 provides an illustrative example of using application metadata to uniformly adjust the access mode settings for groups of different applications.

In some embodiments, the processes described above are implemented as software running on a particular machine, such as a computer or a handheld device, or stored in a machine-readable medium. FIG. 66 conceptually illustrates a software architecture of the privacy tools of some embodiments. In this example, the privacy tools are implemented within an operating system ("OS") 6605. However, the privacy tools may be part of their own standalone application or are integrated into another application.

FIG. 66 conceptually illustrates the device's OS 6605. The OS 6605 includes several different components, including a home screen manager 6610 (e.g., desktop manager, Spring-Board manager), several user-interaction components 6615, an access controller 6620, and a private list creator 6625. The OS 6605 may also be associated with a number of different drivers to control different types of hardware components (e.g., touch screen, accelerometer, gyroscope, etc.). Several different applications 6645-6655 (e.g., email application, music player, social network application) are installed using the OS 6605. The figure also illustrates one or more storages that store an application list 6630, the private list 6635, and other data 6640.

The user-interaction components 6615 are different frameworks that manager how a person can interact with the mobile computing device. That is, they are the interface via which different commands are received from users through different input devices (e.g., keyboard, trackpad, touchpad, mouse, accelerometer, gyroscope, etc.). The user-interaction components 6605 may include a touch framework for receiving different types of touch gestures and a motion framework for receiving different types of motion-based gestures. For example, the present application illustrates the use of a finger in the graphical user interface to control (e.g., select, move) objects in the graphical user interface. However, in some embodiments, objects in the graphical user interface can also be controlled or manipulated through other controls, such as cursor control. In some embodiments, touch control through finger input is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

In some embodiments, the privacy tools allow the user to share one or more applications using voice commands. For example, the device may be placed into the secondary access mode with the user stating aloud through the device's microphone the name of the voice control application and the command to enter the share mode. As another example, the user can say the name of the voice control application, followed by a command to share one or more applications ("share phone", "share map and phone"). Upon detecting such command, the device is then immediately placed in the secondary access mode with those one or more applications being accessible and several other applications being inaccessible. To facilitate such voice interaction, the user-interaction components 6615 of some embodiments includes one or more voice control components. The voice control components may be a part of a speech recognition program. The speech recognition program of some embodiments executes on the mobile computing device to act as an intelligent personal assistant for the user. In some embodiments, the speech recognition program identifies certain keywords or terms such as its name and the word "share", "enter share mode", etc. The speech recognition program then navigates through its knowledgebase to either place the device in the secondary access mode or place the device in the secondary access mode with one or more applications stated aloud by the device's user.

The home screen manager 6610 is responsible for the presentation of different applications. The home screen manager of some embodiments manages organizing different application icons on the screen, changing of background wallpaper, color, or pattern, and launching applications. For example, the home screen manager may analyze one or more directories (e.g., application lists 6630) to display applications on the home screen (e.g., including the dock).

The private list creator 6625 manages creation and modification of a private list. The private list may be created dynamically based on the device's user interaction with different selectable items. When the secondary access mode has been activated, the access controller 6620 iterates through the private list to identify applications that need to be protected. The access controller then interfaces with the home screen manger 6610 to make the identified application inaccessible. For example, the access controller may interface with the home screen manger to make the corresponding application icon functionless. That is, the selection of such an icon will not cause the corresponding application to be opened. The access controller may also interface with the home screen manager to change the of the application icons or hides those icons.

When the secondary access mode has been activated, the access controller 6620 iterates through the private list to identify applications that need to be made accessible. The access controller then interfaces with the home screen manger 6610 to make the identified application accessible. The access controller may also interface with the home screen manager to restore the appearance of the application icons or unhide those icons.

While many of the features of privacy tools have been described as being performed by one module (e.g., the home screen manager 6610, the access controller 6620), one of ordinary skill in the art will recognize that the functions described herein might be split up into multiple modules. Similarly, functions described as being performed by multiple different modules might be performed by a single module, in some embodiments.

In many of the examples described above, the device's user performs a touch gesture to select different applications to share or protect. The user also directs the device to operate in the secondary access mode through a touch gesture or a motion-based gesture. For example, the user taps and holds an application icon to display a context menu item for sharing the corresponding application. Alternatively, the user taps and holds the application icon, and then taps a selectable item (e.g., the home button) to open the list of applications. In other examples, the user rotates the mobile computing devices or presses (e.g., triple taps) the selectable item to direct the device to operate in the secondary access mode. One of ordinary skill in the art would understand that these are just example gestures and that other gestures can be used to perform the same functions. For example, instead of rotating the computing device, the device can be placed face down or face up on a surface, the device can flipped, or any other motion-based gestures that can be detected through one or more orientation/motion detecting components of the computing device, such as a gyroscope and an accelerometer. In addition, the different touch gestures (e.g., single tap, double tap, single tap, tap and hold (i.e., press), drag, pinch, stretch press, rotate, etc.) can be interchanged to provide similar functionality. For example, instead of triple tapping the home button, a secondary access mode session may be initiated through a different touch gesture that can be detected through the device's touch screen.

Also, in many of the examples above the device on which the operating system executes has a touch screen through which a user can interact with to share applications. However, one of ordinary skill in the art will realize that cursor controllers or other input devices can be used to interact with the controls shown in these examples for other embodiments that execute on devices with cursors and cursor controllers or other input mechanisms (e.g., voice control, remote control, motion sensor). For instance, instead of pressing an application icon to display the context menu item, the privacy tools might allow the user to right-click on the icon. The privacy tools of some embodiments might allow the user to use a keyboard in combination with a cursor controller. For instance, instead of selecting only the application icon, the privacy tools of some embodiments might allow the user select the icon in combination with a hotkey or a shortcut key. Also, the mobile computing device may have a motion sensing input component that tracks movement of objects (e.g., the person's hand) in the real world through infrared projector and camera, or some other means.

Furthermore, many of the examples described above refer to controls (e.g., soft buttons) that are part of the mobile computing device's operating system or physical controls (e.g., the home button, the power button) that are attached to the computing device. One of ordinary skill in the art will realize that the different types of controls can be interchanged to provide the same functionalities. For example, the home button or the power button may be provided as a soft button that is shown on the OS's home screen, dock, and/or taskbar. Similarly, a new share button to enter the share mode may be provided as either or both a physical button or a soft button.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 67:
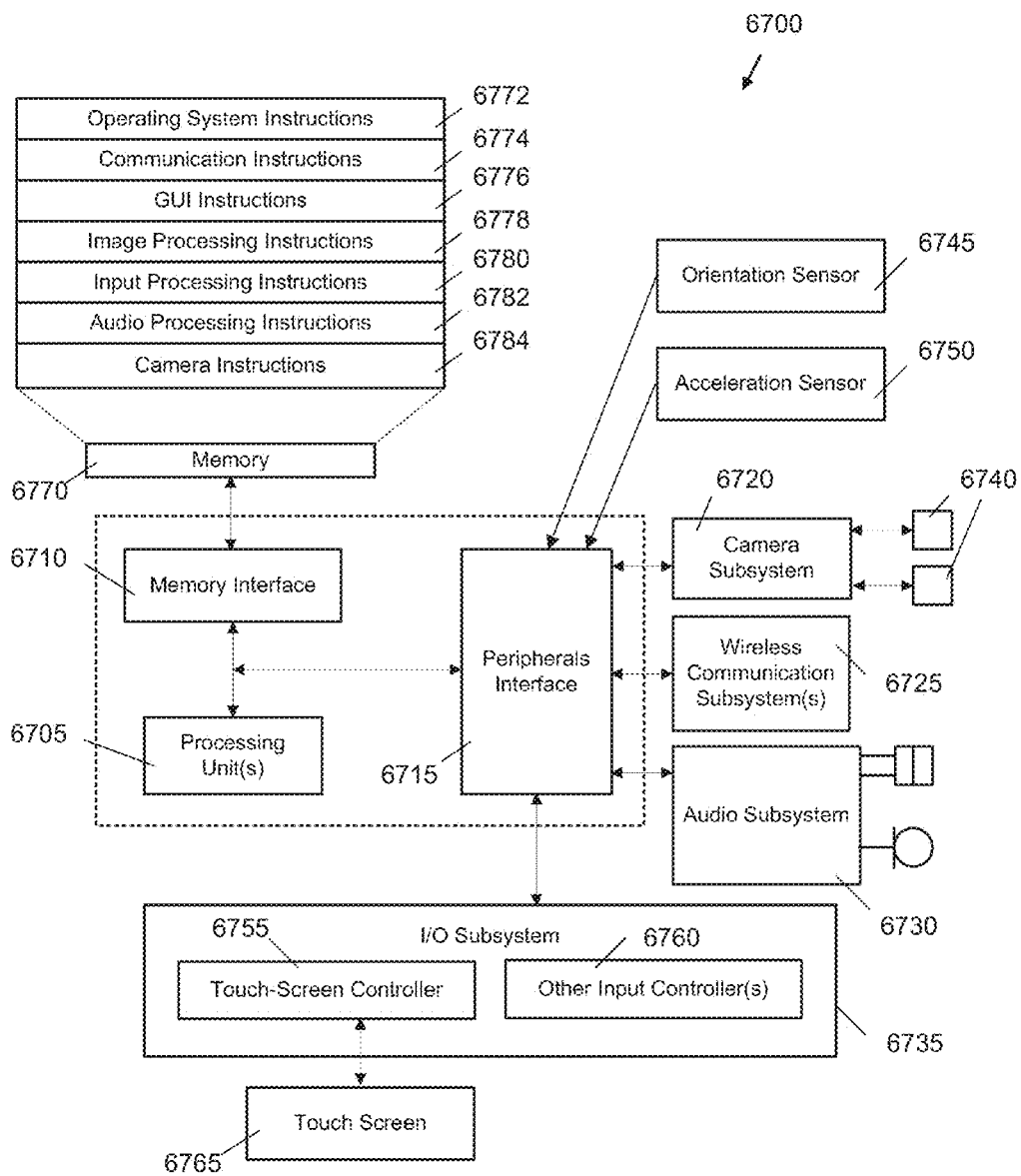
FIG. 67 is an example of an architecture of a mobile computing device.

The reminder application of some embodiments operates on mobile devices. FIG. 67 is an example of an architecture 6700 of such a mobile computing device. Examples of mobile computing devices include smartphones, tablets, laptops, etc. As shown, the mobile computing device 6700 includes one or more processing units 6705, a memory interface 6710 and a peripherals interface 6715.

The peripherals interface 6715 is coupled to various sensors and subsystems, including a camera subsystem 6720, a wireless communication subsystem(s) 6725, an audio subsystem 6730, an I/O subsystem 6735, etc. The peripherals interface 6715 enables communication between the processing units 6705 and various peripherals. For example, an orientation sensor 6745 (e.g., a gyroscope) and an acceleration sensor 6750 (e.g., an accelerometer) is coupled to the peripherals interface 6715 to facilitate orientation and acceleration functions.

The camera subsystem 6720 is coupled to one or more optical sensors 6740 (e.g., a charged coupled device (CCD) optical sensor, a complementary metal-oxide-semiconductor (CMOS) optical sensor, etc.). The camera subsystem 6720 coupled with the optical sensors 6740 facilitates camera functions, such as image and/or video data capturing. The wireless communication subsystem 6725 serves to facilitate communication functions. In some embodiments, the wireless communication subsystem 6725 includes radio frequency receivers and transmitters, and optical receivers and transmitters (not shown in FIG. 67). These receivers and transmitters of some embodiments are implemented to operate over one or more communication networks such as a GSM network, a Wi-Fi network, a Bluetooth network, etc. The audio subsystem 6730 is coupled to a speaker to output audio. Additionally, the audio subsystem 6730 is coupled to a microphone to facilitate voice-enabled functions, such as voice recognition, digital recording, etc.

The I/O subsystem 6735 involves the transfer between input/output peripheral devices, such as a display, a touch screen, etc., and the data bus of the processing units 6705 through the peripherals interface 6715. The I/O subsystem 6735 includes a touch-screen controller 6755 and other input controllers 6760 to facilitate the transfer between input/output peripheral devices and the data bus of the processing units 6705. As shown, the touch-screen controller 6755 is coupled to a touch screen 6765. The touch-screen controller 6755 detects contact and movement on the touch screen 6765 using any of multiple touch sensitivity technologies. The other input controllers 6760 are coupled to other input/control devices, such as one or more buttons. Some embodiments include a near-touch sensitive screen and a corresponding controller that can detect near-touch interactions instead of or in addition to touch interactions.

The memory interface 6710 is coupled to memory 6770. In some embodiments, the memory 6770 includes volatile memory (e.g., high-speed random access memory), non-volatile memory (e.g., flash memory), a combination of volatile and non-volatile memory, and/or any other type of memory. As illustrated in FIG. 67, the memory 6770 stores an operating system (OS) 6772. The OS 6772 includes instructions for handling basic system services and for performing hardware dependent tasks.

The memory 6770 also includes communication instructions 6774 to facilitate communicating with one or more additional devices; graphical user interface instructions 6776 to facilitate graphic user interface processing; image processing instructions 6778 to facilitate image-related processing and functions; input processing instructions 6780 to facilitate input-related (e.g., touch input) processes and functions; audio processing instructions 6782 to facilitate audio-related processes and functions; and camera instructions 6784 to facilitate camera-related processes and functions. The instructions described above are merely exemplary and the memory 6770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 67 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 67 may be split into two or more integrated circuits.

Figure 68:
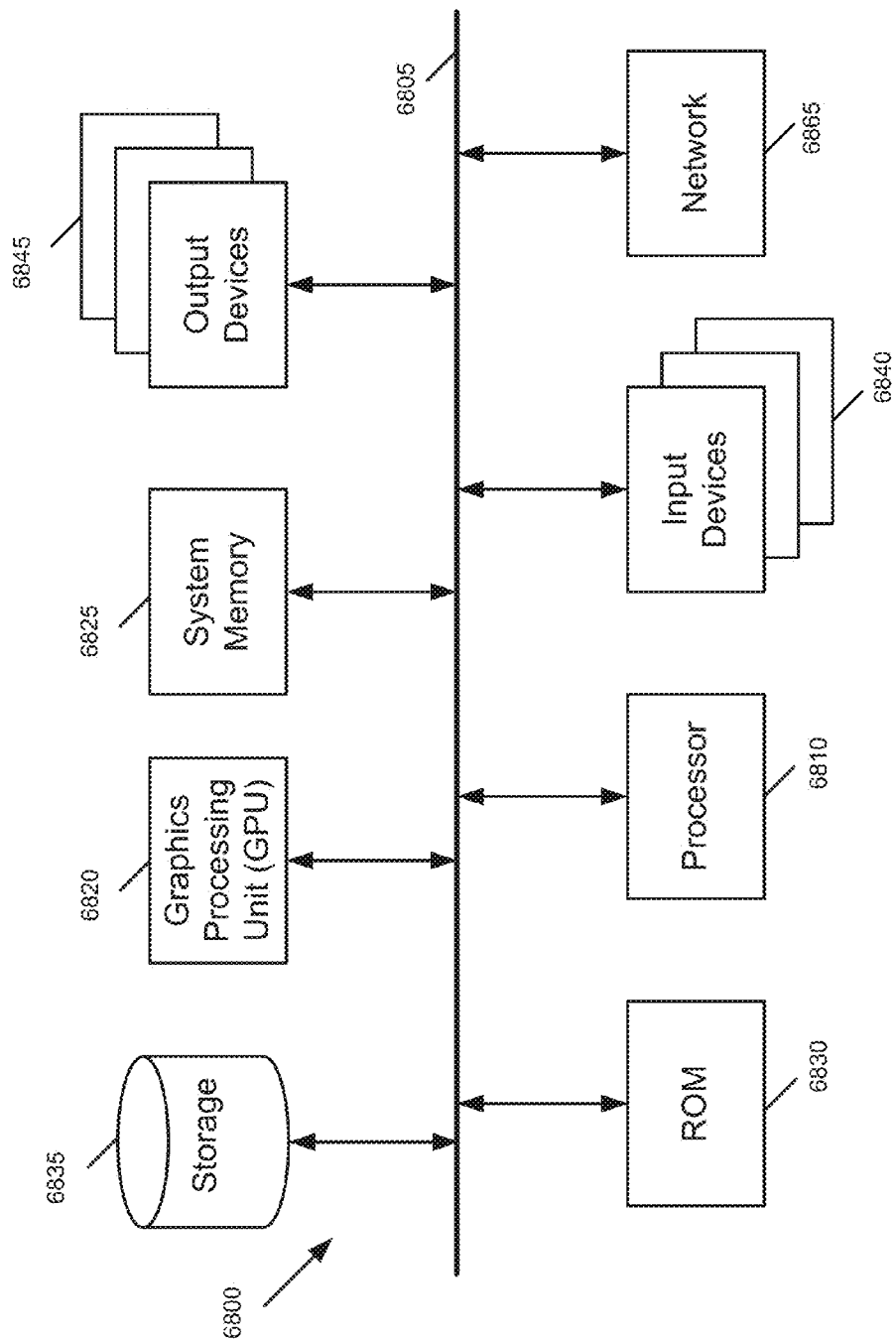
FIG. 68 conceptually illustrates another example of an electronic system with which some embodiments of the invention are implemented.

FIG. 68 conceptually illustrates another example of an electronic system 6800 with which some embodiments of the invention is implemented. The electronic system 6800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 6800 includes a bus 6805, processing unit(s) 6810, a graphics processing unit (GPU) 6820, a system memory 6825, a network 6865, a read-only memory 6830, a permanent storage device 6835, input devices 6840, and output devices 6845.

The bus 6805 collectively represents all system, peripheral, and chipset buses that communicatively connect the numerous internal devices of the electronic system 6800. For instance, the bus 6805 communicatively connects the processing unit(s) 6810 with the read-only the GPU 6820, the system memory GPU 6825, and the permanent storage device 6835.

From these various memory units, the processing unit(s) 6810 retrieves instructions to execute and data to process in order to execute the processes of the invention. The processing unit(s) may be a single processor or a multi-core processor in different embodiments. Some instructions are passed to and executed by the GPU 6820. The GPU 6820 can offload various computations or complement the image processing provided by the processing unit(s) 6810.

The read-only-memory (ROM) 6830 stores static data and instructions that are needed by the processing unit(s) 6810 and other modules of the electronic system. The permanent storage device 6835, on the other hand, is a read-and-write memory device. This device is a non-volatile memory unit that stores instructions and data even when the electronic system 6800 is off. Some embodiments of the invention use a mass-storage device (such as a magnetic or optical disk and its corresponding disk drive) as the permanent storage device 6835.

Other embodiments use a removable storage device (such as a floppy disk, flash memory device, etc., and its corresponding drive) as the permanent storage device. Like the permanent storage device 6835, the system memory 6825 is a read-and-write memory device. However, unlike storage device 6835, the system memory 6825 is a volatile read-and-write memory, such a random access memory. The system memory 6825 stores some of the instructions and data that the processor needs at runtime. In some embodiments, the invention's processes are stored in the system memory 6825, the permanent storage device 6835, and/or the read-only memory 6830. For example, the various memory units include instructions for processing multimedia clips in accordance with some embodiments. From these various memory units, the processing unit(s) 6810 retrieves instructions to execute and data to process in order to execute the processes of some embodiments.

The bus 6805 also connects to the input and output devices 6840 and 6845. The input devices 6840 enable the user to communicate information and select commands to the electronic system. The input devices 6840 include alphanumeric keyboards and pointing devices (also called "cursor control devices"), cameras (e.g., webcams), microphones or similar devices for receiving voice commands, etc. The output devices 6845 display images generated by the electronic system or otherwise output data. The output devices 6845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 68, bus 6805 also couples electronic system 6800 to a network 6865 through a network adapter (not shown). In this manner, the computer can be a part of a network of computers (such as a local area network ("LAN"), a wide area network ("WAN"), or an Intranet, or a network of networks, such as the Internet. Any or all components of electronic system 6800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 29, 51, 53, 55, 61, 63, and 65) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of in FIGS. 1-3, 5-28, 30-34, 36, 37, 39-50, 52, 54, 56, 57, and 58) can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory computer-readable medium having one or more programs stored therein for execution by one or more processors of a mobile device with a touch screen display and a home button, the one or more programs including instructions for:

when the mobile device is operating in a primary access mode, presenting a plurality of icons that correspond to applications accessible in the primary access mode; and determining an application of the plurality of applications to share in a secondary access mode of the mobile device by:

detecting a selection of a first icon in the plurality of icons that correspond to the applications accessible for use at the mobile device in the primary access mode, the first icon corresponding to a first application;

while maintaining the selection of the first icon, detecting a touch input on the home button; and, in response to detecting both the selection of the first icon and the touch input on the home button, placing the mobile device in the secondary access mode, wherein in the secondary access mode, a user only has access to the first application in the plurality of applications.

2. The computer readable medium of claim 1, wherein in the primary access mode, a user has access to all applications that execute on the mobile device.

3. The computer readable medium of claim 1, wherein in the secondary access mode, the first application is activated.

4. The computer readable medium of claim 1, wherein in the secondary access mode, the first application is launched immediately after placing the mobile device in the secondary access mode.

5. The computer readable medium of claim 1, wherein the home button is a physical button.

6. The computer readable medium of claim 1, wherein the home button is a selectable user interface item.

7. The computer readable medium of claim 1, wherein in the secondary access mode, icons in the plurality of icons that are distinct from the first icon have a different appearance indicating the corresponding applications are not accessible in the secondary access mode.

8. A method, comprising:
at a mobile device with one or more processors, a memory, a touch screen display, and a home button:
when the mobile device is operating in a primary access mode, presenting a plurality of icons that correspond to applications accessible in the primary access mode; and
determining an application of the plurality of applications to share in a secondary access mode of the mobile device by:
detecting a selection of a first icon in the plurality of icons that correspond to the applications accessible for use at the mobile device in the primary access mode, the first icon corresponding to a first application;
while maintaining the selection of the first icon, detecting a touch input on the home button; and,
in response to detecting both the selection of the first icon and the touch input on the home button, placing the mobile device in the secondary access mode, wherein in the secondary access mode, a user only has access to the first application in the plurality of applications.

9. The method of claim 8, wherein in the primary access mode, a user has access to all applications that execute on the mobile device.

10. The method of claim 8, wherein in the secondary access mode, the first application is activated.

11. The method of claim 8, wherein in the secondary access mode, the first application is launched immediately after placing the mobile device in the secondary access mode.

12. The method of claim 8, wherein the home button is a physical button.

13. The method of claim 8, wherein the home button is a selectable user interface item.

14. The method of claim 8, wherein in the secondary access mode, icons in the plurality of icons that are distinct from the first icon have a different appearance indicating the corresponding applications are not accessible in the secondary access mode.

15. A mobile device, comprising:
a touch screen display;
a home button;
one or more processors; and
memory storing one or more programs for executing by the one or more processors, the one or more programs including instructions for:
when the mobile device is operating in a primary access mode, presenting a plurality of icons that correspond to applications accessible in the primary access mode; and
determining an application of the plurality of applications to share in a secondary access mode of the mobile device by:
detecting a selection of a first icon in the plurality of icons that correspond to the applications accessible for use at the mobile device in the primary access mode, the first icon corresponding to a first application;
while maintaining the selection of the first icon, detecting a touch input on the home button; and,
in response to detecting both the selection of the first icon and the touch input on the home button, placing the mobile device in the secondary access mode, wherein in the secondary access mode, a user only has access to the first application in the plurality of applications.

16. The mobile device of claim 15, wherein in the primary access mode, a user has access to all applications that execute on the mobile device.

17. The mobile device of claim 15, wherein in the secondary access mode, the first application is activated.

18. The mobile device of claim 15, wherein in the secondary access mode, the first application is launched immediately after placing the mobile device in the secondary access mode.

19. The mobile device of claim 15, wherein the home button is a physical button.

20. The mobile device of claim 15, wherein the home button is a selectable user interface item.

21. The mobile device of claim 15, wherein in the secondary access mode, icons in the plurality of icons that are distinct from the first icon have a different appearance indicating the corresponding applications are not accessible in the secondary access mode.

* * * * *